United States Patent [19]
Yokogawa et al.

[11] Patent Number: 5,647,717
[45] Date of Patent: Jul. 15, 1997

[54] CARTRIDGE CARRYING SYSTEM AND LIBRARY SYSTEM

[75] Inventors: Miyuki Yokogawa; Naoya Yamamura; Hidetomo Kamon; Kiyotaka Tanaka; Yoshiyuki Hashimoto; Katsufumi Ohnaka; Noriaki Matsuzaki; Takahiro Asahara, all of Hyogo, Japan

[73] Assignee: Fujitsu Limited, Kawasaki, Japan

[21] Appl. No.: 564,384

[22] Filed: Dec. 4, 1995

[30] Foreign Application Priority Data

Dec. 6, 1994 [JP] Japan ................................ 6-302364

[51] Int. Cl.⁶ ................................................ B65G 1/04
[52] U.S. Cl. ........................ 414/273; 414/331; 414/280
[58] Field of Search .................................. 414/273, 280, 414/661, 663, 331, 277, 278, 281, 282; 360/98.05, 98.06; 369/35–38

[56] References Cited

U.S. PATENT DOCUMENTS

| | | | |
|---|---|---|---|
| 3,958,102 | 5/1976 | Burt | 414/273 X |
| 4,675,856 | 6/1987 | Rudy et al. | 360/98.06 X |
| 4,836,621 | 6/1989 | Teranishi | 414/280 X |
| 4,846,619 | 7/1989 | Crabtree et al. | 414/280 X |
| 4,856,956 | 8/1989 | Zur | 414/280 |
| 4,900,212 | 2/1990 | Mikahara | 414/331 X |
| 4,945,429 | 7/1990 | Munro et al. | 360/98.05 X |
| 4,981,409 | 1/1991 | Hirose et al. | 414/280 X |
| 5,135,344 | 8/1992 | Kita et al. | 414/280 X |
| 5,211,523 | 5/1993 | Andrada Galan et al. | 414/280 X |
| 5,220,548 | 6/1993 | Nakatsukasa et al. | 414/280 X |
| 5,236,296 | 8/1993 | Ostwald | 414/280 |
| 5,303,034 | 4/1994 | Carmichael et al. | 414/273 X |
| 5,362,192 | 11/1994 | Dang | 414/280 |
| 5,418,732 | 5/1995 | McFadin | 414/273 X |
| 5,429,470 | 7/1995 | Nicol et al. | 414/273 X |
| 5,450,385 | 9/1995 | Ellis et al. | 369/36 X |
| 5,460,476 | 10/1995 | Gazza | 414/280 X |

FOREIGN PATENT DOCUMENTS

| | | | |
|---|---|---|---|
| 186808 | 10/1984 | Japan | 414/331 |
| 59-213060 | 12/1984 | Japan . | |
| 62-251601 | 11/1987 | Japan . | |
| 63-14252 | 1/1988 | Japan . | |
| 171702 | 7/1988 | Japan | 414/273 |
| 1-253865 | 10/1989 | Japan . | |
| 294103 | 11/1989 | Japan | 414/273 |
| 1-320523 | 12/1989 | Japan . | |
| 2-46567 | 2/1990 | Japan . | |
| 2-94156 | 4/1990 | Japan . | |
| 2-94157 | 4/1990 | Japan . | |
| 3-75845 | 3/1991 | Japan . | |
| 3-250327 | 11/1991 | Japan . | |
| 3-280248 | 12/1991 | Japan . | |
| 4-20403 | 1/1992 | Japan . | |
| 4-20404 | 1/1992 | Japan . | |
| 4-76854 | 3/1992 | Japan . | |
| 4-96150 | 3/1992 | Japan . | |

(List continued on next page.)

*Primary Examiner*—David A. Bucci
*Attorney, Agent, or Firm*—Armstrong, Westerman, Hattori, McLeland & Naughton

[57] ABSTRACT

The present invention provides a cartridge carrying system for performing carriage control so as to enable carriage of a cartridge even when a gap is made between arms and the cartridge. In particular, the cartridge carrying system includes: a cartridge holding mechanism having two arms, the cartridge holding mechanism grabbing a cartridge stored in a first predetermined position at one end of each of the two arms by turning the two arms around respective supporting points in directions opposed to each other; an arm turning mechanisms; a carrying mechanism for carrying the cartridge in such a manner that the cartridge is drawn into or from a space between the two arms; a carriage driving mechanism for driving the carrying mechanism; and a carriage completion monitoring mechanism for monitoring if the cartridge is carried to a second predetermined position, and the cartridge carrying system controlling so that the operation for carrying the cartridge to the second predetermined position is continued, when it is detected that the cartridge is not carried to the second predetermined position within a given time.

11 Claims, 48 Drawing Sheets

FOREIGN PATENT DOCUMENTS

| | | |
|---|---|---|
| 4-125844 | 4/1992 | Japan . |
| 4-143955 | 5/1992 | Japan . |
| 4-221454 | 8/1992 | Japan . |
| 4-283485 | 10/1992 | Japan . |
| 5-12026 | 1/1993 | Japan . |
| 5-221060 | 8/1993 | Japan . |
| 5-250790 | 9/1993 | Japan . |
| 5-289828 | 11/1993 | Japan . |
| 1172840 | 8/1985 | U.S.S.R. ................................ 414/331 |

Fig.10
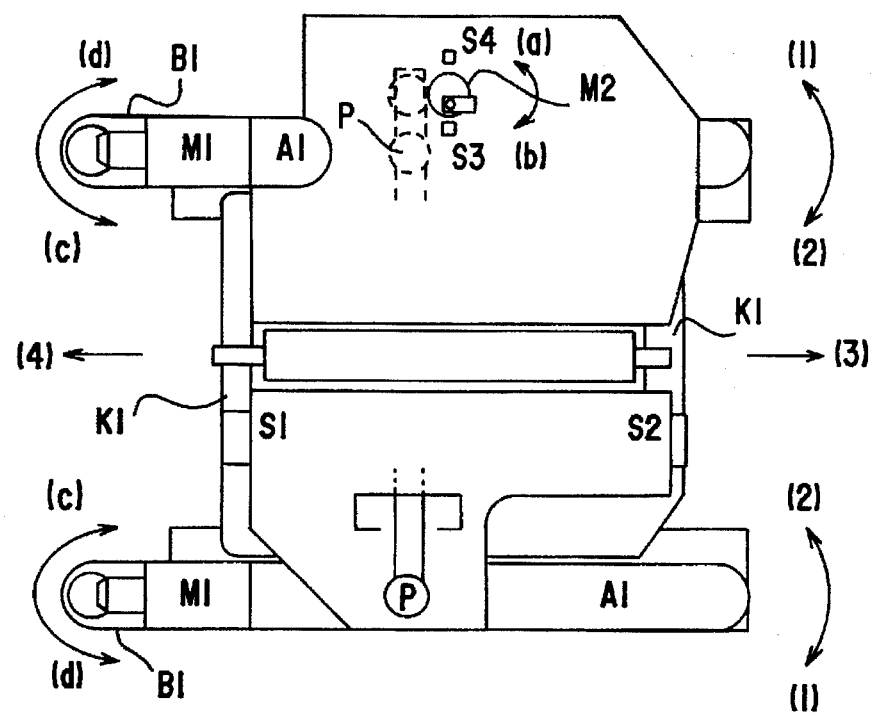
※ (1) AND (2) INDICATE OPENING/CLOSING OPERATION OF ARM (A1)
(3) AND (4) INDICATE OPERATIONAL DIRECTION OF CARTRIDGE
(a) AND (b) INDICATE ROTATIONAL DIRECTION OF MOTOR (M2)
(c) AND (d) INDICATE DRIVING DIRECTION OF BELT (B1)
TOP VIEW
―――――――――
SIDE ELEVATION
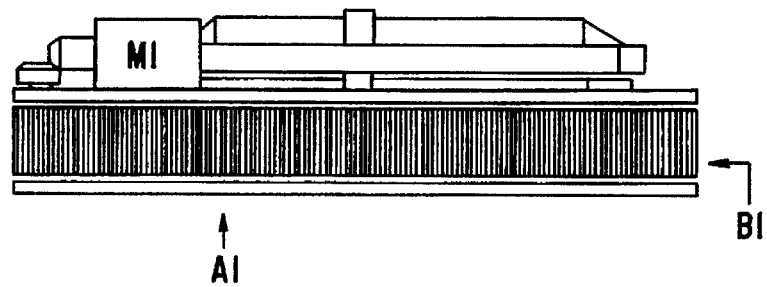

※ X, Y AND Z INDICATE POSITIONS OF CARTRIDGE

Fig.16

Prior Art

| VOLUME NAME | |
|---|---|
| NUMBER OF TIMES FOR USE OF MEDIUM | CELL-ADDRESS |
| SIDE A/SIDE B | STATE-OF-USE FLAG |
| LIBRARY ID | RESERVED |
| VOLUME NAME | |
| NUMBER OF TIMES FOR USE OF MEDIUM | CELL-ADDRESS |
| SIDE A/SIDE B | STATE-OF-USE FLAG |
| LIBRARY ID | RESERVED |
| LIBRARY ID | RESERVED |

} INFORMATION FOR ONE SIDE

Fig.18

| FOR NUMBER OF TIMES FOR USE OF MEDIUM | FOR NUMBER OF TIMES OF BUSYNESS | ← THRESHOLD VALUE FOR COMPARISON |
|---|---|---|
| VOLUME NAME || |
| NUMBER OF TIMES FOR USE OF MEDIUM | CELL-ADDRESS | |
| SIDE A/SIDE B | NUMBER OF TIMES OF BUSYNESS | |
| STATE-OF-USE FLAG | RESERVED | INFORMATION FOR ONE SIDE |
| LIBRARY ID | RESERVED | |
| OWNER ID || |
| GROUP ID || |
| ≈ | ≈ | |
| VOLUME NAME || |
| NUMBER OF TIME FOR USE OF MEDIUM | CELL-ADDRESS | |
| ≈ | ≈ | |
| GROUP ID || |

STATE IN WHICH ACCESSOR HAND PORTION IS INSERTED
(INITIAL STATE)

STATE IN WHICH END OF CELL IS DETECTED AT ACCESSOR HAND PORTION
(RIGHT END)

STATE IN WHICH END OF CELL IS DETECTED AT ACCESSOR HAND PORTION
(LEFT END)

STATE IN WHICH ACCESSOR HAND PORTION IS INSERTED
(INITIAL STATE)

STATE IN WHICH END OF CELL IS DETECTED AT ACCESSOR HAND PORTION
(UPPER END)

STATE IN WHICH END OF CELL IS DETECTED AT ACCESSOR HAND PORTION
(LOWER END)

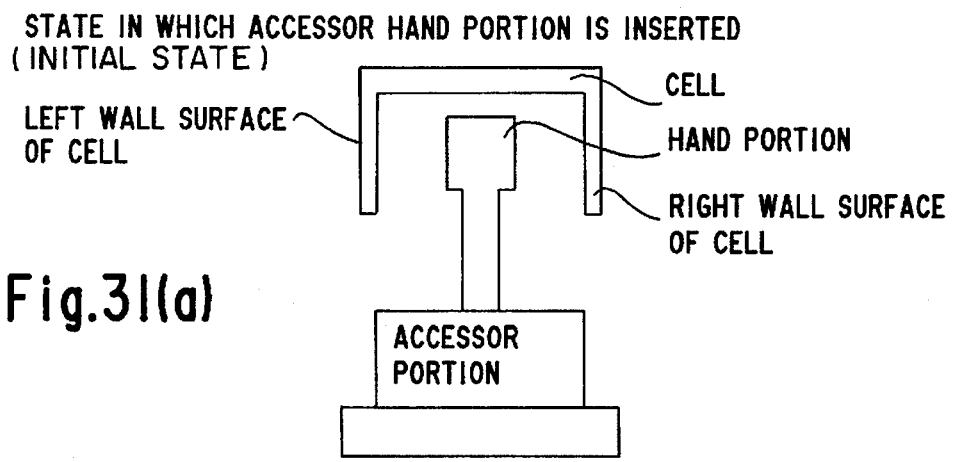
Fig.31(a) STATE IN WHICH ACCESSOR HAND PORTION IS INSERTED (INITIAL STATE)
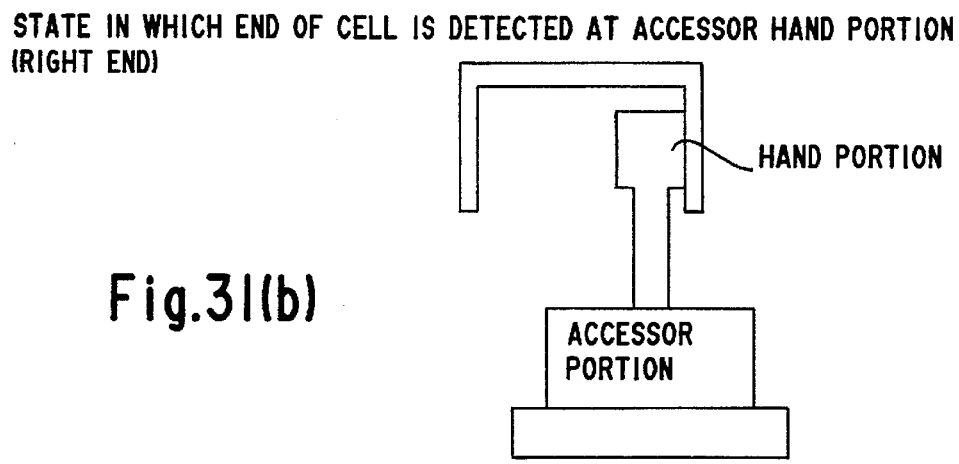
Fig.31(b) STATE IN WHICH END OF CELL IS DETECTED AT ACCESSOR HAND PORTION (RIGHT END)
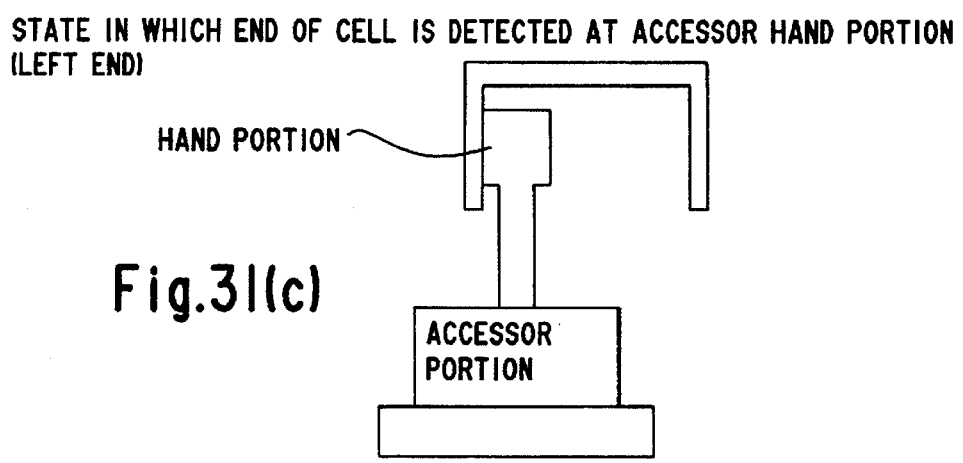
Fig.31(c) STATE IN WHICH END OF CELL IS DETECTED AT ACCESSOR HAND PORTION (LEFT END)

ABNORMAL OPERATION
(WHEN POSITIONAL DEVIATION OCCURS IN DIRECTION X)

OPERATION DISABLED (GAP STATE)

NORMAL OPERATION
(VIEW SEEN FROM TOP)

ACCESSOR

HAND PORTION

CELL

CARTRIDGE

CARTRIDGE CARRYING SYSTEM AND LIBRARY SYSTEM

BACKGROUND OF THE INVENTION

1. Field of the Invention

The present invention relates to a cartridge carrying system, and more particularly to a cartridge carrying system for automatically carrying a cartridge accommodating a magnetic tape or the like therein to a data input/output device such as a magnetic tape unit.

Further, in the library system having a repository for repositing cartridges therein, a cartridge carrying system, and other, the present invention relates to a library system having a function for eliminating such a state as that a cartridge can not be taken out because of positional deviation made between an accessor and a cell, i.e., a gap state.

2. Description of the Related Art

1. Cartridge Carrying System

Referring to FIG. 9, there has been proposed an automatic loading mechanism (auto-loader) for carrying a cartridge accommodating a magnetic tape therein to a magnetic tape unit without needs of operation by an operator.

FIG. 9 shows the appearance of the auto-loader 51 and a magnetic tape unit 52 connected to each other.

The auto-loader 51 includes a magazine 54 having a shelf structure for accommodating a plurality of cartridges, and a cartridge carrying mechanism (referred to as a carrier hereinbelow) 53.

Each of cartridges accommodated in the magazine 54 is taken out from the magazine 54 by the carrier 53 and inserted into a cartridge insertion opening of the magnetic tape unit 52.

In this example, the carrier 53 is so configured as to be capable of elevating action.

FIG. 10 is a view showing a structure of an example of the carrier 53.

In the drawing, a reference character A1 denotes an arm, a number of arms provided being two. The two arms A1 are rotated in a direction (1) or (2) to sandwich a cartridge K1 therebetween, thereby carrying the cartridge K1. A reference character M1 designates a carrying motor which is disposed to each arm A1 to drive a belt B1 wound around the periphery of each arm A1. The belts B1 carry the cartridge K1 in the horizontal direction.

A reference character M2 represents a motor for turning the arms, and drive of the motor in a direction (a) or (b) involves turning action of the two arms A1 around each supporting point P of the arms A1 in the direction (1) or (2) by an eccentric cam disposed to the motor.

For example, when the both arms A1 are turned in the direction (1), one end of each of the two arms A1 on the left-hand side is closed to hold the cartridge K1.

Conversely, when the two arms A1 are rotated in the direction (2), the one end of each of the two arms A1 on the left-hand side is opened while the other end of the same on the right-hand side is closed to hold the cartridge K1.

After held between the two arms A1, the cartridge K1 is carried by drive of the belts B1 in a direction (3) or (4). Reference characters S1 and S2 denote sensors for monitoring that cartridge carrying operation has been effected normally. The ON state of the both sensors means completion of the operation for carrying the cartridge into the carrier.

Reference characters S3 and S4 designate sensors which are provided in the vicinity of the motor M2 and detect the turning action of the arms, namely, the opened or closed state of the ends of the arms on the left- or right-hand side.

For instance, if the motor M2 is stopped when the sensor S3 is turned on, the ends of the arms A1 on the right-hand side are closed. Meanwhile, if the motor M2 is stopped when the sensor S4 is turned on, the ends of the arms A1 on the left-hand side are closed.

Further, in the case where the motor M2 is not stopped, namely, the motor M2 keeps driving, the two arms A1 repeat the opening/closing operation.

Driving the motor M1 while holding the cartridge K1 by the arms A1 involves rotation of the belts B1 in the direction (c) or (d), and the cartridge K1 is then moved in the direction (3) or (4) by drive of the belts.

For example, when the belts B1 are rotated in the direction (c), the cartridge is carried in the direction (3).

The operation of the auto-loader and the carrier having such a configuration is controlled by a control unit provided within the magnetic tape unit.

An example of the conventionally-used control will now be explained.

A) When Inserting the Cartridge Provided within the Magazine into the Magnetic Tape Unit 1: The carrier is moved to a position of a cartridge, which is to be taken out, by the elevating drive of the carrier itself.

2: The cartridge is taken out from the magazine and carried into the carrier by drive of the belts provided at the arm portions.

3: In the state 1 described above, the carrier itself is controlled by elevating drive and moved to the cartridge insertion opening of the magnetic tape unit.

4: The cartridge within the carrier is carried into the cartridge insertion opening by drive of the belts provided at the arm portions.

5: The thus-carried cartridge is pushed into the magnetic tape unit.

B) When Returning the Cartridge Ejected from the Magnetic Tape unit into the Magazine 6: The cartridge ejected from the magnetic tape unit is carried into the carrier by drive of the belts provided at the arm portions.

7: In the state 5 described above, the carrier itself is controlled by elevating drive and moved to a position of the magazine at which the cartridge was accommodated.

8: The cartridge is carried from inside of the carrier into an insertion opening of the magazine by drive of the belts provided at the arm portions.

9: The thus-carried cartridge is pushed into the magazine.

Description will now be given as to an example of the prior art where the cartridge is carried from the left-hand side to the right-hand side in the drawing with reference to FIG. 11.

In the example, the cartridge K1 is carried into the carrier as follows.

In the case where the cartridge K1 located on the left-hand side of the carrier 53, i.e., at a position (X) is carried into the carrier 53, the motor M2 is driven in the direction (a) and the arms A1 are opened in the direction (1). The motor M2 is then stopped at a position where the sensor S4 is turned on.

Subsequently, when the motor M1 is driven so that the belts B1 move in the direction (c), the cartridge K1 is moved in the direction (3). The sensors S1 and S2 perform monitoring operation during drive of the motor M1, and operation for carrying the cartridge K1 into the carrier 53 is completed at a position where the both sensors S1 and S2 are turned on, namely, operation is finished at a position (Y), thereby stopping the motor M1.

On the other hand, in the case where the cartridge K1 located on the right-hand side of the carrier 53, i.e., at a position (Z) is carried into the carrier 53, the motor M12 is driven to move in the direction (b) and the arms A1 are closed in the direction (2). The motor M2 is then stopped at a position where the sensor S3 is turned on.

Next, when the motor M1 is driven so that the belts B1 move in the direction (d), the cartridge K1 is moved in the direction (4).

The sensors S1 and S2 perform monitoring operation during drive of the motor M1, and it is assumed that the cartridge K1 is accommodated in the carrier 53 at a position where the both sensors S1 and S2 are turned on, namely, at the position (Y), thereby stopping the motor M1. The above description is an overview of processing for holding and carrying the cartridge K1 placed at the position (X) or (Z) into the carrier 53.

In the conventional cartridge carrying system, however, there is a following problem: That is, according to such a method as described in the above A) and B), the cartridge can not be successfully held by the arms in the carrier due to a difference in widths of the cartridges and the carriage is failed in the operations of 1, 3 and 5 of A) for inserting the cartridge into the magnetic tape unit and the operation of 7 of B) for returning the cartridge into the magazine.

FIG. 12 illustrates an example of the cartridge carrying operation in the case where such a problem occurs.

The drawing shows the problem which may occur when a cartridge having a small dimension is carried into the carrier if there is a difference in widths W of cartridges.

In this example, as shown in the drawing, the cartridge is moved from the left-hand side to the right-hand side, but a small gap D is disadvantageously made between the cartridge and each belt B1 before the cartridge reaches the position at which the sensor S2 is on.

The cartridge can not be moved to the right-hand side any longer because of the gap D.

When this problem occurred, such a retry control as shown in the flowchart of FIG. 13 has been carried out in the prior art.

At the step S101, the processing for holding the cartridge placed at the position X in FIG. 11 is effected.

A number of times for retry is determined at the step S102, and the motor M1 is driven and the belts B1 are moved so that the cartridge is carried into the carrier at the step S103.

A monitoring time T (T>an actual operation time) is determined at the step S104.

The monitoring time T corresponds to the time after the belts are activated until the both sensors S1 and S2 are turned on and the operation for carrying the cartridge into the carrier is completed.

It is monitored if the both sensors S1 and S2 are turned on within the monitoring time T at the steps S105, S106 and S107, and when the both sensors S1 and S2 are turned on, the motor M1 is stopped (the step S108).

If the both sensors S1 and S2 are not turned on beyond the monitoring time T (the step S105), the cartridge is not completely carried into the carrier, and the motor M1 is hence stopped (the step S109). Then, the processing for temporarily returning the cartridge to the position X is performed (the step S110).

If the cartridge is not normally carried into the carrier even though a number of times for retry has been subjected to subtraction at the steps S111 and the processing for carrying the cartridge to the position Y has been performed the thus-set number of times for retry (the step S112), an error code is set (the step S113) and the processing is completed.

However, if the gap D is generated between the cartridge and each belt even though the carrying processing is repeated as described above, the cartridge may not be returned to the position X. In addition, even if the cartridge is returned to the position X, it is difficult to again carry the cartridge to the position Y in the carrier.

2. Library System (Having an Accessor Function for Eliminating the Gap State)

In general, it may be considered that both fixed repository (fixed cells) and rotary repository (driven cells) can be provided in a library system accommodating storage mediums having a large capacity therein as shown in FIG. 40, and additional provision or movement of the cells after installation is possible.

In the thus-installed repositories, an accessor is moved in directions X, Y and Z in order to fetch a cartridge accommodated in each cell.

Information about an absolute position of each cell that is determined during designing process or installation process is stored in an accessor controller which is not shown in the drawing, and the accessor is moved to the position of any desired cell in accordance with this information.

Further, the deviation between positions of the accessor and each cell is corrected by using a reflex photoelectric sensor or the like if necessary.

However, when the gap state is avoided in this way, there occur following problems. In FIG. 40, after the accessor is moved to the position corresponding with a desired cell, a hand portion of the accessor is driven to fetch the cartridge in the cell.

As shown in FIG. 41(a), if the accessor is aligned with the cell so that they appropriately face to each other, the cartridge can be fetched normally. However, as shown in FIG. 41(b), if the position of the accessor deviates from that of the cell, the accessor can not fetch the cartridge. Also, even if the accessor can held the cartridge, there may occur problems such that the cartridge touches a wall of the cell and thereby can not be taken out and that the cartridge is sandwiched between the cell and the accessor.

When this gap state is generated, the processing for returning the hand portion of the accessor toward the accessor has been carried out in the prior art library system, but this returning operation is failed if friction between the cartridge and the cell is larger than the force for returning the accessor.

Further, in case of a library system having a plurality of accessors, one accessor may be substituted by another accessor so that the operation continues if the accessor fails to operate. However, when the gap state occurs, the substitution by another accessor is impossible and there is caused a drawback such that the operation of the library system is stopped until a customer engineer restores the system from the gap state.

3. Library Control System

In general, a library control system has been conventionally provided with: a repository for accommodating a plurality of replaceable storage mediums (cartridges), e.g., cartridge type magnetic disks each having rear and front faces on which data are written; a plurality of storage medium carrying mechanisms for fetching a specified storage medium from a plurality of the storage mediums and mounting it on a recording/reproducing mechanism; a plurality of recording/reproducing mechanisms for recording/reproducing data to and/or from the thus-fetched storage medium; and a library control unit for controlling these mechanisms.

In this system, the repository consists of a plurality of cells each having an enough space for accommodating the storage medium therein, and each cell has an address. Also, the library control unit stores the information of each cell and its cartridge held therein.

Moreover, generally, in a large scale collective mass storage system having a plurality of such library control systems, each library control system functions in accordance with a command issued from a work station or a personal computer which is a host device, i.e., a host computer.

For example, when the library control system receives from the work station a command to fetch data having a given name, the library control unit of the library control system selects a cartridge having the data in accordance with the previously-stored information and instructs the carrying mechanism and the recording/reproducing mechanism to take out the cartridge and reproduce the data.

In this system, the host device is usually used by a user of the library control unit, and a plurality of the host devices are provided. Therefore, multiple users may simultaneously use the host devices in some cases, and a plurality of carrying mechanisms and recording/reproducing mechanisms are hence provided.

The operation of the prior art library control system will now be described.

FIG. 15 is a block diagrams showing the structure of the library control system.

In the drawing, a reference numeral 101 denotes a host device for issuing a command to mount or unmount the cartridge provided in a medium repository 117 to or from any of disk units 116, namely, a work station or a personal computer.

A reference numeral 102 designates a library control unit for monitoring/controlling the operation of the library system 113, and the library control unit 102 is usually a work station used for exclusively controlling the library system 113.

A reference numeral 103 represents a host interface for receiving a command from the host device and performing communication. When a command received by the library control unit 102 is decoded, a library interface 104 communicating with the library system 113 is informed of this fact.

In addition, there are provided a CPU 105 for performing arithmetic operation; a ROM 106 for storing a program executed by the library control unit 102; a RAM 107; a keyboard controller 109 for receiving an input from a keyboard 108; a disk 110 having a volume information management table; and a disk controller 111 for having access to the disk 110. These members are connected through a bus 112.

A reference numeral 113 denotes a library system having the cartridges therein, the library system being connected with the library control unit 102 through the library interface 104.

A reference numeral 114 designates a library system controller which is an interface for communicating with the library control unit 102. Also, the library system controller 114 analyzes a command received by the library control unit 102 and controls carrying operation of an accessor robot 115 for grabbing the cartridge and operation of a plurality of disk units 116 for mounting the cartridge thereon to record and/or reproduce data.

A reference numeral 117 denotes a medium repository consisting of a plurality of cells each having a cartridge therein.

In this example, the cartridge, which is to be carried and has data to be recorded and/or reproduced, is a cartridge type magnetic disk medium having front and rear surfaces on which data are recorded.

Further, the conventional volume information management table recorded in the disk 110 has such a configuration as shown in FIG. 16.

Here, a volume name means an identification name given to one group of data defined for a given purpose or each JOB, and is supplied from the host device 101.

The volume information management table is used for managing the status of use of the cartridge in accordance with each volume name and produced when the cartridge is inserted into and reposited in the cell.

In FIG. 16, "self-address" indicates a position for reposition in the medium repository 117; "side A/side B" indicates a side of the cartridge on which data are recorded; "state-of-use flag" indicates whether the cartridge having a volume is currently used; and "library ID" is the information indicating the library system having that volume among a plurality of the library systems.

Further, a number of times that the cartridge having that volume is mounted is recorded as a number of times for using the medium.

FIG. 17 is a flowchart showing an example of mount processing in the conventional library control system.

When the volume is directed to be mounted by an input from the host device 101 or the keyboard 108, the CPU 105 is informed of this directive command through the host interface 103 or the keyboard controller 109.

The CPU 105 reads the designated volume information through the bus 112 from the disk 110.

At this time, the disk controller 111 makes reference to the volume information management table on the disk 110 to retrieve the designated volume name (the step S501).

At the steps S502, the state-of-use flag of the designated volume is confirmed and judgment is made upon whether the designated volume is currently used.

If it is currently used, the processing is completed. On the other hand, if it is not used, the self-address of the designated volume is recognized (the step S503).

Subsequently, the state-of-use flag of the designated volume is made to indicate "in-use" state (it is turned ON) (the step S504).

At the step S505, any volume having the same self-address is retrieved in the volume information management table by using the self-address of the designated volume, and the volume information on the side opposed to the side on which the designated volume exists is also extracted. Further, at the step S506, the state-of-use flag of the thus-extracted volume is made to indicate "in-use" state (it is turned ON).

At the step S507, a command to retrieve a vacant disk unit 116 is issued to the library system controller 114 through the library interface 104, and the library control system waits for a response indicating an existence of a vacant disk unit 116.

If a vacant disk device 116 exists, a command is issued to the library system controller 114 to secure that disk unit 116 at the step S508, and the cartridge having the designated volume is moved to the secured disk unit 116 by the accessor robot 115 (the step S509).

At the step S510, a number of times for using the medium recorded in the volume information of the designated volume is counted up, namely, it is increased by one.

As mentioned above, in the conventional library control system, the cartridge is mounted and the information concerning a number of times that the medium is used is recorded. The information indicating the number of times of use is mainly utilized for realizing the optimum arrangement of the cartridge.

For example, in Japanese patent laid-open publication No. 4-283485, there is disclosed an external storage unit having an automatic loading mechanism for enhancing the throughput of the system by repositing a frequently-used recording medium at a position close to the recording/reproducing mechanism by using a table showing frequencies of use of cells.

In Japanese patent laid-open publication No. 59-213060, there is disclosed a mass storage unit having a collection of cartridges which are grouped in such a manner that the cartridge having a higher frequency of use is accommodated in the cell which is more closer to the recording medium by recording a number of times that the cartridge is mounted on a frequency-of-use management table.

The both units are intended to store the information indicating the frequency of use and utilized for realizing the optimum arrangement of the cartridges in the medium repository using this information.

Further, Japanese patent laid-open publication No. 63-14252 discloses a method for selecting a medium repositing files, by which a number of times of use and a capacity of each file are recorded and a medium to be reposited is selected in accordance with the number of times of use per unit capacity.

In Japanese patent laid-open publication No. 52-2421, there is disclosed a magnetic storage unit having a life management function for magnetic recording mediums, the life management function being used to store a frequency of use for each recording medium and indicate that the recording medium can not be used when the frequency of use exceeds a predetermined frequency of use.

In regard of the library control system, the above-mentioned conventional systems are not designed to ease the frequent use of the same medium. That is, if a plurality of users are simultaneously using the library control system, they may happen to read or write data of the same cartridge concurrently.

When the contentious use of the same cartridge occurs, one user can not use the cartridge and thereby have to wait until the use by the other user is finished.

Further, in case of using the cartridge having both sides capable of being used, when one user uses one side of the cartridge, use of the other side of the same cartridge which is requested by another user may be impossible.

When using the data recorded on a side opposed to the side on which the frequently-used data are recorded, the waiting period is frequently generated, thereby deteriorating the efficiency of use of the data.

Furthermore, in a system in which a number of times that data of each volume are used is counted, the number of times that the data are used can not be said to directly reflect a number of time that use of the data is requested, i.e., the frequency of use of the data.

That is, if a counted number of times that the data are used is small, it is difficult to judge that a number of time that use of the data is requested is actually small or the number of times that the data are used is small because data on the opposed side is very frequently used and the data in question can not be used, whereby there is a problem such that the number of times that the data are used can not be directly regarded as the frequency of use.

4. Accessor Control Method for Detecting a Relative Position

With increase in the quantity of information used in a computing system in recent years, there have been proposed various library systems for functioning as automated mass storage units requiring no operation by operators as means for storing the information.

Each of these library system is provided with a repository for accommodating a plurality of recording mediums such as magnetic tape cartridges, optical disk cartridges or others.

Recording mediums are previously accommodated in a plurality of cells which are provided in the repository and used for accommodating the recording mediums therein, respectively. An accessor hand portion having a mechanical hand fetches a necessary recording medium from a cell of the repository and carries it to a recording/reproducing portion where the recording medium is set, whereby writing/reading of data is performed.

When the writing/reading of data is completed, the recording medium is again taken out from the recording/reproducing portion and carried to the cell of the repository to accommodate the medium therein. Also, an unnecessary recording medium is carried to an ejection opening to be taken out by an operator. Another recording medium put in an input opening by an operator is carried to the recording/reproducing portion and set, or carried to the cell to be accommodated therein. With such an arrangement, the library system is configured as a kind of automatic warehouse.

FIGS. 25 and 26 are schematic views each showing the positional relation established between an accessor and a repository which are main parts in the library system and a repository.

Referring to FIG. 25, a plurality of cells constituting the repository are of fixed type (the cells are referred to as fixed cells), the accessor moves in a direction of the X axis or the Y axis to fetch a cartridge stored in each fixed cell by using an accessor hand portion.

In this example, an accessor controller is used for moving the accessor to a previously-stored position in front of each cell so that the cartridge can be taken out.

As shown in FIG. 26, the repository has a structure referred to as "rotary driven cells", and takes out the cartridge in a driven cell by controlling the position of the accessor and rotation of the driven cells by using the same accessor with that shown in FIG. 25.

In such a library system having the above-mentioned configuration, the structural dimension of each of both the fixed cells and the driven cells is determined during a designing process, and an absolute position of each of the assembled cells can be theoretically specified.

However, since a certain amount of error is generated during an assembling process, the cartridge may not be taken out because of the error if the position of each cell is specified in accordance with the absolute position.

There is thus taken a measure for calculating a relative position by measuring an error from the absolute position (for example, a coordinate value of a central position of each cell) in order to obtain the actual position of each cell.

For instance, a method by which a measuring jig is used for measuring a deviation from a position at which the accessor is stopped has been proposed in Japanese patent laid-open publication No. 62-251601.

According to this method, a jig cartridge which is accommodated in the cell and has a screw mechanism uniformly protruding in the horizontal direction and another jig cartridge having a pin for detecting a central position of the cell are used to measure the deviation from the central position of the cell.

Further, there has been disclosed a method for detecting a relative position with a configuration having a reflex photoelectric sensor detecting an end portion of the cell in Japanese patent laid-open publication No. 2-94156.

According to this method, one or more reflex photoelectric sensors are provided to the accessor hand portion shown in FIG. 25 and a target flag is set at a specified position in the repository so that the relative position of the accessor hand portion to the repository is detected on the basis of information concerning the target flag output from the sensors.

Moreover, there have been proposed a method by which a video camera is used for image processing and a method using a transparent photoelectric sensor in order to detect the relative position, as well as the methods described above.

As for the accessor control method for detecting the relative position, it takes time to carry out measurement when using the jig for measuring the positional deviation, and the structural error of the screw mechanism or the like is generated, resulting in a problem such that the relative position can not be detected with high accuracy.

Further, in case of image processing using the video camera, configuration and processing of the system are complicated and not hence suitable for increasing the processing speed, and this system is disadvantageously expensive.

Furthermore, when using the transparent photoelectric sensors, since the sensors must be provided on the both sides of a target of detection so that the target is sandwiched therebetween, it is difficult to position the sensors.

Moreover, in the case where the reflex photoelectric sensor is used, the sensor may be provided on only one side of the target, but characteristics of the sensor vary depending on a distance between the sensor and the target, whereby the stable accuracy of detection may not be obtained. Also, following drawbacks are observed: Adjustment of the optical axis and the sensitivity of the sensor is difficult; the sensor itself is expensive; and resolution of the position detection of this sensor is inferior to that of the transparent sensor.

5. Control Unit

Conventionally, many of apparatuses utilized in various fields, e.g., an information processing system such as a personal computer, a word processor or a printer, a data communication system, an automatic carrying system or a manufacturing system have MPUs (Micro Processor Units) therein for controlling their operation. The MPU usually controls the system in accordance with the procedure determined on the basis of program codes stored in a ROM 1 (Read Only Memory).

In addition, when an advanced MPU is used, use of the ROM which can cope with the execution speed of the MPU leads to increase in cost. Therefore, an inexpensive RAM (Random Access Memory) whose execution speed is high may be provided separately from the ROM. In such a case, the program codes stored in the ROM may be first developed on the RAM temporarily, and an execution address of the MPU may be shifted on the RAM to perform the control.

Description will now be given hereinbelow as to an example of the prior art in which the program codes stored in the ROM are developed on the RAM.

FIG. 49 is a block diagram showing an example of hardware configuration of a conventional control unit. An MPU 1 is a processor for controlling this unit and connected with a RAM 1, an NVRAM 1, I/O 1 and a ROM 1 through a bus BUS 1 Consisting of an address bus, a data bus and others.

The NVRAM 1 is a non-volatile memory whose content stored therein can not be eliminated even if a power supply is turned off. The NVRAM 1 stores, e.g., setting data which differ for each individual user.

Further, the I/0 1 is an input/output driver and connected with external units such as various input/output units or optional units which are to be controlled. Through this input/output driver, signals for controlling the external units or supervisory signals are input and/or output.

Codes of the control program required for the operation of the control unit are stored in the ROM 1.

FIG. 50 illustrates an example of the program codes stored in the ROM 1 in the prior art.

In this example, program codes BOOT 1 which are executed when starting the MPU 1 and main program codes CODE 1 which are used for controlling the control unit are separately stored in the ROM 1.

Further, the main program codes CODE 1 consist of: program codes MAIN 1 for controlling the control unit body; program codes SUB n (n=1, 2, ... ) for controlling external units such as an optional unit; or program codes FUNC n (n=1, 2, ... ) for realizing an expanded function for individual users.

Here, the program codes BOOT 1 are a program for starting the main program CODE 1.

FIG. 51 is a flowchart showing a processing for starting the program codes in the prior art. When the MPU 1 is started after the power supply of the unit is turned on, the starting program codes BOOT 1 in the main program codes CODE 1 are started (at the step S1251), and the MPU 1 is activated in accordance with the BOOT 1.

As described above, the BOOT 1 is a program stored in the ROM 1.

The MPU 1 develops the main program codes CODE 1 on the RAM 1 in accordance with the BOOT 1 (the step S1252).

Upon completion of the processing for developing the main program codes CODE 1 (the step S1253), the execution address of the MPU 1 is shifted on the RAM 1 by the program BOOT 1 (the step S 1254).

Thereafter, the main program CODE 1 developed on the RAM is started, and the MPU 1 executes the processing of the unit on the basis of the start of the main program CODE 1 (the step S 1255).

The above describes the processing for starting the program codes in the prior art.

In addition, in Japanese patent laid-open publication No. 5-12026, there has been disclosed a magnetic disk unit having non-volatile storage means and volatile storage means, the magnetic disk unit storing only a commonly-used part of program codes for controlling the magnetic disk unit in the non-volatile storage means and storing program codes whose types of processing differ for each of a plurality of magnetic disk units in each magnetic disk unit, thereby executing the program after storing the program codes different for each unit in the volatile storage means.

Further, a magnetic disk unit having such a configuration that the program codes are compressed and stored in the non-volatile storage means and the program codes are developed on the volatile storage means when turning on the power supply has been disclosed in this Japanese patent laid-open publication No. 5-12026.

However, the following problems are observed in these conventional control units.

As the scale of program development becomes large or other functions are additionally provided year by year, the scale of program codes may exceed the capacity of the ROM provided in the unit.

In particular, if any unit connected as an option with an information processing unit or a control unit does not have its own MPU, a control program for the option unit must be provided in a main body of the information processing unit so that the option unit can be controlled. Therefore, as a number of the option units increases, the capacity of program codes in the main body also increases.

Further, if multiple users utilize a given information processing unit, the unit responds to each individual user, and there may hence often occur a case such that functions required by the users must be additionally provided or changed.

Thus, program codes in the developed code become large in scale and may exceed the initially-estimated capacity for storing the program.

To solve these problems, as described in the above Japanese patent laid-open publication No. 5-12026, it can be considered to take such a measure as that program codes are first compressed and stored in the ROM and the compressed program codes are decoded and developed on the RAM to thereafter execute processing.

There is, however, a limit in the capacity of the RAM which is an area on which the program codes are developed.

That is, even if all the program codes can be compressed and stored in the ROM, the restriction is put on the program codes so that they must not exceed the previously-provided maximum capacity of the RAM.

Therefore, it may be considered that the ROM storing only the necessary program codes therein is provided in accordance with existence/absence of the optional unit, each function to be used or each user, but management of production and a number of ROMs may be extremely complicated.

SUMMARY OF THE INVENTION

It is therefore an object of the present invention to provide a cartridge carrying system for carrying a cartridge by opening/closing arms in opposed directions and controlling to drive belts when the cartridge can not be carried.

That is, the present invention provides a cartridge carrying system comprising: cartridge holding means having two arms which are opposed to each other with a predetermined distance therebetween and turned around respective supporting points, for grabbing a cartridge stored at a first predetermined position at one end of each of the two arms by turning the two arms in opposed directions around the respective supporting points; arm turning means for turning the arms around the respective supporting points; carrying means for carrying the cartridge grabbed by the two arms in such a manner that the cartridge is drawn into or from a space between the two arms; carriage driving means for driving the carrying means; carriage completion monitoring means for monitoring if the cartridge is carried to a second predetermined position; and controlling means for controlling the operations of the arm turning means and the carriage driving means in response to information supplied from the carriage completion monitoring means, wherein the controlling means controls so as to continue the operation for carrying the cartridge to the second predetermined position when the carriage completion monitoring means detects that the cartridge is not carried to the second predetermined position within a given time.

Further, it is another object of the present invention to eliminated a gap state by imparting micro-vibrations to an accessor or driven cells in a library system.

The present invention provides a library system comprising: a driven type repository constituted by a plurality of cells for storing a plurality of cartridges, respectively; an accessor accommodating a hand portion for taking out or storing a cartridge from or into each of the cells; and gap detecting means for detecting occurrence of a gap state in which the cartridge can not be taken out; wherein when the gap state is detected by the gap detecting means, micro-vibrations are imparted to the accessor or the driven type repository, and the hand portion is so controlled as to be returned to a predetermined position within the accessor.

BRIEF DESCRIPTION OF THE DRAWINGS

FIG. 10 is a view typically showing an example of a structure of a carrier.

FIG. 16 is a view showing a structure of a volume information management table in the prior art;

FIG. 18 is a view showing a structure of a volume information management table in the embodiment according to the present invention;

FIGS. 31 (a), (b) and (c) are explanatory views showing a method for measuring a relative position in case of drive cells in the embodiment;

DESCRIPTION OF THE PREFERRED EMBODIMENTS

1. Cartridge Carrying System

Figure 1:
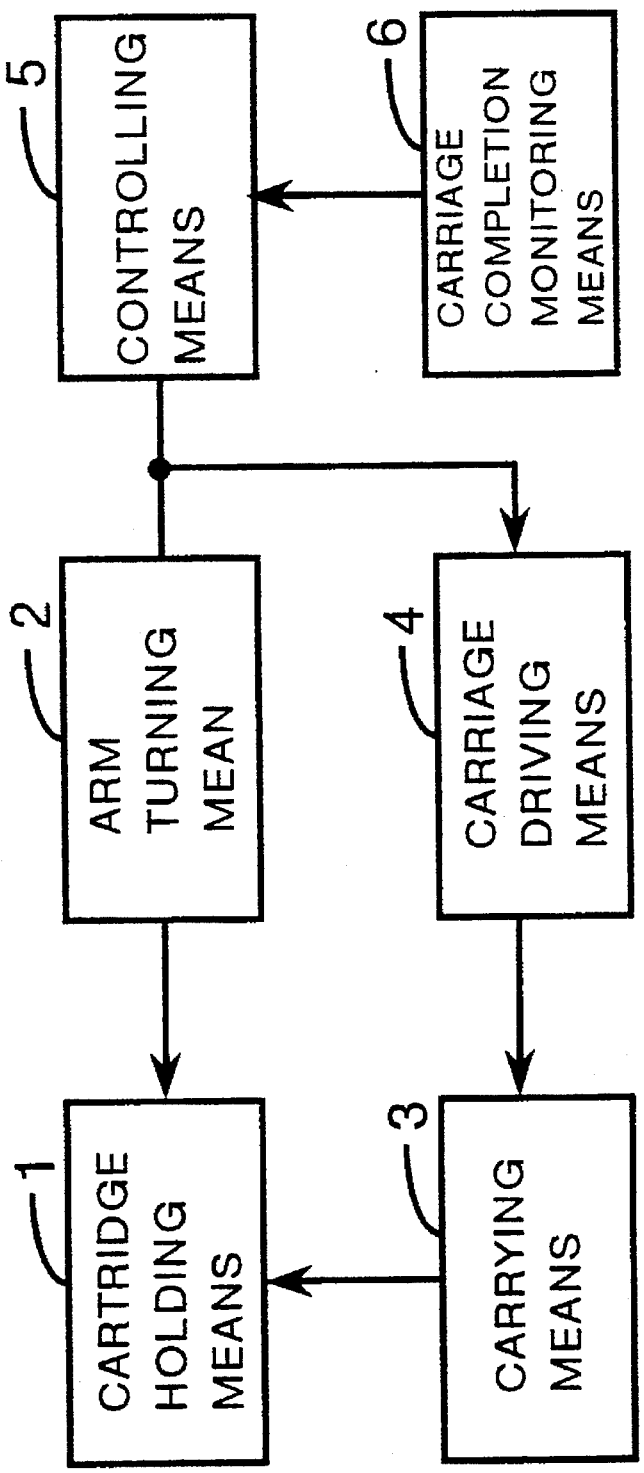
FIG. 1 is a block diagram showing a basic structure of a cartridge carrying system according to the present invention.

FIG. 1 illustrates a block diagram showing a basic structure relating to a cartridge carrying system according to the present invention.

The present invention provides a cartridge carrying system comprising: cartridge holding means 1 which has two arms that are opposed to each other at a predetermined distance and turned around each supporting point and grabs a cartridge accommodated at a first predetermined position at one end of each of the two arms by turning the two arms in opposed directions around each supporting point; arm turning means 2 for turning the arms around the respective supporting points; carrying means 3 for carrying the cartridge held by the two arms such a manner that it is pulled into a space between the two arms or it is sent from the space between the two arms; carriage driving means 4 for driving the carrying means 3; carriage completion monitoring means 6 for monitoring if the cartridge is carried to a second predetermined position; and controlling means 5 for controlling operations of the arm turning means 2 and the carriage driving means 4 in response to information from the carriage completion monitoring means 6, wherein the controlling means 5 controls so as to continue the operation for carrying the cartridge to the second predetermined position when the carriage completion monitoring means 6 detects that the cartridge is not carried to the second predetermined position within a predetermined time.

Here, when the carriage completion monitoring means 6 detects that the cartridge is not carried to the second predetermined position within a predetermined time, it is preferable that the controlling means 5 controls the carriage driving means 4 in such a manner that the arm turning means 2 turns the two arms in directions opposed to those in which the arm turning means 2 turned the arms for grabbing the cartridge and the carrying means 3 carries the cartridge grabbed by the other end of each of the two arms.

Further, when the carriage completion monitoring means 6 detects that the cartridge is not carried to the second predetermined position within a predetermined time, it is preferable that the controlling means 5 controls the carriage driving means 4 in such a manner that the arm turning means 2 turns the two arms in directions opposed to those in which the arm turning means 2 turned the arms for grabbing the cartridge, and the carrying means 3 carries the cartridge grabbed by the other end of each of the two arms, while the carrying means 3 keeps driving so that the carriage driving means 4 continues its operation to carry the cartridge to the second predetermined position.

Furthermore, when the carriage completion monitoring means 6 detects that the cartridge is not carried to the second predetermined position within a predetermined time, it is preferable that the controlling means 5 performs the control to alternately repeat a first turning operation of the arm turning means 2 by which the two arms are so turned as to grab the cartridge with one end of each of the two arms and a second turning operation of the arm turning means 2 by which the two arms are turned in directions opposed those of the first turning operation so as to grab the cartridge with the other end of each of the two arms, while the carrying means 3 keeps driving so that the carriage driving means 4 continues its operation to carry the cartridge to the second predetermined position.

Moreover, the control to carry the cartridge may be enabled by a combination of the carriage control by which only the operation to turn the two arms in the opposed directions is carried out with the carriage control by which the arms are turned in the opposed direction while driving the carrying means 3.

In addition, the control to alternately repeat the first turning operation and the second turning operation may be performed as well as the combination of the carriage controls.

In this example, referring to FIG. 1, the cartridge holding means 1 may be preferably constituted by two arms, and the arm turning means 2 may be preferably composed of a motor for turning the two arms and a driver for directly controlling to drive the motor.

The two arms may be preferably provided in parallel with the longitudinal direction at a position where they can be opposed to each other with a predetermined distance therebetween.

Further, a turning motor having a rotating shaft is disposed to a central portion of each arm so that the arm can be turned.

The predetermined distance is such a distance as that a tip of each arm is brought into contact with each other when the two arms are turned in two opposed directions, and the contact portions are parts used for picking up and carrying the cartridge.

The carrying means 3 may be preferably belts but not restricted to this type. Further, the carrying means 3 can be of any type if only it is capable of pulling the cartridge grabbed by the two arms into a space between the arms and feeding the cartridge from this space, and it may be preferably disposed so as to cover an external surface of each of the two arms.

In such a case, since surfaces of the belts are contact surfaces for grabbing the cartridge, the belts may be preferably made of a material which has a pliability and hardly causes slippage, such as rubber.

The carriage driving means 4 may be preferably constituted by a motor for turning the carrying means 3 and a driver for directly controlling to drive the motor.

As the controlling means 5, a CPU may be preferably used. As similar to computer systems of general type, the controlling means 5 may be provided with peripheral devices such as a ROM, a RAM and an I/O controller, and control the arm turning means 2 and the carriage driving means 4 by using programs stored in the ROM.

Although the carriage completion monitoring means 6 may be preferably made up of an optical sensor or an infrared sensor, it may be any of various switches such as a micro-switch capable of detecting a position when the cartridge actually pushes a contact point thereof.

The present invention will now be described in detail with reference to embodiments A-1 through A-4 illustrated in the drawings. The present invention can not be restricted by these embodiments.

Here, as similar to the examples of the prior art, explanation will be given as to the system for carrying the cartridge accommodating the magnetic tape therein.

Figure 9:
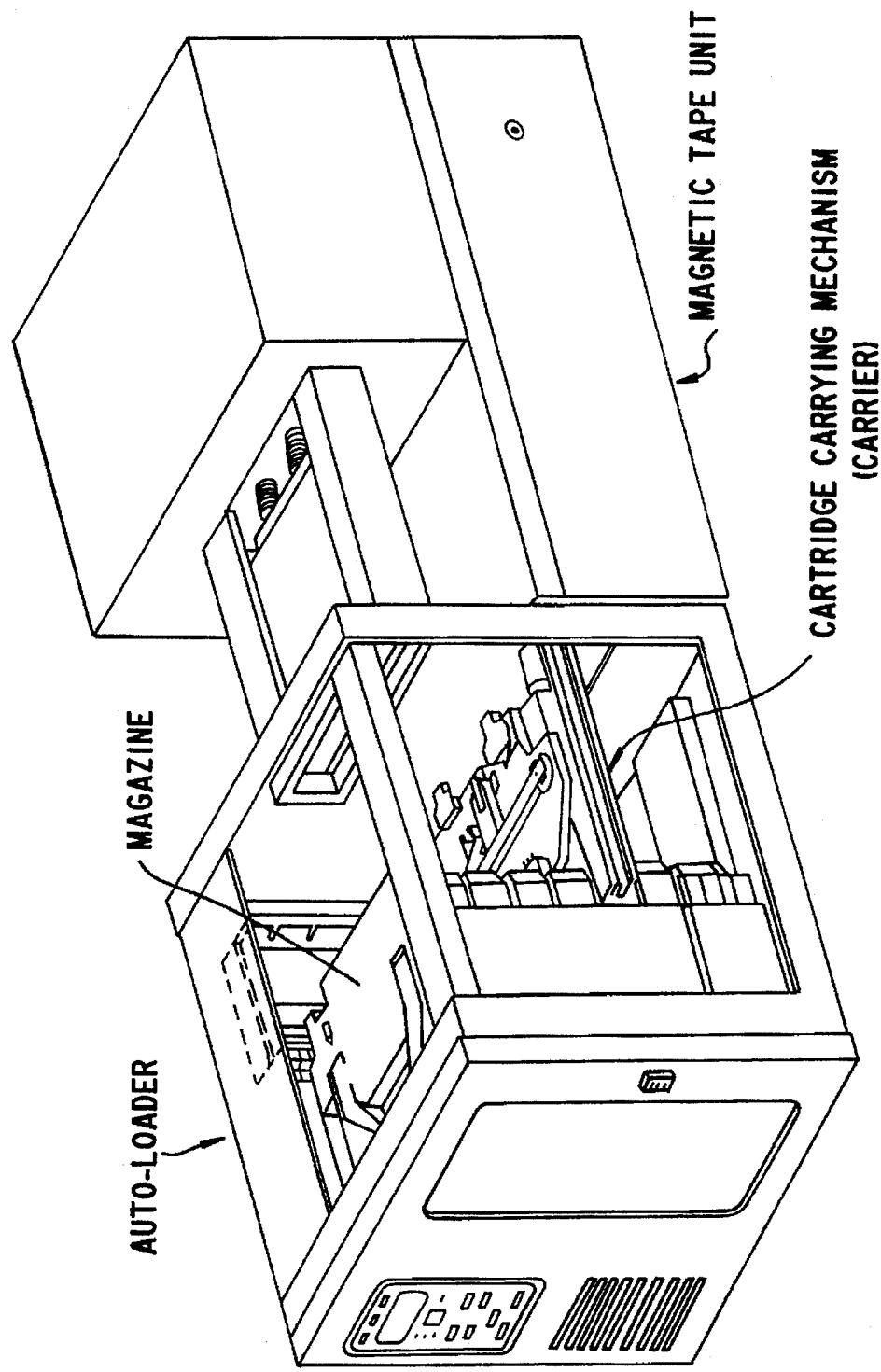
FIG. 9 is a view showing an appearance of an auto-loader and a magnetic tape unit connected to each other in a prior art.

A view showing the appearance of the auto-loader and the magnetic tape unit connected to each other and a view showing the structure of the carrier are the same with FIGS. 9 and 10, respectively, thereby omitting the explanation thereabout.

Figure 2:
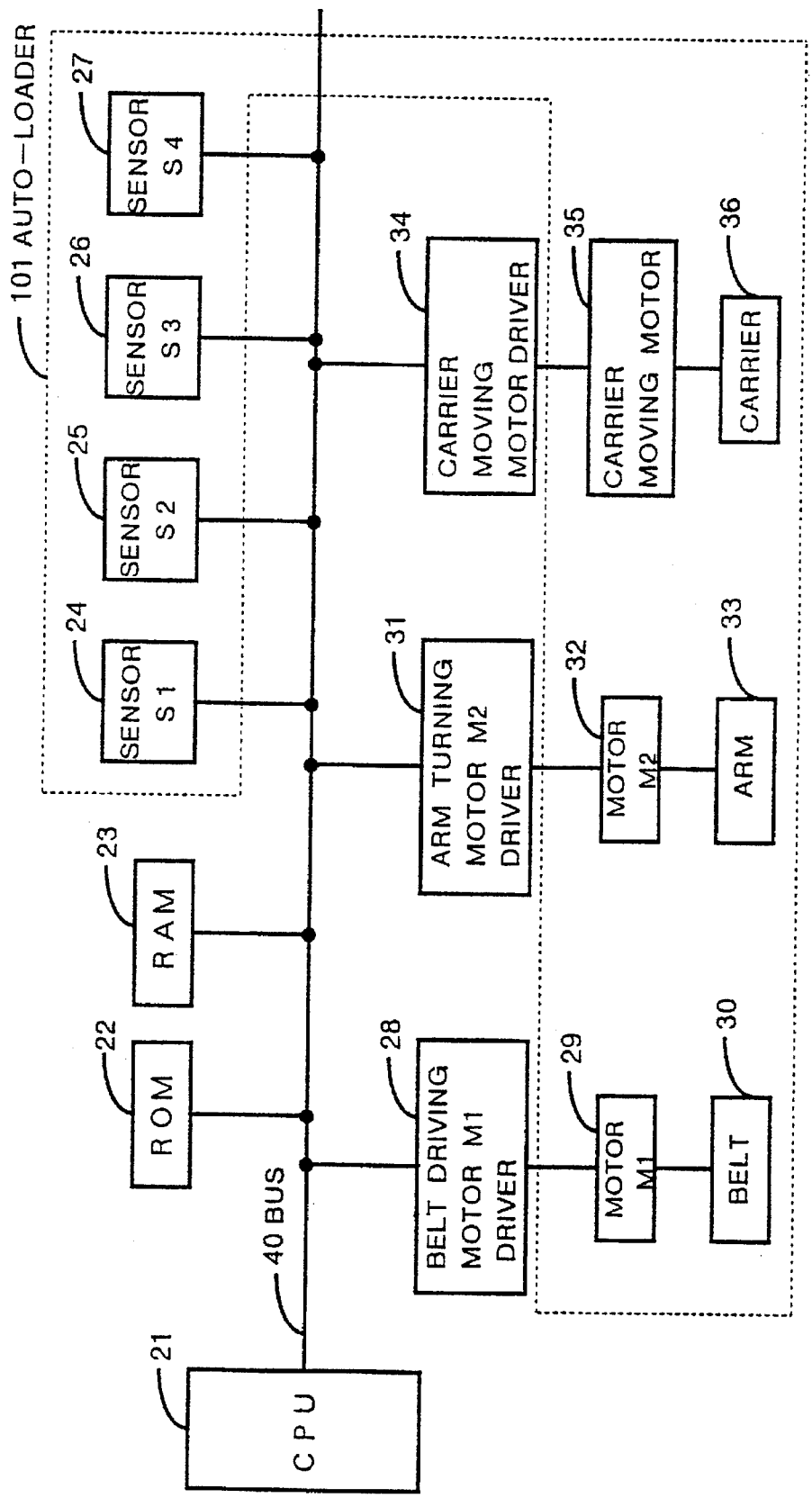
FIG. 2 is a block diagram showing a structure of an embodiment according to the present invention.

FIG. 2 is a block diagram showing the structure in an embodiment according to the present invention. Only a main element contributing to the cartridge carriage control is shown in the drawing. In this example, the part characterized by the invention is constituted by: arms 33 as means for holding a cartridge; an arm turning motor M2 driver 31 and a motor M2 (32) as means for turning the arms; belts 30 as means for carrying the cartridge; a belt driving motor M1 driver 28 and a motor M1 (29) as means for driving the belts; a sensor S1 (24) and a sensor S2 (25) as means for monitoring if carriage of the cartridge is completed; a CPU 21, a ROM 22 and a RAM 23 as means for controlling carriage of the cartridge.

The ROM 22 has a control programs for carrying the cartridge therein, and the RAM 23 stores various setting data used for controlling carriage, data indicating monitoring states supplied from the sensors and others therein.

The CPU 21 controls carriage of the cartridge on the basis of the control program stored in the ROM 22 and is similarly provided in the magnetic tape unit as in the prior art.

That is, the sensor S1 (24) and the sensor S2 (225) are provided for monitoring if the cartridge is adequately inserted into the carrier, while a sensor S3 (26) and a sensor S4 (227) are used for detecting the rotational position of the arm turning motor M2.

These sensors are disposed in the auto-loader at positions suitable for monitoring and detecting operations.

Also, as these sensors, optical sensors consisting of light emitting portions and light receiving portions may be preferably used.

A reference numeral 28 designates the belt driving motor M1 driver used for rotating the motor M1 (229) for driving the belts (30).

In this example, the belt driving motor M1 driver (228) is provided within the magnetic tape unit 52 illustrated in FIG. 9, and the motor M1 (29) and the belts 30 are disposed to the arms 33 as shown in FIG. 10.

A reference numeral 31 denotes the arm turning motor M2 driver used for driving the motor M2 (32) for turning the arms 33.

Here, the arm turning motor M2 driver 31 is provided within the magnetic tape unit 52 illustrated in FIG. 9, and the motor M2 (32) and the arms 33 are disposed in the carrier 53.

A reference numeral 34 represents a carrier moving motor driver used for driving the motor 35 which moves the carrier 36 in the vertical and horizontal directions.

In this instance, the carrier moving motor driver 34 is provided within the magnetic tape unit 52, and the carrier moving motor 35 and the carrier 36 are disposed within the auto-loader 51.

As mentioned above, the respective sensors 24 to 27, the respective motors 29, 32 and 35, the belts 30 driven by the various motors, the arms 33 and the carrier 36 are arranged in the auto-loader 51, while the CPU 21, the ROM 22, the RAM 23, and the respective drivers 28, 31 and 34 are provided in the magnetic tape unit 52.

Further, the auto-loader 51 and the magnetic tape unit 52 are connected to each other through non-illustrated connectors and cable.

The structure of the cartridge carrying system according to the present invention is as described above, and the CPU 21 drives the respective motors for moving the belts, the arms and the carrier in accordance with monitoring signals and detection signals from the sensors S1 to S4, thereby controlling carriage of the cartridge.

The two arms 33 are so provided at positions as to be opposed to each other as shown in FIG. 10, and the cartridge is fetched or reposited by the opening/closing operation of the arms 33.

The belts 30 are used to carry the cartridge held by the arms 33 into or from the carrier 36.

The carrier 36 fetches the cartridge therein and carries the cartridge to the magnetic tape unit 52 or a magazine 54 provided at a predetermined position.

A method for carrying the cartridge according to the present invention will now be described.

Figure 3:
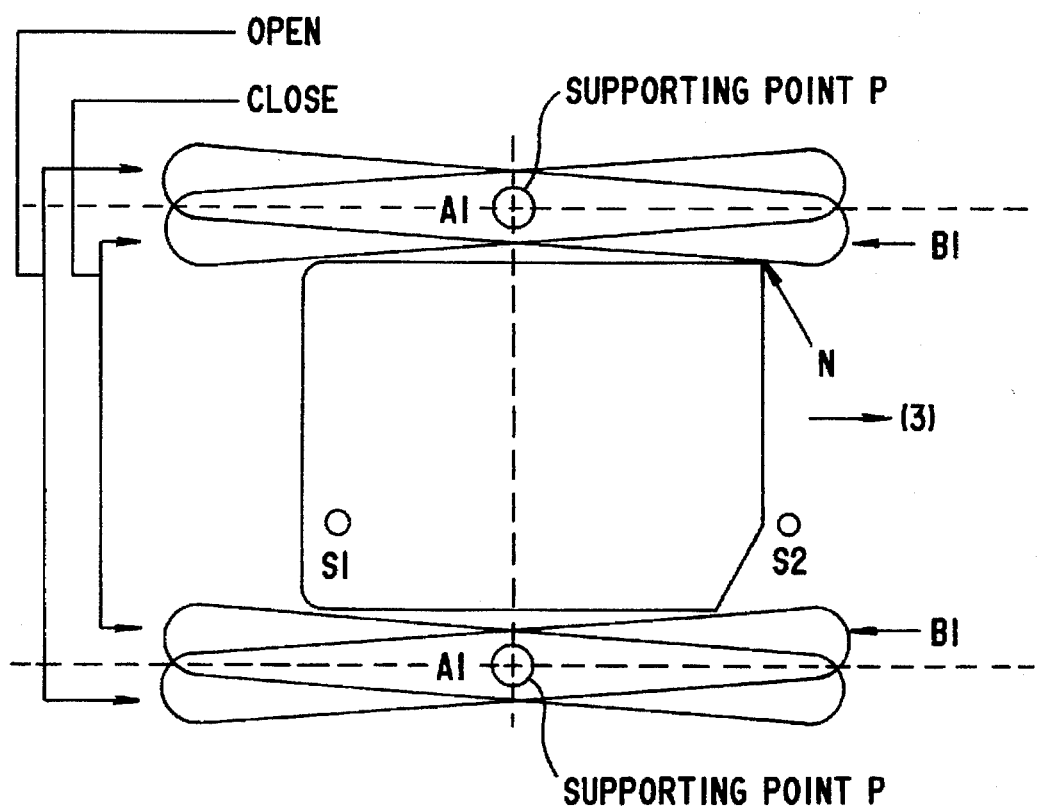
FIG. 3 is a view typically showing drive of arms A1 in the embodiment according to the present invention.

FIG. 3 is a view typically showing the driving state of the arms A1 of the carrier in the embodiment according to the present invention.

Here, the two arms A1 are respectively turned around supporting points P, and the state where ends of the two arms A1 on the left-hand side are inwardly turned to grab the cartridge is referred to as "CLOSE" state. On the other hand, the state where ends of the two arms A1 on the right-hand side are inwardly turned to grab the cartridge is referred to as "OPEN" state.

The embodiment is described hereinbelow as to the case where the cartridge is carried in a direction (3) in FIG. 3, but the cartridge can be also carried in a direction opposed to the direction (3), i.e., from the right-hand side to the left-hand side in the illustration in accordance with the following procedure.

Embodiment A-1

Figure 4:
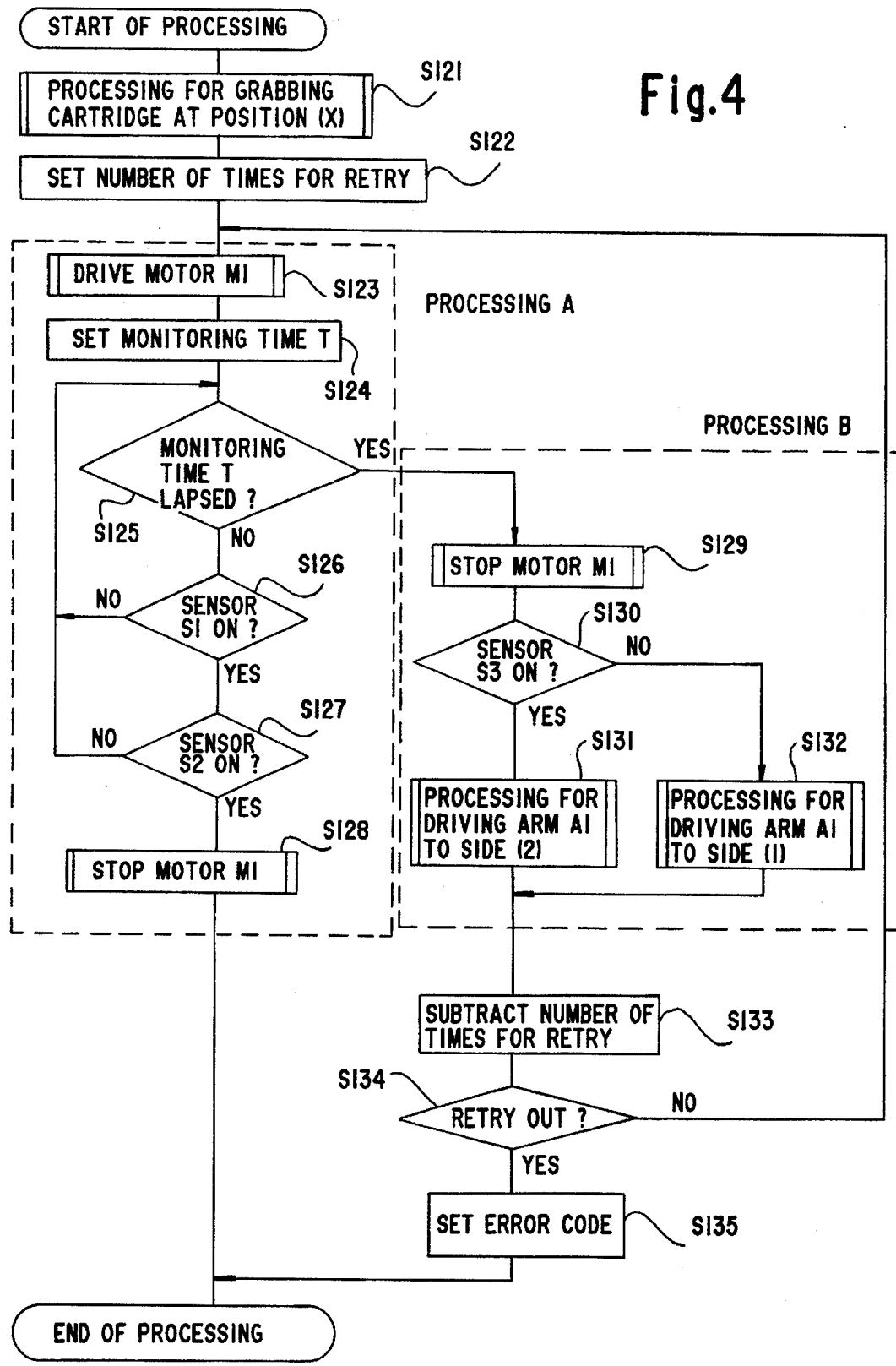
FIG. 4 is a flowchart showing carriage of a cartridge in an embodiment A-1 according to the present invention.

FIG. 4 is a flowchart showing the processing for preventing carriage of the cartridge from being disabled by repeating the opening/closing operation of the arms.

Figure 11:
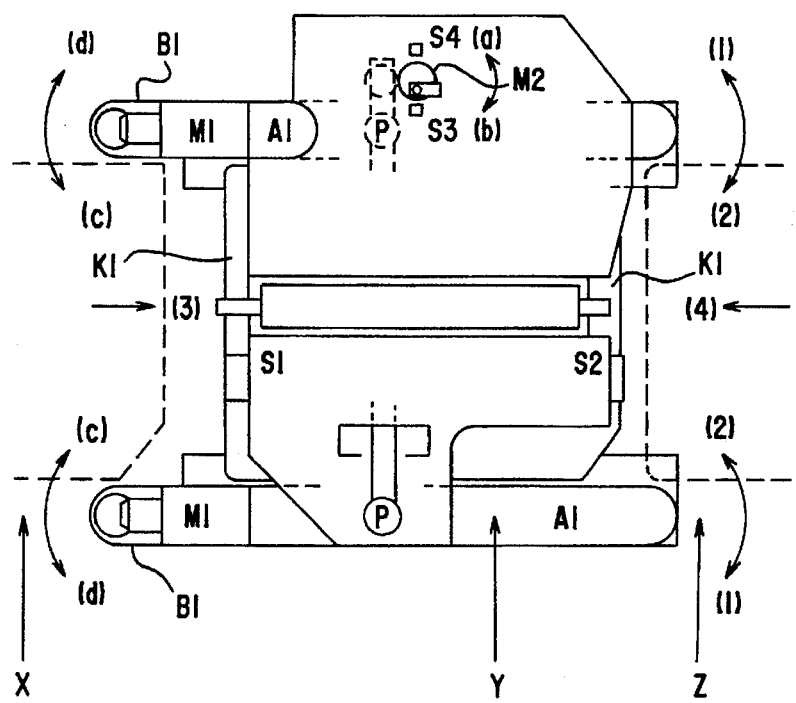
FIG. 11 is an explanatory view showing an example of carriage of a cartridge by a carrier in the prior art.

In the first place, the processing for grabbing the cartridge is carried out if the cartridge is provided at such a position (X) as shown in FIG. 11 (the step S121).

At this time, the CPU 21 first outputs to the carrier moving motor driver 34 a signal directing to move the carrier to the position where the desired cartridge exists.

The carrier moving motor driver 34 drives the carrier moving motor 35 to move the carrier 36 to a position at which the desired cartridge can be taken out in response to the supplied signal.

The CPU 21 then supplies to the arm turning motor M2 driver 31 a signal directing to turn the arms in directions for grabbing the cartridge. That is, rotation of the motor M2 (32) is controlled so that the arms A1 shown in FIG. 3 enter the "CLOSE" state.

As described above, the cartridge placed at the position (X) is grabbed.

In the second place, a number of times for retry is determined in the step S122.

For example, an area for setting a number of times for retry is provided on the RAM 23, and the CPU 21 writes a set value in this area, whereby setting is carried out.

Figure 13:
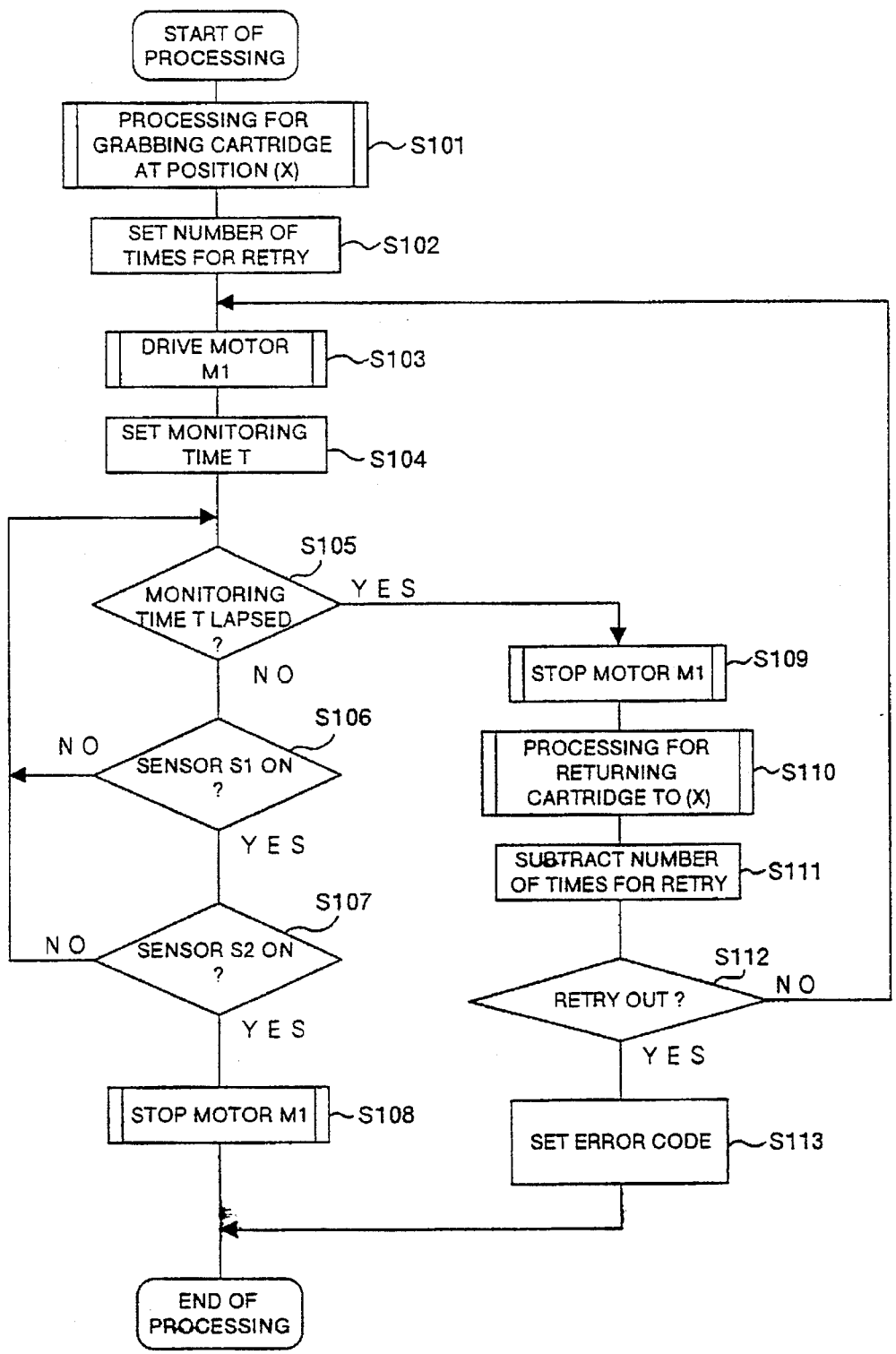
FIG. 13 is a flowchart showing an example of carriage of a cartridge in the prior art.

Next, at the steps S123 through S128, the processing A is executed for monitoring if the cartridge is carried into the carrier, and is the same with that described with reference to FIG. 13.

Namely, the belt driving motor M1 is driven at the step S123.

The motor M1 is driven by supplying a drive signal from the CPU 21 to the belt driving motor M1 driver 28.

Subsequently, the CPU 21 sets a monitoring time (T) in a predetermined area on the RAM 23 (the step S124).

At the step S125, judgment is made upon whether the monitoring time (T) has lapsed. If the monitoring time (T) has not lapsed, the processing advances to the step S126, while if the monitoring time (T) has passed, carriage of the cartridge is considered to be failed and the processing advances to the step S129.

Judgment is made upon whether the sensor S1 has been turned on at the step S126 and whether the sensor S2 has been turned on at the step S127.

If it was found that both the sensor S1 and the sensor S2 entered the ON state at the steps S126 and S127, the cartridge is judged to be correctly inserted into the carrier and the processing advances to the step S128 where the belt driving motor M1 (29) is stopped.

If it was found that either the sensor S1 or the sensor S2 did not enter the ON state, the processing is returned to the step S125 and the sensors S1 and S2 are monitored only for the monitoring time (T).

Figure 12:
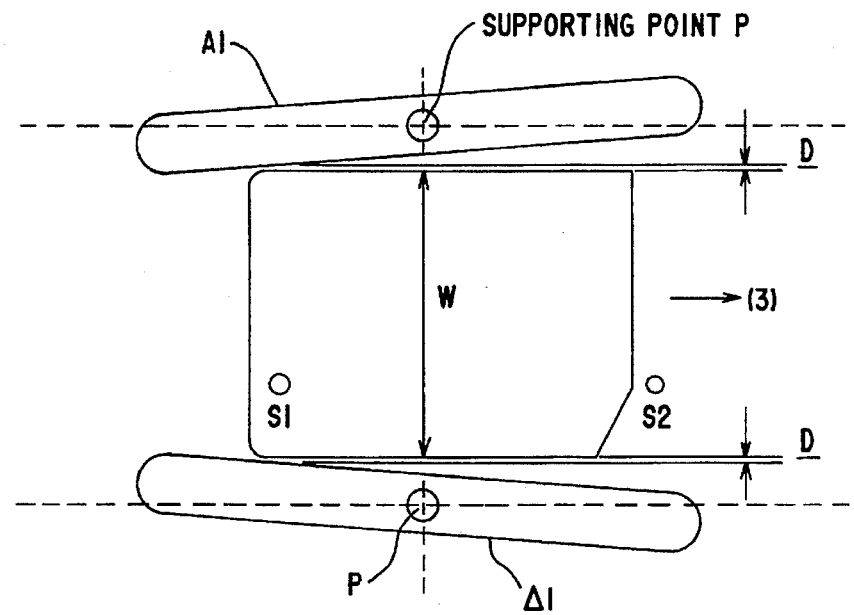
FIG. 12 is an explanatory view showing a case where carriage of cartridge is disabled in the prior art.

If the both or either of the sensors S1 and S2 do not enter the ON state even though the monitoring time (T) has lapsed, carriage of the cartridge is disabled at, e.g., such a position as shown in FIG. 12. In such a case, the belt driving motor M1 (29) is stopped at the step S129.

At the step S130, judgment is then made upon whether the sensor S3 has been turned on. If the sensor S3 is in the ON state, the processing advances to the step S131, while if the sensor S3 is not in the ON state, the processing advances to the step S132.

As described above, the ON state of the sensor S3 means the "OPEN" state in which the ends of the arms A1 on the right-hand side are closed and, on the other hand, the ON state of the sensor S4 means the "CLOSE" state in which the ends of the arms A1 on the left-hand side are closed.

Since the arms A1 are currently in the "CLOSE" state at the step S131, the control is so carried out as to turn the arms A1 in the directions (2) in FIG. 11 in order to realize the "OPEN" state of the arms A1.

That is, the CPU 21 sends to the arm turning motor M2 driver 31 a drive signal directing to turn the arms A1 in the directions (Z) so that the motor M2 is rotated in the direction (b) shown in FIG. 11.

Since the sensor S3 is thereafter turned off and the arms A1 enter the "OPEN" state when the sensor S4 is turned on, rotation of the motor M2 (32) is stopped when the sensor S4 is turned on.

Further, the motor M1 (29) is driven to activate the belts B1 so that the cartridge is carried in the direction (3). If the tip of the cartridge on the right-hand side is brought into contact with the belt B1 at a point (N) as shown in FIG. 3 when the arms A1 have entered the "OPEN" state, the cartridge is carried by the belts B1 in the direction (3).

At the step S132, since the arms A1 are not in the "CLOSE" state, the control for attaining the "CLOSE" state of the arms A1 is effected.

Namely, the motor M2 is rotated in the direction (a) shown in FIG. 11 until the sensor S3 is turned on so that the arms A1 enter the "CLOSE" state.

Furthermore, the motor M1 (29) is driven to operate the belts B1 so that the cartridge is carried in the direction (3).

As similar to the step S1 31, if a contact point is made between the cartridge and the belt B1 when the arms A1 are in the "CLOSE" state, the cartridge is carried by the belts B1 in the direction (3).

The set number of times for retry is subjected to subtraction at the step S133, and judgment is made upon whether the number of times for retry is 0 and repetition of the processing for the set number of times for retry is completed at the step S134.

If the number of times for retry is not 0, the processing is returned to the step S123 where the arms A1 are driven to repeatedly enter the "OPEN" state and the "CLOSE" state.

If the number of times for retry is 0, the processing advances to the step S135 where an error code is set at a predetermined position on the RAM 23, thereby completing the processing.

As mentioned above, since the control by which the arms A1 alternately enter the "OPEN" and "CLOSE" states is effected to continue carriage of the cartridge, it is possible to find a contact point between the cartridge and the belts B1 disposed around the arms A1 and to attain carriage of the cartridge more successfully as compared with the prior art carrying method.

In addition, since the motors M1 and M2 are driven and stopped only if necessary, troubles which may occur in the control unit can be greatly reduced as compared with other embodiments that will be described later, whereby this embodiment has an effect on the lifetime of the unit.

Embodiment A-2

Figure 5:
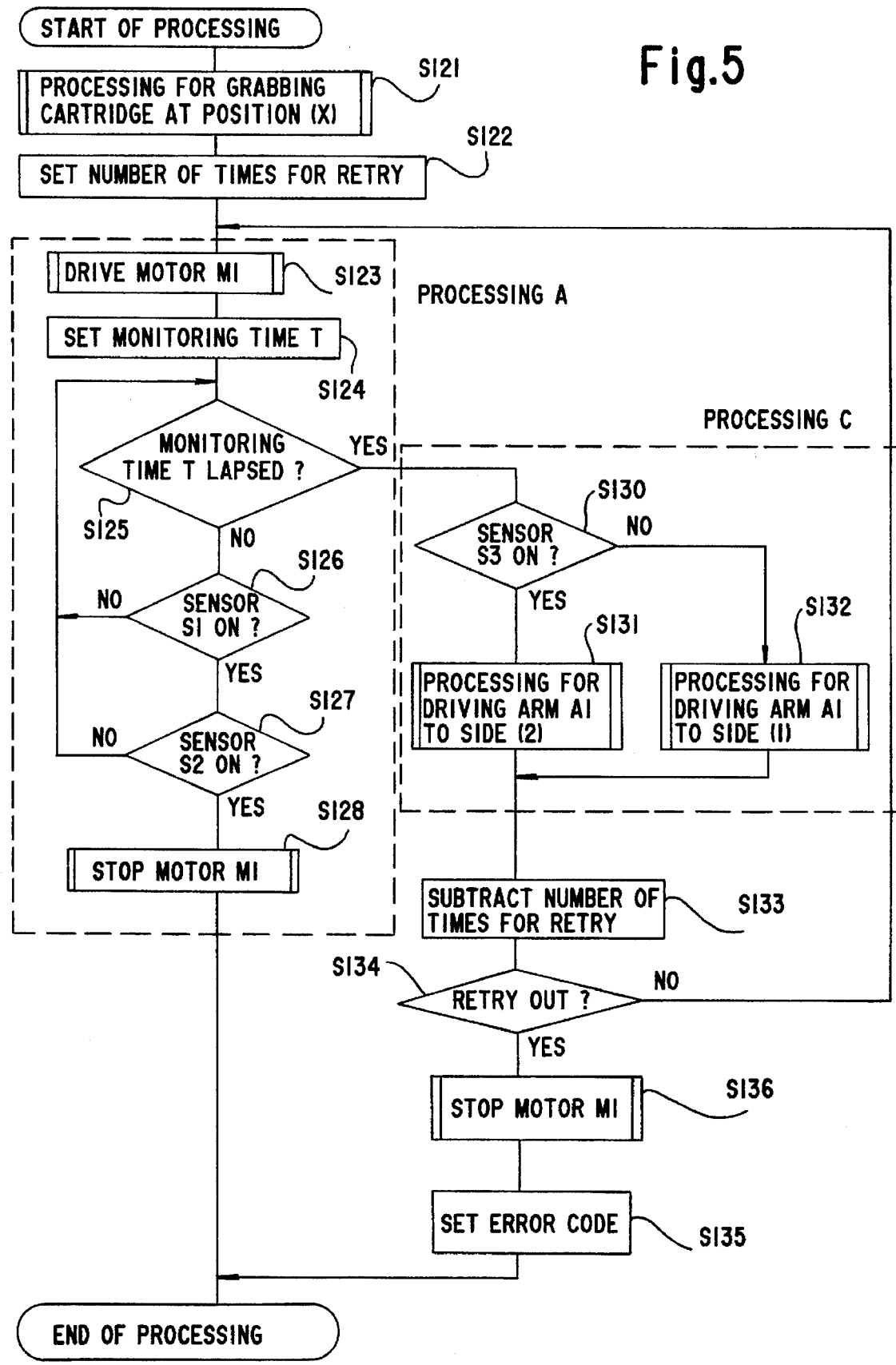
FIG. 5 is a flowchart showing carriage of a cartridge in an embodiment A-2 according to the present invention.

FIG. 5 is a flowchart showing that the control by which the arms A1 alternately enter the "OPEN" and "CLOSE" states is similarly repeated as in the embodiment A-1 without stopping the belt driving motor Here, in FIG. 5, like reference numerals of the steps denote like or corresponding operations shown in FIG. 4.

Although the processing at the steps S121 through S128 is the same with that in the embodiment A-1, the processing at the step S129 for stopping the belt driving motor M1 is not carried out after the lapse of the monitoring time at the step S125 in this example, as different from the embodiment A-1.

That is, the arms A1 are turned in the directions (1) or (2) while keeping operation of the belts without stopping the driving operation of the motor M1 for carrying the cartridge in the direction (3) (the steps S130 through S132).

At this time, if a part of an end face of the cartridge is brought into contact with the belts B1 before the arms A1 are turned into the "OPEN" state from the "CLOSE" state or into the "CLOSE" state from the "OPEN" state, the cartridge can be carried into the direction (3). Accordingly, the cartridge can be more efficiently carried as compared with the embodiment A-1.

Embodiment A-3

Figure 6:
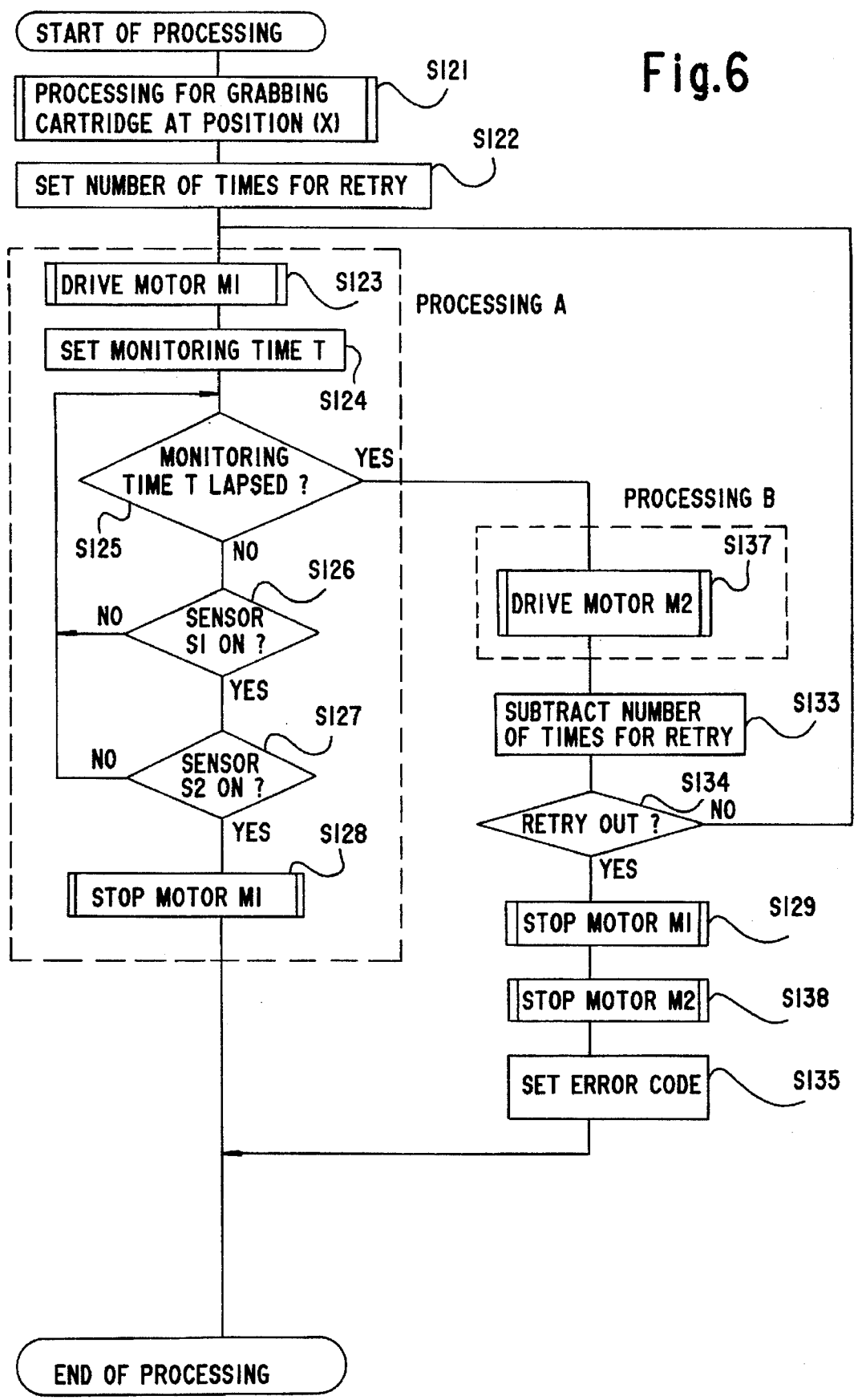
FIG. 6 is a flowchart showing carriage of a cartridge in an embodiment A-3 according to the present invention.

FIG. 6 is a flowchart showing the case where the control for carrying the cartridge in the direction (3) is performed while keeping the motors M1 and M2 driving.

The processing A in this drawing corresponds to the processing at the steps S123 through S128 in FIG. 4.

If the monitoring time (T) has lapsed at the step S125, the processing proceeds to the step S137. At the step S137, the arm turning motor M2 is driven.

Here, the motor M2 may be rotated in either direction (a) or (b) in FIG. 11, and the arms A1 alternately enter the "OPEN" state and the "CLOSE" state by keeping the motor M2 rotating in either direction.

Further, since the belt driving motor M1 has been already driven in the processing A, the cartridge is carried in the direction (3) with the both motors M1 and M2 being driven.

Irrespective of the rotating direction of the motor M2, if a contact point is made between the cartridge and the belts B1 in the middle of the opening/closing operation of the arms A1, the cartridge is carried in the direction (3), thus enabling efficient carriage of the cartridge.

Embodiment A-4

Figure 7:
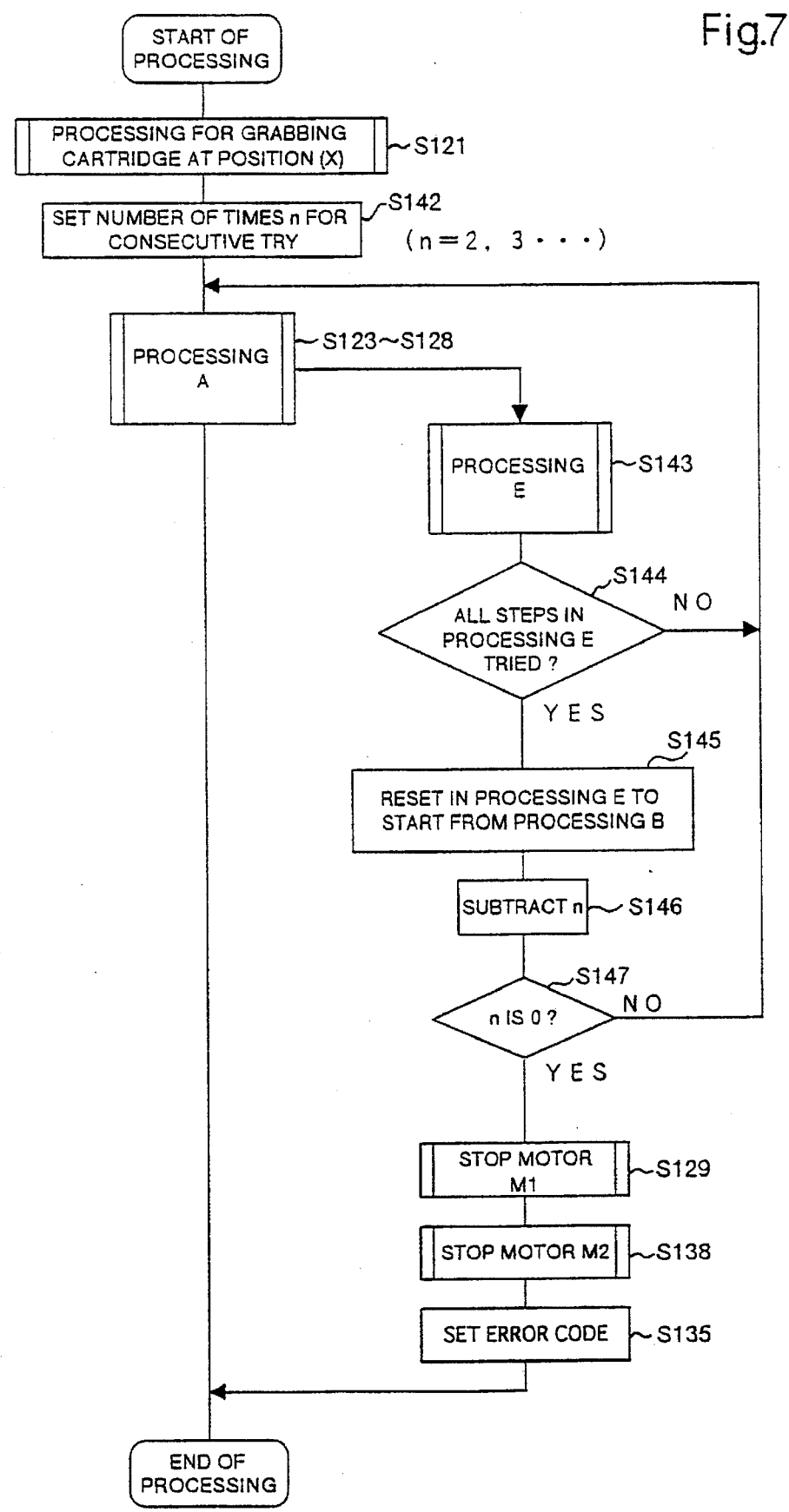
FIG. 7 is a flowchart showing carriage of a cartridge in an embodiment A-4 according to the present invention.
Figure 8:
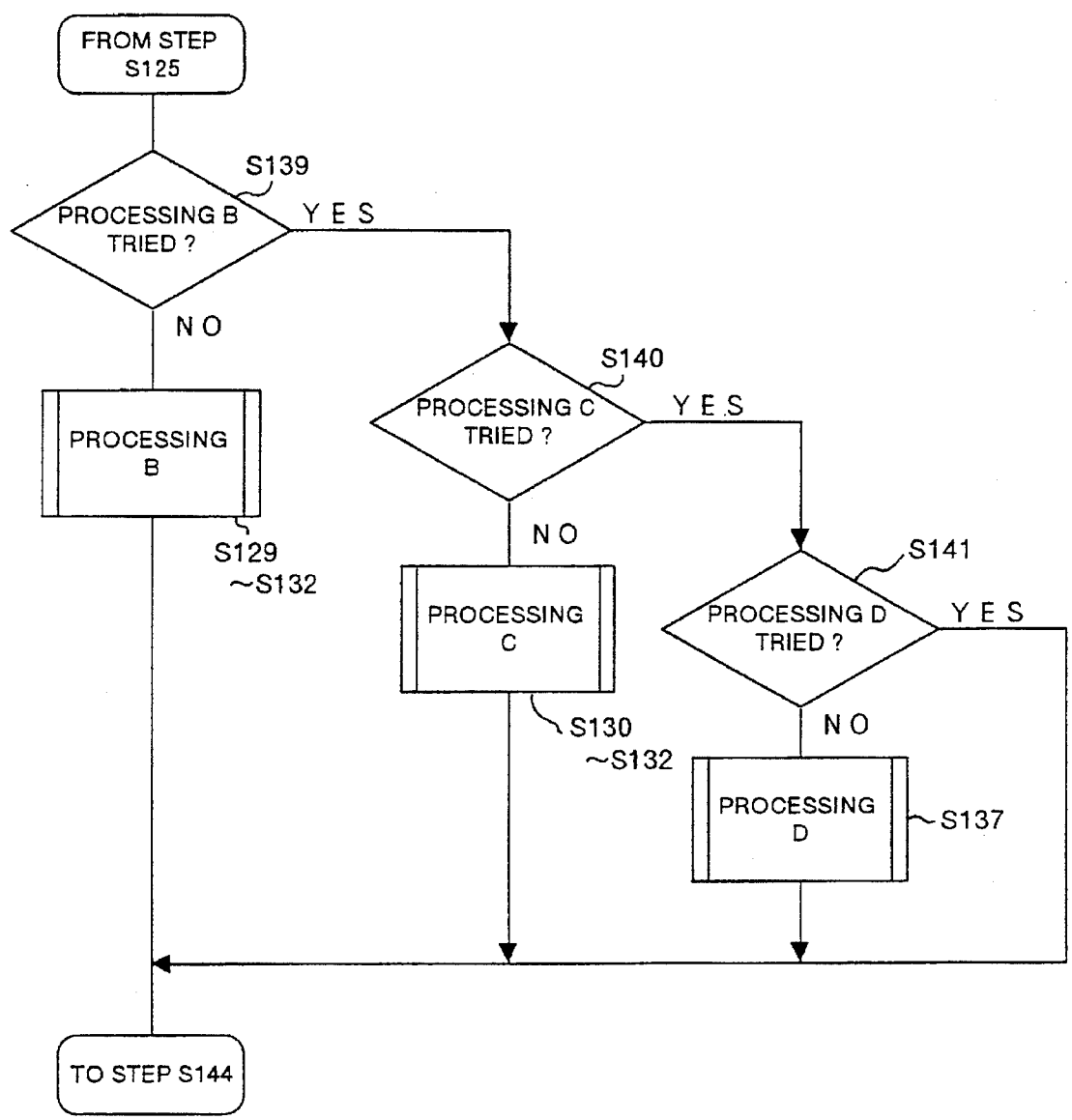
FIG. 8 is a detailed flowchart showing a processing E in the embodiment A-4 according to the present invention.

FIGS. 7 and 8 are a flowchart showing an example of the processing which is a combination of the above-described embodiments A-1, A-2 and A-3.

The flowchart of the embodiment A-4 illustrates the following method: Namely, the method of the embodiment A-1 is first tried and, if carriage of the cartridge is failed, the method of the embodiment A-2 is tried. Then, if this carriage of the cartridge is failed, the method of the embodiment A-3 is further tried. The specific flow of this method is shown in FIG. 8.

However, the combination of the embodiments A-1, A-2 and A-3 is not restricted to this method, and it may be possible to employ various combined use of the embodiments. For example, the embodiment A-1, A-2 and A-3 may be sequentially used until carriage of the cartridge is successfully completed, only the embodiments A-1 and A-2 may be used, or only the embodiments A-2 and A-3 may be used.

At the step S142, a number of times n for repeating the processing E (the step S143) for carrying the cartridge is determined.

At the step S143, it is judged if all the steps within the processing E are tried at the step S144 after the processing E for carrying the cartridge is performed. If all the steps are not completed, the processing is returned to the processing A, while if all the steps are completed, the processing advances to the step S145.

At the step S145, initialization is performed so that all the steps are again carried out within the processing E.

Subsequently, the number of times n for consecutive tries is subjected to subtraction, and judgment is made upon whether n=0, i.e., whether carriage of the cartridge is controlled the set number of times at the step S147. When the control is not yet carried out the number of times, the processing is again returned to the processing A. If carriage of the cartridge is not completed normally even though the control is repeatedly carried out the set number of times, the motor M1 is stopped (the step S129); the motor M2 is stopped (the step S138); and the error code is set (the step S135), thereby completing the processing.

FIG. 8 is the detailed flowchart showing the processing E (the step S143), wherein the cartridge carrying control at the steps S129 to S132 of the processing B in the embodiment A-1 is first performed if the both sensors S1 and S2 are not turned on even though the monitoring time (T) has lapsed after the belts B1 were driven.

Thereafter, the processing proceeds to the step S144 to again repeat the processing A. However, if the both sensors S1 and S2 are not turned on during the monitoring time (T) at this step, the cartridge carrying control of the processing C (the steps S130 to S132) in the embodiment A-2 is effected. Then, the processing similarly advances to the step S144 to repeat the processing A. Further, if the both sensors S1 and S2 are not turned on during the monitoring time (T) at this step, the cartridge carrying control of the processing D (the step S137) in the embodiment A-3 is performed.

As mentioned above, combined use of the embodiments A-1, A-2 and A-3 enables increase in the number of times for producing the contact plane between the cartridge and the belts, resulting in successful carriage of the cartridge. Further, since the appropriate control for carriage is performed in accordance with the type of the cartridge or errors of the dimension, the cartridge can be carried.

Furthermore, since the carriage controls in the embodiments A-1, A-2 and A-3 are sequentially tried, such an excessive control as that complicated control and drive of the motor for carriage in the processing (C, D) of the embodiments A-2 and A-3 are not necessary in the case where carriage of the cartridge is possible only by the processing B of the embodiment A-1, thus prolonging the lifetime of the entire system.

According to the present invention, since the controlling means controls the arm turning means and the carriage driving means so that the operation for carrying the cartridge to a predetermined position is continuously performed, carriage of the cartridge can be successfully improved as compared with the prior art.

Further, since the arm turning means controls in such a manner that it turns the arms in directions opposed to those in which the arms are turned for grabbing the cartridge and the cartridge is thereby grabbed by the other end of each of the two arms to be carried, the contact plane can be made between the cartridge and the carrying means, thus successfully improving carriage of the cartridge.

Furthermore, since the arm turning means controls in such a manner that it turns the arms in directions opposed to those in which the arms are turned for grabbing the cartridge and the cartridge is thereby grabbed by the other end of each of the two arms to be carried while keeping the carrying means driving, the contact plane can be made between the cartridge and the carrying means, thus successfully improving carriage of the cartridge.

Moreover, since the control is effected in such a manner that the first turning operation of the arm turning means by which the two arms are so turned as to grab the cartridge at one end of each of the two arms and the second turning operation of the arm turning means by which the two arms are so turned as to grab the cartridge at the other end of each of the two arms are alternately repeated while keeping the carrying means driving, a number of times for producing the contact plane between the cartridge and the carrying means can be increased, thereby successfully improving carriage of the cartridge.

2. Library System (Having an Accessor Control Function for Eliminating the Gap State)

The present invention provides a library system for automatically replacing the cartridge, comprising: a driven type repository constituted by a plurality of cells for storing a plurality of cartridges, respectively; an accessor accommodating an hand portion for taking out or storing the cartridge from or into each of the cells; and gap detecting means for detecting occurrence of the gap state in which the cartridge can not be taken out, wherein micro-vibrations are imparted to the accessor or the driven type repository and the hand portion is so controlled as to be returned to a predetermined position within the accessor when the gap state is detected by the gap detecting means.

Figure 35:
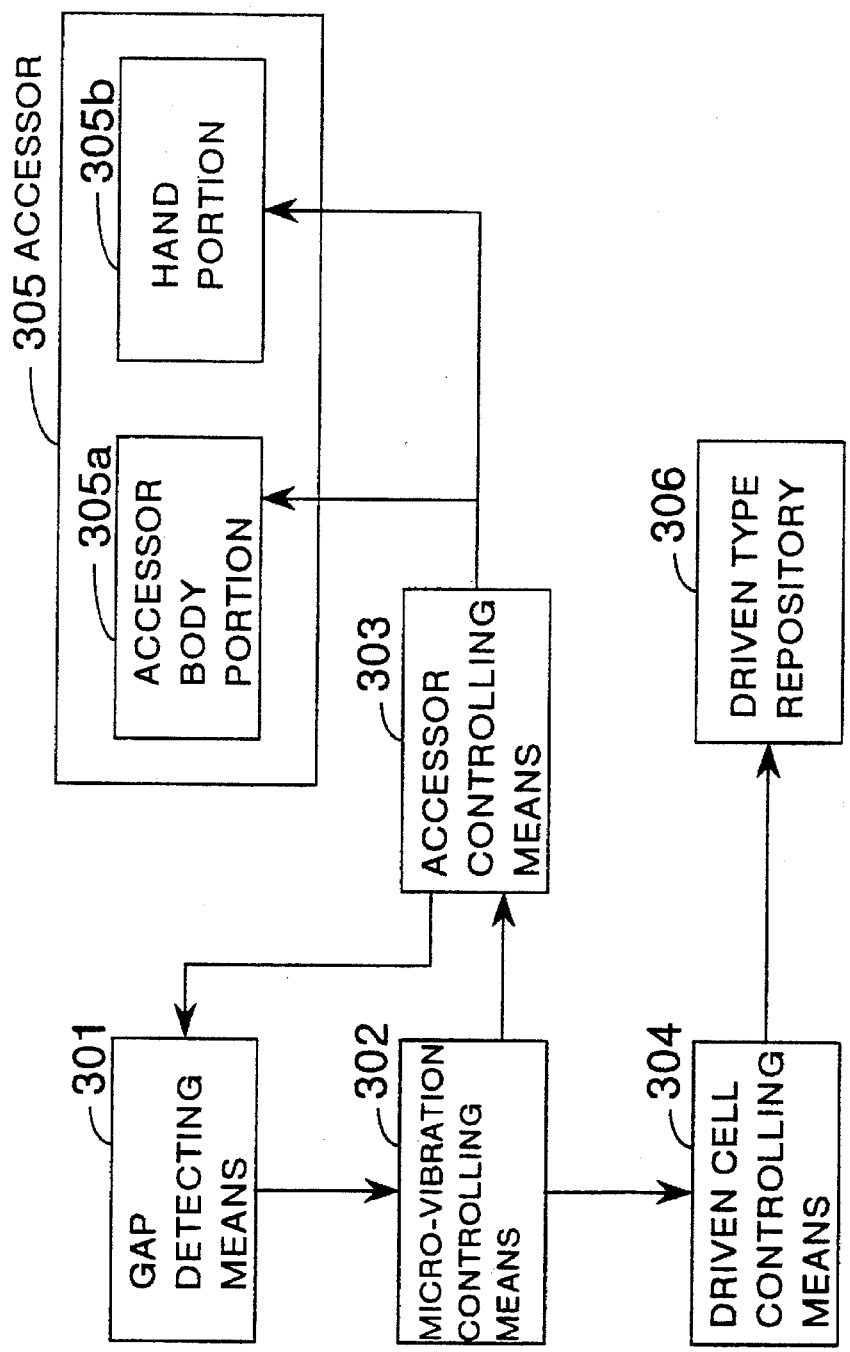
FIG. 35 is a block diagram showing a basic structure of the present invention.

FIG. 35 is a block diagrams showing a basic structure of the library system which can realize the accessor control function according to the present invention.

In the drawing, the present invention provides a library system for automatically replacing the cartridge, comprising: a driven type repository 306 constituted by a plurality of cells for storing a plurality of cartridges, respectively; driven cell controlling means 304 for driving the repository 306; an accessor 305 consisting of a hand portion 305b for taking out or storing a cartridge from or into each of the cells and an accessor body portion 305a which accommodates the hand portion 305b and carries the cartridge; accessor controlling means 303 for driving the accessor body portion 305a and the hand portion 305b; gap detecting means 301 for detecting occurrence of a gap state in which the cartridge can not be taken out on the basis of the operation state of the accessor 305 or the information supplied from the accessor controlling means 303; and micro-vibration controlling means 302 for directing the accessor controlling means 303 or the driven cell controlling means 304 to impart micro-vibrations, wherein if the gap state is detected by the gap detecting means 301 when taking out or storing the cartridge by the accessor 305, the library system controls in such a manner that: the micro-vibration controlling means 302 supplies to the accessor controlling means 303 or the driven cell controlling means 304 information directing to impart micro-vibrations; the accessor controlling means 303 or the driven cell controlling means 304 imparts micro-vibrations corresponding with the directed information to the accessor 305 or the driven type repository 306; and the accessor controlling means 303 so controls as to return the hand portion 305b to a predetermined position within the accessor body portion 305a at which the hand portion 305b is accommodated.

In this example, the repository 306 is, for example, a driven type repository (driven cells) which has a cylindrical shape and on which a plurality of cells are provided.

Further, the repository 306 may be preferably so configured as to rotate around a central shaft of the cylinder. However, the driven cells are not restricted to this cylindrical shape.

Furthermore, as the repository 306, a fixed type repository (fixed cells) whose installation position is fixed may be used.

In case of using the fixed cells, since the position is fixed so that the cells can not be driven, the driven cell controlling means 304 is no longer necessary.

The driven cell controlling means 304 may be preferably constituted by motors and belts.

The hand portion 305b may be preferably so configured as to grab the cartridge accommodated in each of the cells.

The accessor body portion 305a accommodates the hand portion 305b therein and is used for carrying the cartridge grabbed by the hand portion to a different position.

The accessor controlling means 303 controls movement of the accessor body portion 305a and the hand portion 305b and may be preferably composed of, e.g., motors, belts and accessor moving rails.

It is configured that a motor constituting the accessor controlling means 303 outputs information corresponding with a number of revolutions and a rotating speed of the motor to the gap detecting means 301. The gap detecting means 301 and the driven cell controlling means 304 are made up of, CPUs, ROMs, RAMs, I/O controllers, D/A controllers and others, and so-called microcomputers and peripheral devices thereof may be preferably used.

The gap state described herein means such a disadvantageous state as that the cartridge can not be taken out or reposited from or into a desired cell. In particular, it means such a state as that the hand portion is inserted into the cell and then tried to be pulled into the accessor body portion while holding the cartridge but fails, and the cartridge can not be also returned to an original position within the cell.

It is possible to judge occurrence of such a gap state by detecting that the hand portion can not be returned to a predetermined position within the accessor body portion even though a given time lapses.

Detection of the gap state can be realized by, for example, providing within the accessor a photoelectric sensor for detecting that the hand portion 305b is placed at a predetermined position within the accessor body portion 305a or by constantly monitoring that information indicating that the hand portion 305b is returned to a predetermined position can not be obtained by using information supplied from the motor for moving the accessor. However, the detection system is not restricted these type.

The micro-vibration controlling means 302 is used for imparting micro-vibrations to the accessor 303 or the driven type repository 306, and the micro-vibration given in this example means to alternately move the accessor 303 or the driven type repository 306 in a predetermined direction and a direction opposed thereto.

The predetermined direction may be, for example, any of the horizontal direction (right and left directions) in terms of the driven cells, and the horizontal direction, the vertical direction (upward and downward directions) or the horizontal rotating direction in terms of the accessor, but the direction is not restricted to them.

The present invention will now be described in detail hereinbelow with reference to illustrated embodiments. Note that the present invention is not restricted by these embodiments.

Figure 36:
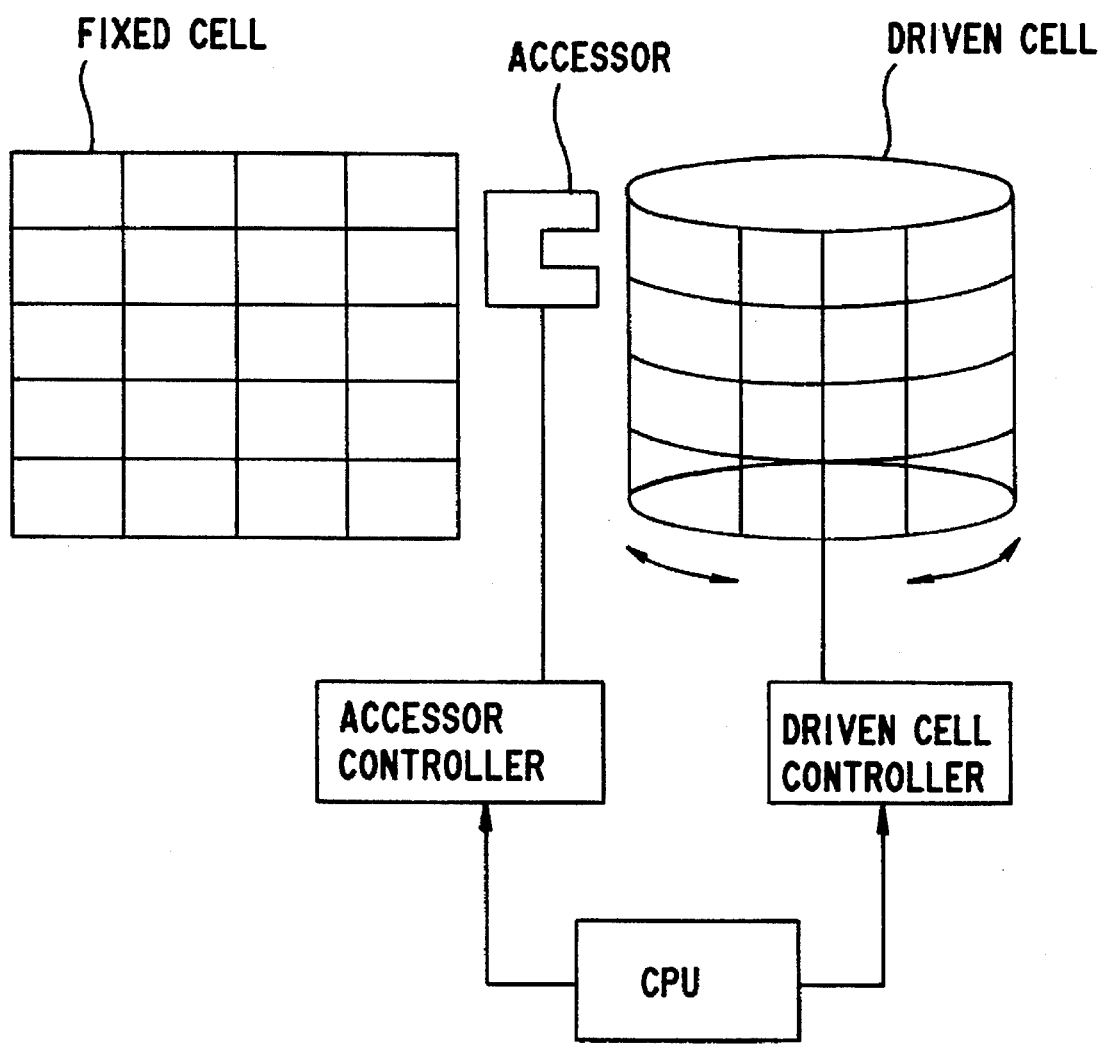
FIG. 36 is a schematic view showing a structure of a library system according to the present invention.

FIG. 36 schematically shows the structure of one embodiment according to the present invention.

Here, in the first place, description will be given as to the structure required for eliminating the so-called gap state, and the method for eliminating the gap state which is characteristic of the present invention will be explained later.

Referring to FIG. 36, a repository for accommodating cartridges is made up of two repositories, one of which consists of fixed cells 315 whose positions at which the cells are installed are fixed and the other of which consists of driven cells 316 which have a cylindrical shape and can rotate around its rotating shaft.

Although this embodiment employs the two repositories, a number of repositories may be one, three or more.

A reference numeral 31 4 denotes an accessor which has a non-illustrated hand portion and takes out or reposits the cartridge by using the hand portion.

A reference numeral 311 represents a CPU which controls an accessor controller 312 and a driven cell controller 313 and executes a function as a library system.

Further, the CPU 311 directs micro-vibrations for the accessor 314 and the driven cells 316.

The accessor controller 312 is used for controlling movement of the accessor itself and operation of the hand portion and constituted by a motor, a D/C converter, belts and others.

The driven cell controller 313 controls rotation of the driven cells and is made up of a motor, a D/C converter, belts and others.

In this embodiment, when taking out the cartridge placed at a given position in the fixed cells by using the accessor, the CPU directs the accessor controller 312 to move the accessor to a cell in which the cartridge exists.

After the accessor controller 312 has moved the accessor to the desired cell, the CPU 311 directs to insert the hand portion into the cell to take out the cartridge therefrom.

Further, when taking out the cartridge placed in any of the driven cells 316, the CPU 311 gives the similar instruction to the accessor controller 312 and directs the driven cell controller 313 to move a desired cell so as to face the accessor.

The direction to insert the hand portion into the cell for taking out the cartridge is then given to the accessor controller 312.

When the CPU 311 performs the above-mentioned control, if the accessor 314 and the cell in which the cartridge exists have the appropriate positional relation predetermined during the designing process or the installation process, the cartridge can be taken out or reposited without causing any problem. However, if this positional relation is not appropriate, there may occur such a state as that the cartridge was grabbed but it can not be put into the accessor or that reposition of the cartridge into the cell was tried but the cartridge comes into contact with the wall surface of the cell and is thereby caught, namely, the gap state.

The present invention is characterized in that, if such a disadvantageous state occurs, this state is eliminated to enable continuous carriage of the cartridge.

The embodiment for eliminating the gap state will be explained hereinbelow.

Figure 37:
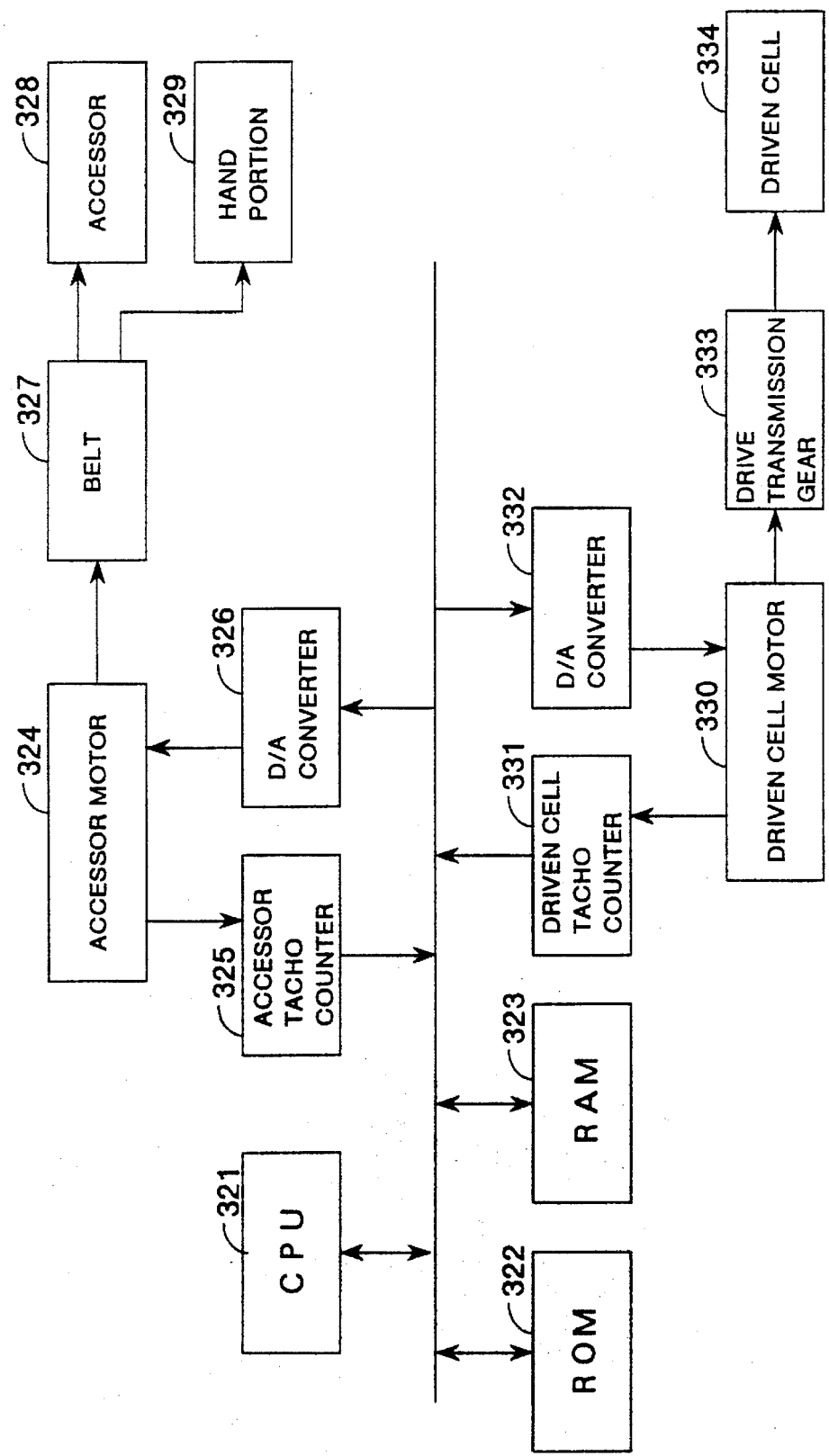
FIG. 37 is a block diagram showing a structure of a part relating to the control of the library system according to the present invention.

FIG. 37 is a block diagram showing the structure of a part relating to the control of the library system according to the present invention.

A reference numeral 321 designates a CPU; 322, a ROM; and 323, a RAM. The CPU 321 controls the accessor by reading or writing necessary information from or into the RAM 323 in accordance with the control program provided in the ROM1 322, thereby realizing automatic carriage of the cartridge.

A reference numeral 324 denotes an accessor motor which drives an accessor 328 and a hand portion 329 through a belt 327. Usually, as the motor 324, it is preferable to separately provide two different motors for driving the accessor 328 and the hand portion 329.

The belt 327 transmits rotation of the motor to the accessor 328 and the hand portion 329. The belt 327 is not restricted to one type described herein and may be any of chains, gears or other transmission mechanisms.

A reference numeral 326 represents a D/A converter which subjects the rotation control information supplied from the CPU 321 to the accessor motor 324 to D/A conversion and transmits the thus converted information to the accessor motor 324.

A reference numeral 325 designates an accessor tachocounter which counts tachopulse signals output from the accessor motor 324. The tachopulse signal used herein is a pulse signal corresponding with a number of revolutions or a rotating speed of the accessor motor 324, and an amount of movement or moving speed of the accessor and the hand portion can be obtained by detecting the pulse signal using the tachocounter 325.

That is, the CPU 321 controls the accessor 328 and the hand portion 329 while monitoring a value counted by the tachocounter 325, and enables the operation for eliminating the gap state. Here, the control with respect to the accessor 328 and the hand portion 329 is the movement control in any of the horizontal direction (right and left directions), the vertical direction (upward and downward directions) and the frontward and backward directions.

Further, when the driven cells 334 are used, a driven cell motor 330, a D/A converter 332, a driven cell tachocounter 331 and drive transmission gear 333 are provided in order to drive the cells.

These members function similarly to those for the accessor, except that the target of the control is the driven cells 334.

Note that the driven cells 334 can be driven only in the horizontal direction, i.e., the right and left directions.

The embodiment of a method for detecting occurrence of the gap state will be first explained.

For example, in the case where the hand portion 329 takes out the cartridge, the hand portion 329 is projected toward inside of the cell.

The accessor motor 324 is rotated when projecting the hand portion 329 and, at this time, the motor 324 outputs a tachopulse signal corresponding with the rotation thereof.

As an example, it is assumed that the accessor tachocounter 325 counts A times tachopulse signals corresponding with the rotation of the motor before the hand portion grabs the cartridge.

While the hand portion 329 keeps grabbing the cartridge, the CPU performs the operation for returning the hand portion toward inside of the accessor.

Here, the accessor motor 324 is rotated in a direction opposed to that in the case where the cartridge is taken out. If the operation for returning the hand portion 329 is normally completed, the accessor tachocounter 325 counts the tachopulse signals the same number of times described above, i.e., A times.

Thus, if the tachopulse signals are not counted A times by the tachocounter 325 after the returning operation was started and a predetermined time has lapsed, the CPU 321 judges that the gap state is generated.

Further, in order to detect occurrence of the gap state, there may be provided a photoelectric sensor or the like for detecting if the hand portion 329 is placed at the normal position within the accessor so that judgment is made upon whether the hand portion 329 can be normally returned to inside of the accessor.

Next, description will be given as to the embodiment in the case where micro-vibrations are imparted to the driven cell when such a gap state has occurred.

Figure 38:
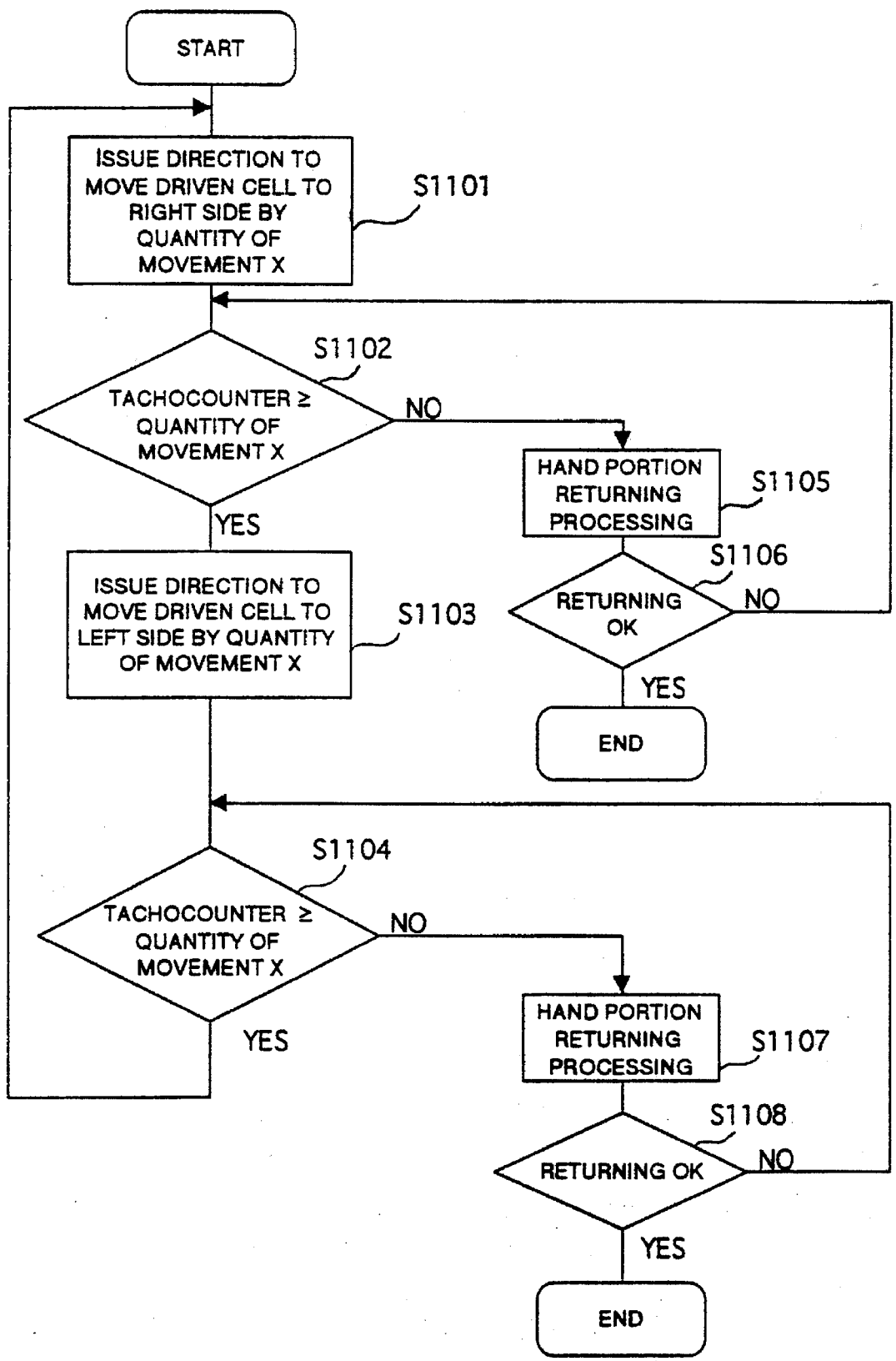
FIG. 38 is a flowchart in the case where micro-vibrations are imparted to the drive cells.

FIG. 38 is a flowchart showing the case where microvibrations are imparted to the driven cell 344.

At the step S1101, the CPU which has recognized that the gap state occurred first issues a direction to move the driven cell 334 toward right-hand side by a quantity of movement X.

That is, the CPU 321 supplies to the D/A converter 332 information corresponding to the quantity of movement X.

As to the value of the quantity of movement X, an optimum value thereof varies depending on a size of each cell, a size of the cartridge, a scale of the positional deviation or others, and hence the appropriate value of the quantity of movement X can not be specified. However, since the control for moving the accessor and the hand portion is carried out in accordance with the unit of mm, it is sufficient to move these members within a range of approximately 1 mm to 100 mm.

The D/A converter 322 then subjects the information to D/A conversion and drives the driven cell motor 330.

Rotation of the driven cell motor 330 involves movement of the driven cell 334 toward the right-hand side through the drive transmission gear 333.

Further, the driven cell tachocounter 331 counts tachopulse signals output from the driven cell motor 330 during movement of the cell toward the right-hand side.

Judgment is made upon whether the count value detected by the driven cell tachocounter 331 is a value corresponding to the quantity of movement X.

That is, it is judged if the driven cell 334 has been moved to the right-hand side by the quantity of movement X.

If it is judged that the driven cell has been moved to the right-hand side by the quantity of movement X, the processing proceeds to the step S1103, and the CPU issues a direction to move the driven cell toward the left-hand side by the quantity of movement X to be placed at an original position of the accessor.

Judgment is made upon whether the count value corresponding to the quantity of movement X of the driven cell 334 toward the left-hand side has been obtained at the step S1104. If this condition is satisfied, the processing is returned to the step S1101 to again impart micro-vibrations.

If the driven cell 334 has not yet been moved by the quantity of movement X at the step S1102, the processing advances to the step S1105 where the processing for returning the hand portion is executed.

In other words, it is tried if the hand portion 329 can be returned to inside of the accessor with slight movement of the driven cell 334 to the right-hand side. In such a case, the hand portion 329 may keep holding the cartridge, but it is preferable to release the cartridge to perform returning operation, thereby successfully improving the returning operation.

The returning operation is carried out by supplying from the CPU to the D/A controller 326 the information concerning the returning operation with respect to the hand portion 329 and the accessor 328.

If the returning operation is successfully effected and the hand portion 329 is returned to a predetermined position within the accessor at the step S1106, the control for eliminating the gap state is completed.

If the hand portion 329 can not be returned to inside of the accessor after lapse of a predetermined time, the processing is returned to the step S1102 to again repeat the micro-vibration imparting operation.

Further, the same returning operation with that at the step S1105 is carried out at the step S1107, and the same judgment with that at the step S1106 is made at the step S1108.

As mentioned above, repetition of slight movement of the driven cell 334 in the horizontal direction and execution of the returning operation with respect to the hand portion 329 enable elimination of the gap state.

In such a case, the quantity of amplitude of the slight movement or the speed of the slight movement may preferably vary.

For example, the .quantity of movement X' in the horizontal direction for the second time may be slightly large as compared with the quantity of movement X for the first time, or the speed S' of movement for the second time may be slightly increased as compared with the speed S of movement for the first time. In this way, it is preferable to appropriately vary these values if necessary.

Although the pattern of variation can be previously included in the control program, it is preferable to easily change the pattern by setting from an external unit or by changing or adding the program.

Description will now be given as to the embodiment in the case where micro-vibrations are imparted to the accessor while fixing the driven cell 334 when the gap state has occurred.

In this embodiment, the accessor itself is subjected to the micro-vibration and the processing for returning the hand portion is carried out as similar to the case where micro-vibrations are given to the driven cell described with reference to FIG. 38.

Figure 39:
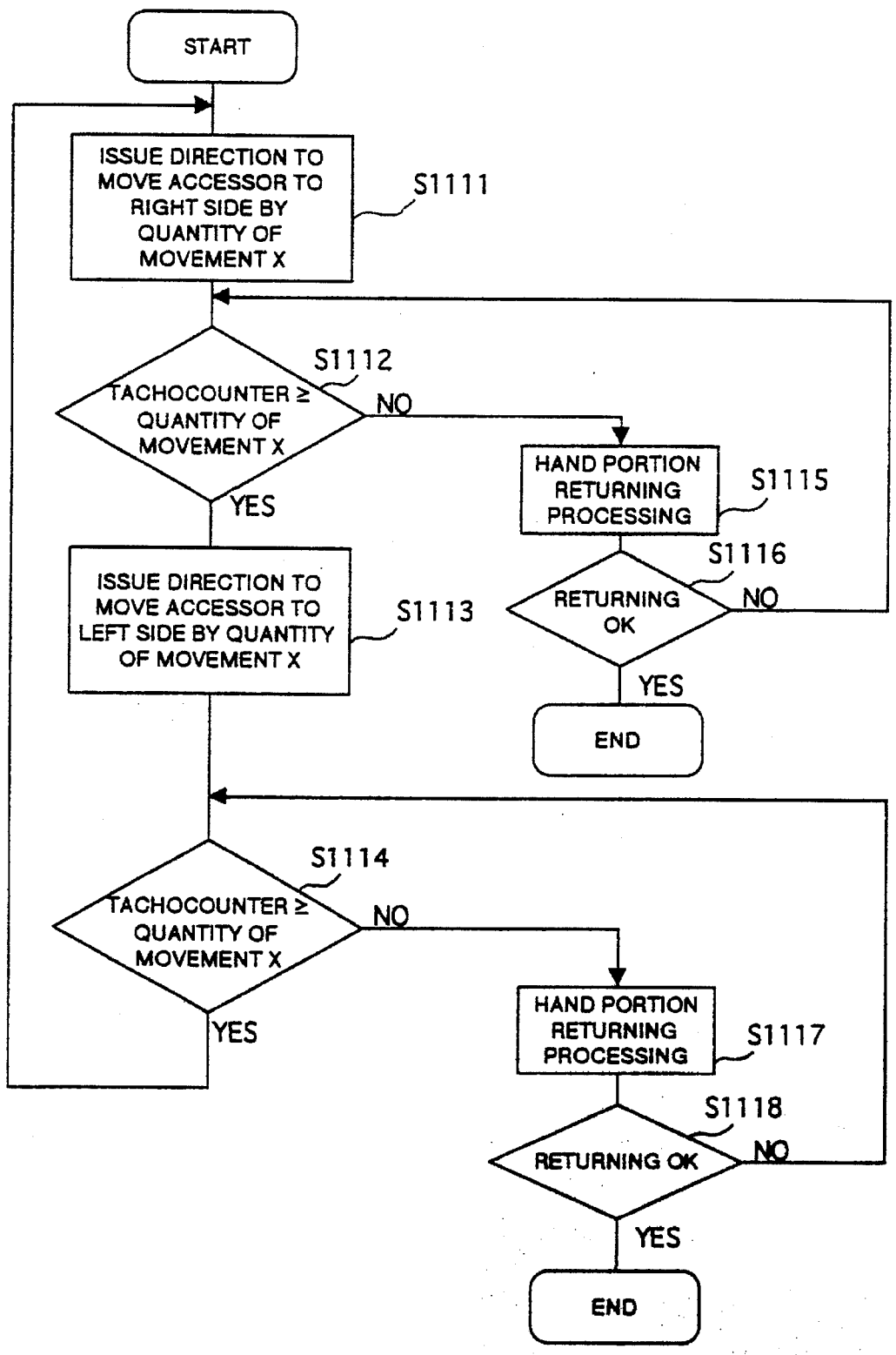
FIG. 39 is a flowchart in the case where micro-vibrations are imparted to the accessor.
Figure 40:
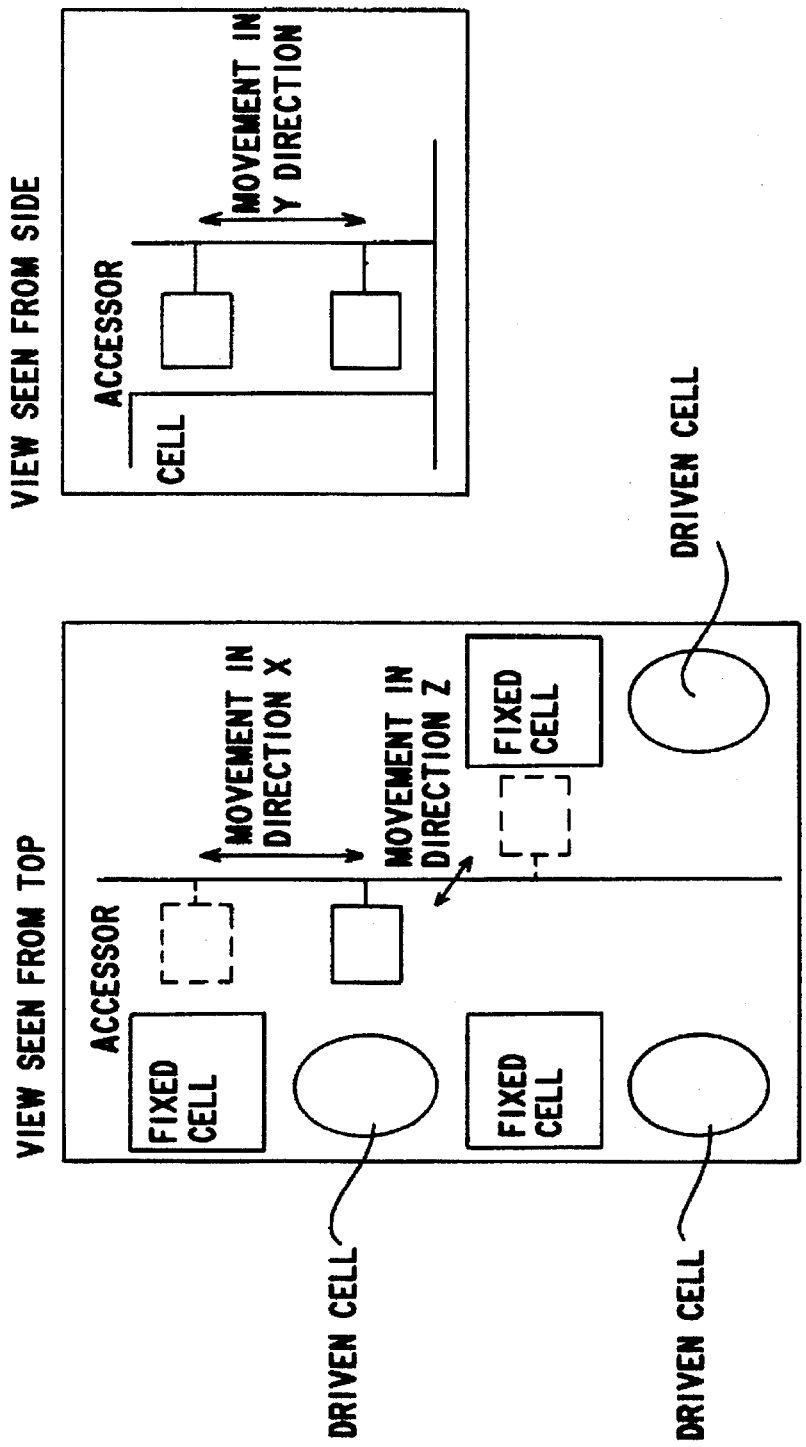
FIGS. 40 are views typically showing a structure of a prior art library system.
Figure 41B:
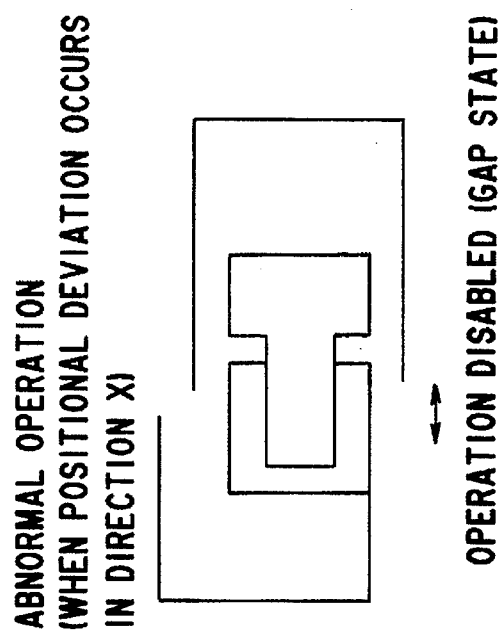
FIGS. 41 (a) and (b) are explanatory views showing a normal operation and an abnormal operation of the accessor.
Figure 41A:
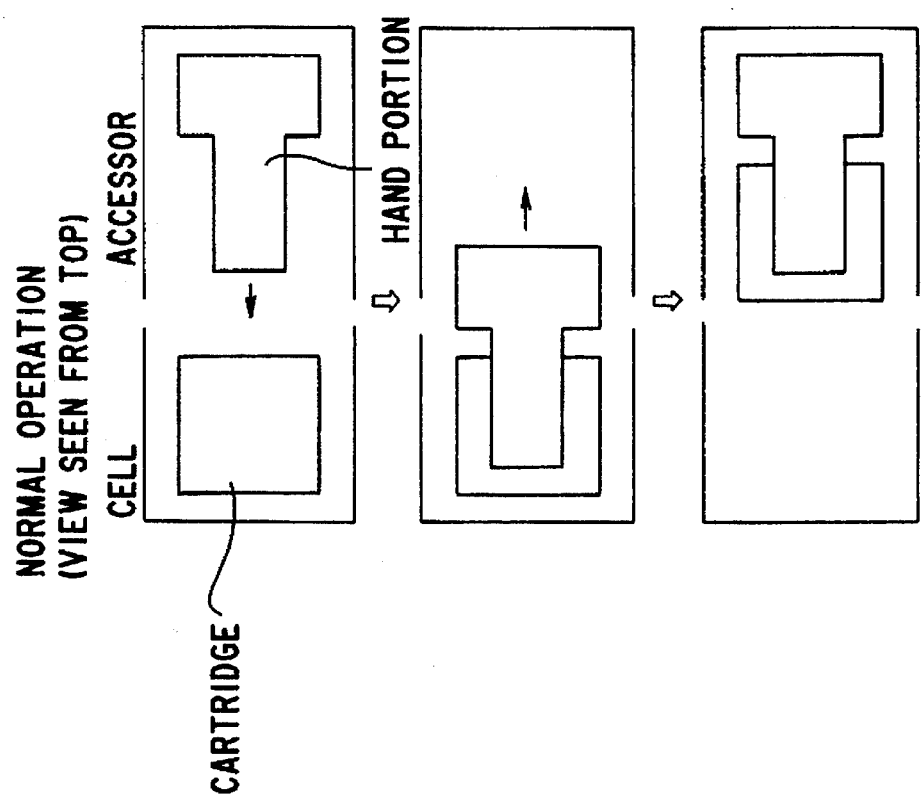

FIG. 39 is a flowchart showing the case where micro-vibrations are imparted to the accessor 328.

It is assumed that the CPU 321 has already detected the gap state before the processing starts.

In this embodiment, the accessor 328 is moved in the right and left directions, namely, the horizontal direction.

This flowchart is substantially the same with the flowchart of FIG. 38 except that the target of movement is the accessor 328 at the steps S1111 and S1113.

According to this flowchart, the direction information is output to the D/A converter 326 in order to slightly move the accessor 328 toward the right-hand side or the left-hand side with the driven cell being fixed, and the accessor motor 324 is driven.

Thereafter, the processing for returning the hand portion is executed during slight movement of the accessor 328 toward the right-hand side or the left-hand side, and the operation for eliminating the gap state is repeated.

Description has been given as to the embodiment in the case where micro-vibrations are imparted to the accessor 328 with the driven cell 334 being fixed and the processing for returning the hand portion is performed to eliminate the gap state. In this embodiment, although the direction of movement of the accessor 328 is restricted to the right and left directions, the accessor 328 may be slightly moved in any other direction.

For example, the accessor 328 may be slightly moved in the vertical direction (upward and downward directions), or the accessor may be subjected to micro-vibration in the rotating direction thereof around the position of the accessor on a horizontal plane.

Further, the direction of movement is not restricted to any of the right and left directions, the upward and downward directions or the rotating direction, and the gap state may be sometimes more effectively eliminated when these three types of directions of movement are combined to impart micro-vibrations to the accessor. Thus, combination of directions of movement and order of vibration which seem to produce the greatest effect should be adopted depending on the situation.

In addition, if the quantity of movement and the speed of movement of the accessor can be appropriately varied, the gap state may be easily and rapidly eliminated. Thus, the quantity of movement or the speed of movement should be taken into consideration as the need arises.

Further, the above-described micro-vibration with respect to the driven cell and that with respect to the accessor may be combined to perform the operation for eliminating the gap state.

Furthermore, in the case where the gap state is generated between the fixed cell 315 and the accessor 314, micro-vibration may be imparted to the accessor as described above with reference to FIG. 39. Also, the gap state may be further easily and rapidly eliminated if the direction, quantity and speed of movement of the accessor can be adequately varied.

According to the present invention, since micro-vibrations are imparted to the accessor or the driven type repository and the hand portion is so controlled as to be returned to a predetermined position within the accessor body portion in which the hand portion has been accommodated, the gap state can be eliminated.

3. Library Control System

Here, it is an object of the present invention to provide a library control system capable of counting a number of times for volume busyness and relaxing contentious use of the same medium so that frequently-used volumes do not exist in the same volume.

It is another object of the present invention to facilitate use of a volume, which can not be used often even if a request for use is issued because that volume, as well as a frequently-used volume, exists in the same medium, by copying the frequently-used volume to another medium.

Figure 14:
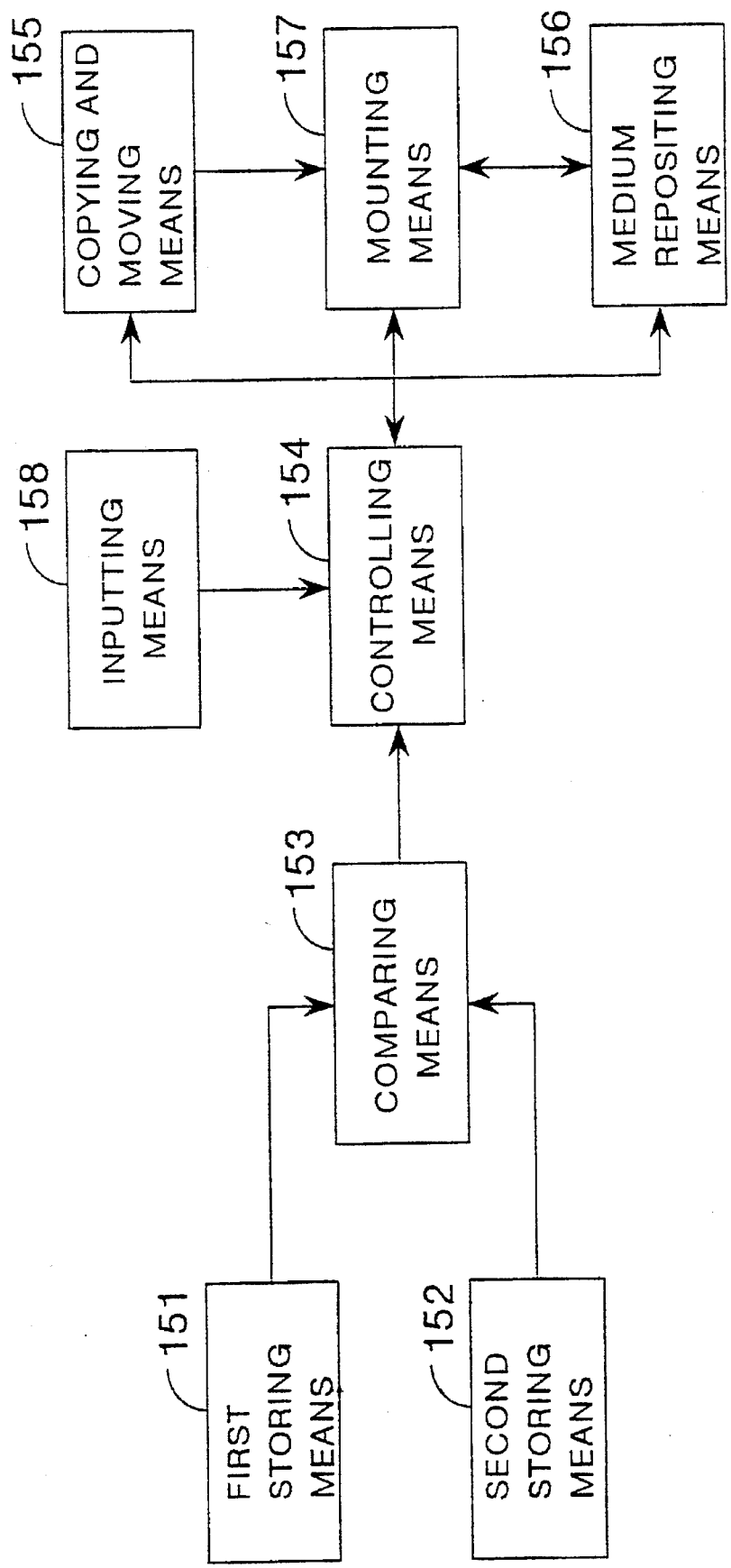
FIG. 14 is a block diagram showing a basic structure in a library control system according to the present invention.

FIG. 14 is a block diagram showing a basic structure of the library control system according to the present invention.

In the drawing, the present invention provides the library control system, comprising: first storing means 151 for storing information concerning frequency of use of recording mediums and information concerning frequency of use of each volume which is a unit for managing data on the recording medium; second storing means 152 for storing a predetermined threshold value of frequency of use which is compared with the information concerning frequency of use of the volume; comparing means 153 for comparing the information concerning frequency of use of the volume with predetermined threshold value of frequency of use; medium repositing means 156 provided with a plurality of cells for accommodating recording mediums; copying and moving means 155 for moving a desired volume in a recording medium A accommodated in the cell of the medium repositing means 156 to a different recording medium B; and controlling means 154 for moving a desired volume n in the recording medium A to a different least-frequently-used recording medium B by the copying and moving means 155 if a result of comparison made between the information concerning frequency of use of the volume n in the recording medium A and the predetermined threshold value of frequency of use by the comparing means 153 satisfies predetermined conditions, wherein the controlling means 154 controls contention so that a plurality of frequently-used volumes do not exist in the same recording medium.

Further, the present invention provides the library control system, further comprising: mounting means 157 capable of taking out a plurality of desired storing mediums from the recording mediums accommodated in the cells of the medium repositing means 156 to reposit them therein, wherein if a result of comparison made between the information concerning frequency of use of a desired volume n in the recording medium A and the predetermined threshold value of frequency of use by the comparing means 153 satisfies predetermined conditions, the controlling means 154 reposits the recording medium A in the mounting means 157 and reposits a least-frequently-used recording medium B in the mounting means 157, and the copying and moving means 155 moves the volume n to the recording medium B.

Here, as the first storing means 151, a memory from or on which data can be read or written may be preferably used and, usually, it is most preferably to use a RAM.

The second storing means 152 is used for storing the threshold value which is to be compared. When using a fixed value, which is not changed, as the threshold value, it is preferable to employ a memory exclusively used for reading, such as a ROM. However, in case of using the threshold value which can be changed later, it is preferable to employ a memory on which data can be rewritten, such as a RAM, an FD (floppy disk) or an HD (hard disk).

Although the comparing means 153 can be realized by a logic circuit, it is usually preferable to realize the comparing means 153 as one function of the CPU.

That is, the function of the comparing means 153 can be realized by a so-called microcomputer including the CPU, the ROM, the RAM and the I/O controller as well as the control program stored in the ROM or the RAM.

The medium repositing means 156 is provided with at least a repository for accommodating each of a plurality of recording mediums in each cell and a medium carrying mechanism which is referred to as an accessor for taking out or repositing a recording medium from or into a cell. Although the recording medium reposited in the cell may be a magnetic tape, an optical disk, an optical magnetic disk or others, the recording medium used herein is a normal cartridge type recording medium.

Further, a recording medium may be of a single-side type the recording area of which is provided on one side or of a double-side type the recording area of which is provided on the both front and rear sides.

In the present invention, the recording medium of the double-side type is mainly used.

The copying and moving means 155 is means for realizing a so-called copy function and cut and paste functions and, usually, it may be preferably realized by the CPU.

Moving described hereabove means to copy data D stored in a given area S in a recording medium to another area T and thereafter eliminate the data D stored in the original area S, or means to copy the data D stored in a recording medium A to another recording medium B and then eliminate the data D stored in the original recording medium A.

The mounting means 157 is used for repositing a recording medium and recording and/or reproducing data with respect to the recording medium, and corresponds to a so-called disk unit.

In the disk unit, when data are recorded or reproduced onto or from one surface of the double-side type recording medium, the data can not be usually recorded or reproduced onto or from the other side. In order to record or reproduce the data on the other side, a head for recording/reproducing data must be moved to the other side or the recording medium must be turned over to be again inserted.

The controlling means 154 controls each of other means for realizing all the functions of the library control unit according to the present invention, and the CPU is usually used as the controlling means 154.

The CPU controls the respective means on the basis of the control program stored in the ROM or the like.

Further, although the least-frequently-used recording medium is detected by the controlling means 154, this detection may be performed by using information concerning frequency of use of a recording medium stored in the first storing means 151.

The information concerning frequency of use of a recording medium stored in the first storing means 151 means a number of times that the recording medium is used or the time for which the recording medium is used. For example, a number of times that the recording medium is reposited in the mounting means 157, the time for which the recording medium is being reposited in the mounting means 157 or the time for which data of the recording medium is loaded may be used as the information.

Moreover, the information concerning frequency of use of a volume stored in the first storing means 151 means a number of times that the volume is busy, a number of times that the volume is used or the time for which the volume is used.

Here, the number of times for busyness represents a number of times that the volume was not used due to any cause when a request for use of the volume is issued. For instance, a number of times that the volume was not used because another volume which exists in the same recording medium is in use when a request for use of the volume is issued, or a number of times that use of the volume is impossible for a predetermined time or more before use of the recording medium is started is counted.

In addition, as the number of times that the volume is used or the time for which the volume is used, a number of times that the recording medium is reposited in the mounting means 157 or the time for which it is used can be used as similar to those in case of the recording medium.

The threshold value of frequency of use stored in the second storing means 152 may be an upper limit value bcmax with respect to the number of times for busyness, an upper limit value mmax with respect to a number of times that the recording medium is used, an upper limit value tmmax with respect to the time for which the recording medium is used, an upper limit value vdif with respect to a number of times that plural volumes which exist in one recording medium are used, an upper limit value tvdif with respect to the time for which plural volumes which exist in one recording medium are used, or others.

Although each of these threshold values of frequency of use can be a fixed value stored in the ROM or the RAM, it may be preferably a value which is stored in the RAM or the like and can be rewritten. And, each of these threshold values of frequency of use can be stored in the second storing means 152 by only one value. Moreover, each of these threshold values of frequency of use can be a fixed value at each recording medium or at each volume.

Further, the present invention provides the library control system further comprising inputting means 158, wherein when a command requesting to relax contention of the recording medium is input from the inputting means 158, the controlling means 154 controls contention so that a plurality of frequently-used volumes do not exist in an arbitrary recording medium among recording mediums reposited in the medium repositing means 156.

In this case, as the inputting means 158, a keyboard, or a pointing device such as a mouse, a pen or a track ball may be used.

The present invention will now be described in detail hereinbelow with reference to illustrated embodiments B-1 through B-6. Note that the present invention is not restricted to these embodiments.

Figure 15:
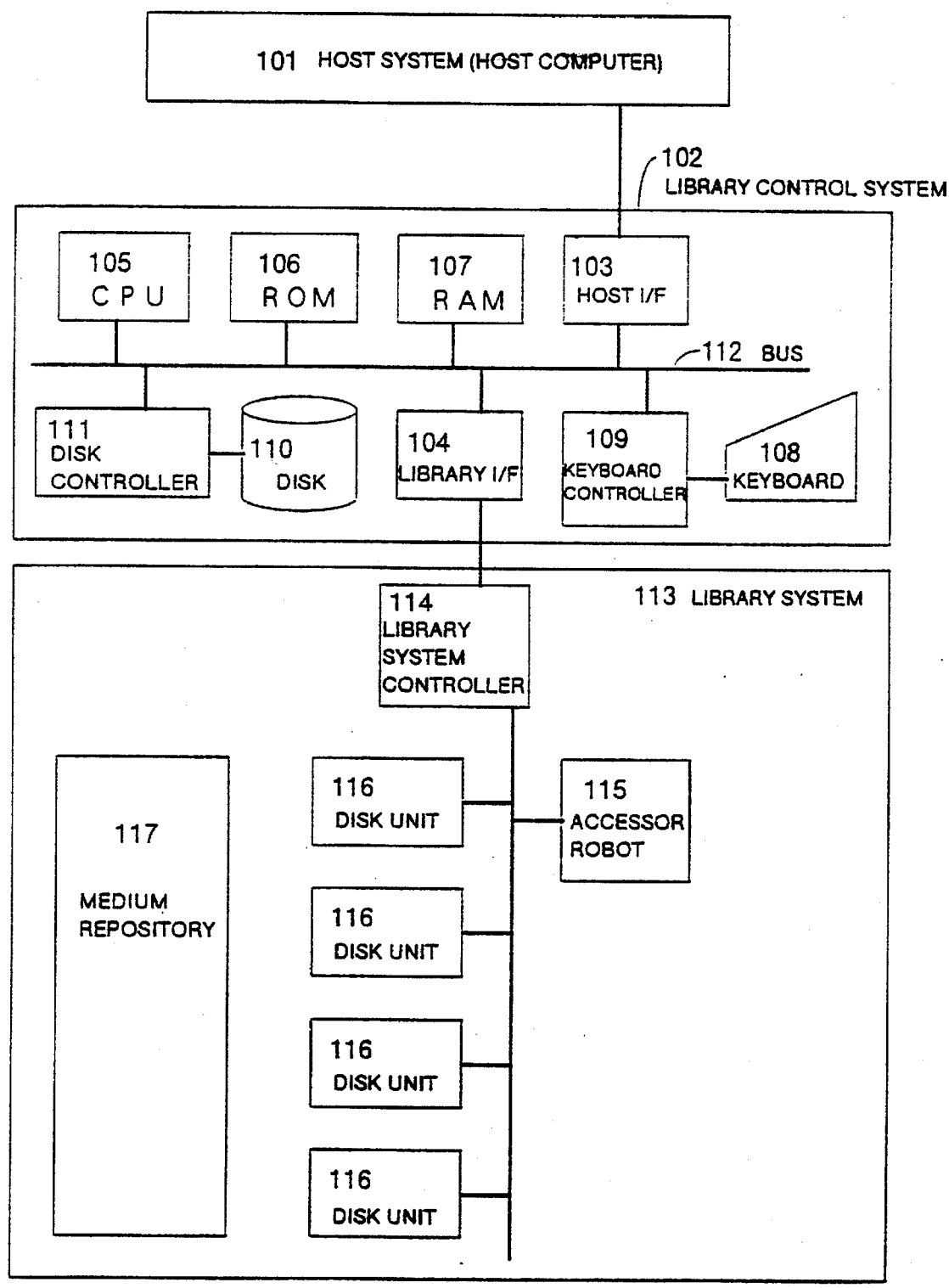
FIG. 15 is a block diagram showing a structure of the library control system.
Figure 17:
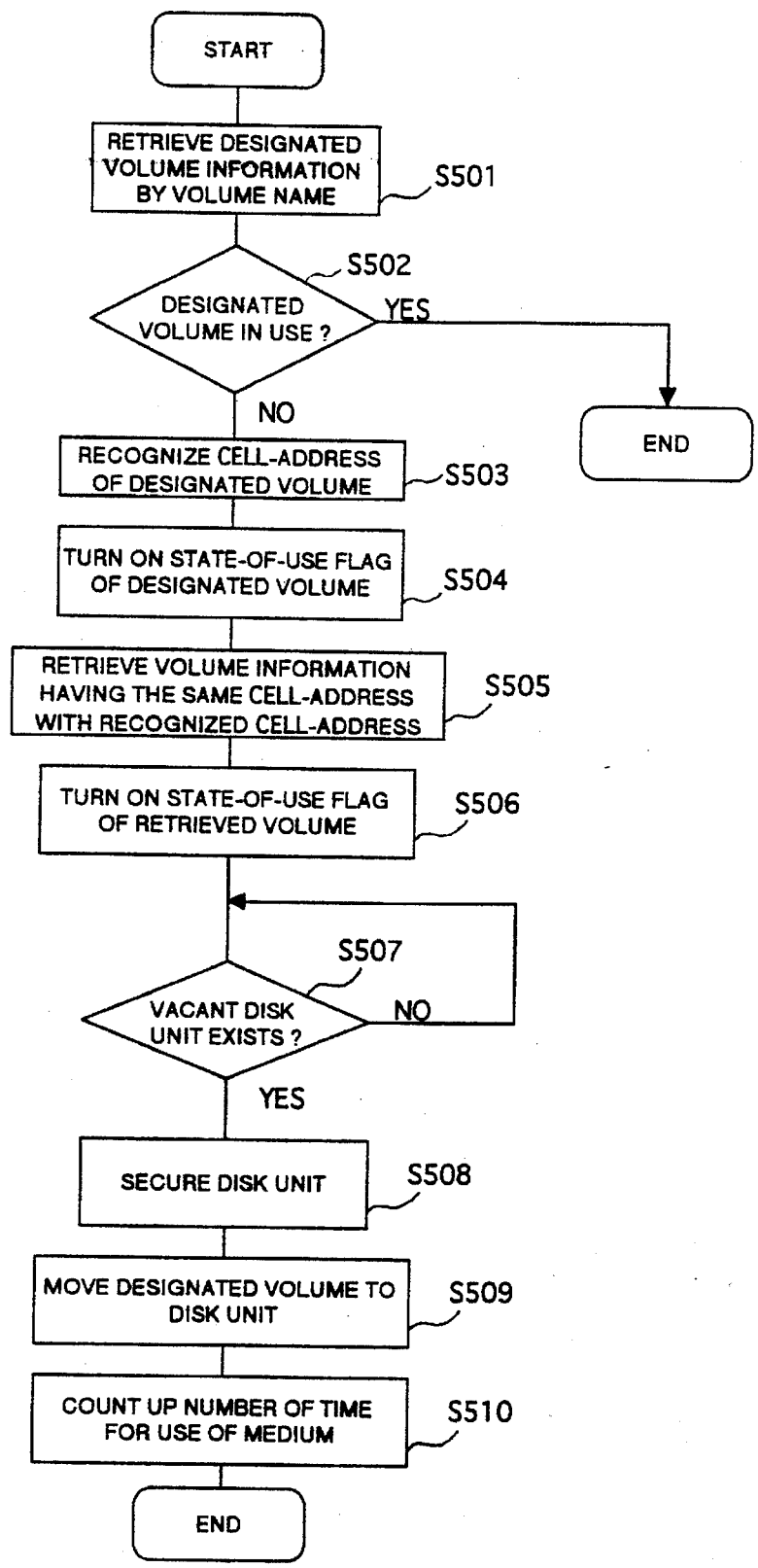
FIG. 17 is a flowchart showing the processing of a library control unit in the prior art.

FIG. 15 is a block diagram showing a structure of a library control system according to the present invention.

This drawing is the same with the block diagram showing the structure of the prior art and, in the library control system 102, processing of direction commands which are received by the host device 101 and relates to fetch and reposition of the medium, movement of the accessor robot 115 to the library system 113, fetch/reposition of the cartridge and processing for mounting/unmounting the medium onto/from the disk of the medium are similarly carried out as in the prior art.

The present invention is intended to operate the library control system so as to relax contentious use of the medium by using a number of times that the volume is used, a time for which the volume is used, a number of times that the volume is busy, a number of times that the medium is used and a time for which the medium is used, in addition to the library control as in the prior art.

Note that a cartridge type magnetic disk having recording surfaces on both sides thereof is used as a medium in this embodiment. Further, a dedicated library control unit 102 is connected to the library system 113, and the processing for relaxing contentious use of the medium is carried out by inputting a command from a keyboard 108 by an operator.

Furthermore, it is preferable that a plurality of host devices (host computers) 101 can be connected to the library control unit 102.

In FIG. 15, the library control unit 102 sends to the library system controller 114 of the library system 113 commands for mounting/unmounting volumes, a command for setting a threshold value and a command for relaxing contentious use of the medium.

In this case, the threshold setting command means a direction command for setting threshold values for a number of times that the volume is used, a number of times that the medium is used or a number of times that the volume is busy.

The medium contention relaxing command is a direction command for preventing contention from occurring as possible by periodically retrieving a volume which is frequently requested for use by a system administrator or the like of the library control unit 102.

Upon receiving these commands, the library system controller 114 analyzes their contents to thereafter executes the processing which will be described later.

As the library system controller 114, there is usually adopted a so-called microcomputer consisting of a CPU, a ROM, a RAM, an I/O interface and others which are not shown.

The access robot 108 carries the medium between each disk unit 116 and each cell of the medium repository 117 and operates to turn over the medium which is to be reposited in the disk unit 116.

Embodiment B-1

Description will now be given as to an embodiment, wherein the library control unit 102 detects and judges frequency of use of the volume by retrieving a volume information management table in the disk 110 when mounting the medium or upon receiving a mount command from an operator, and it moves the volume to another volume whose frequency of use is low to relax contentious use of the medium if it is judged that the frequency of use of the volume in question is high. In this case, a number of times that the volume is busy is used as the frequency of use.

Figure 20:
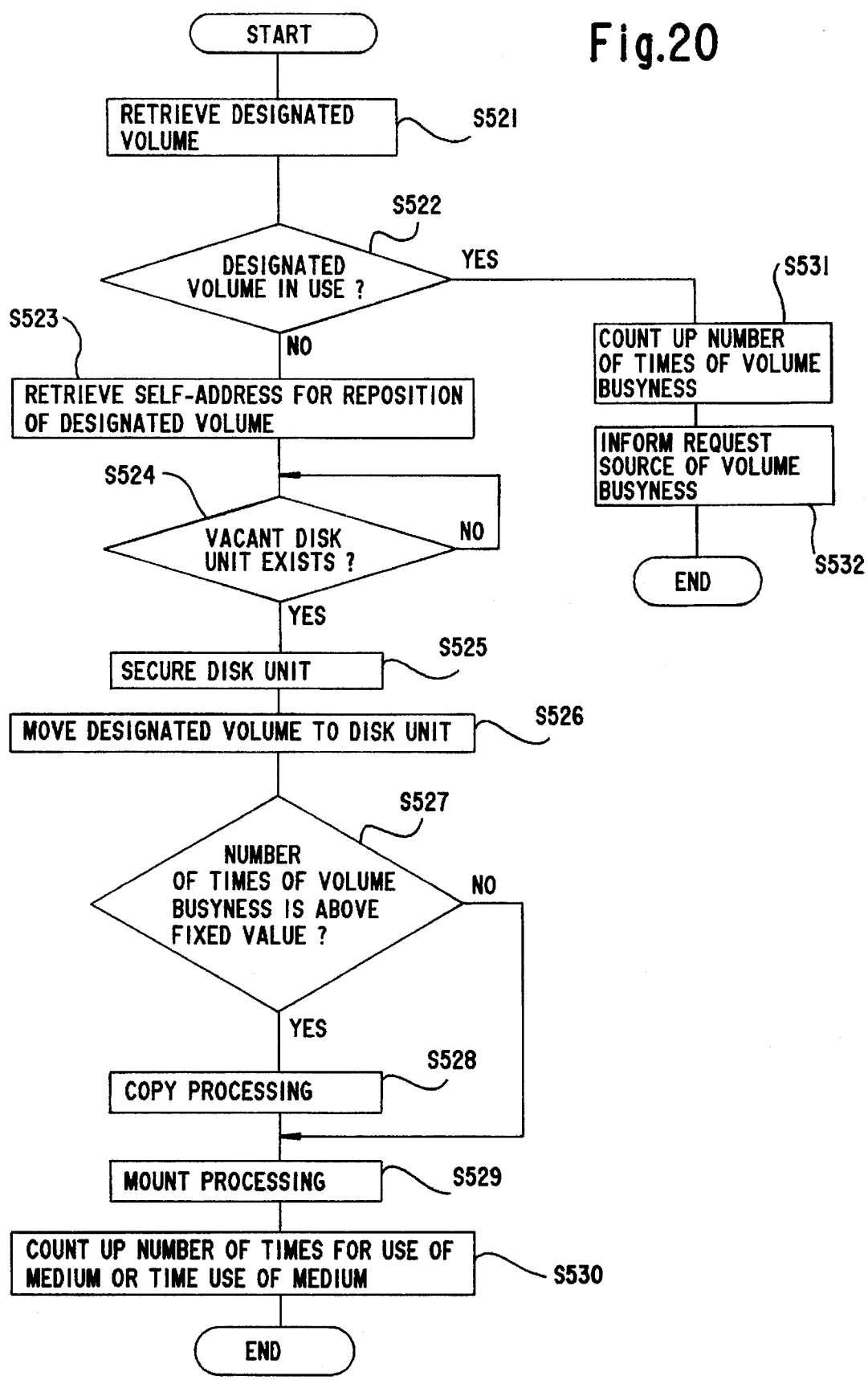
FIG. 20 is a flowchart showing a contention relaxation processing of a library control unit in an embodiment B-1 according to the present invention.

FIG. 20 is a flowchart showing the contention relaxing processing of the library control unit in the embodiment B-1.

When a command for mounting a volume is input from the host 101 or the keyboard 108, the following processing is started.

At the step S521, a designated volume is retrieved from a volume information management table in the disk 110. An example of the volume information management table according to the present invention is shown in FIG. 18.

In the drawing, threshold values for a number of time that the medium is used and for a number of time that the volume is busy are previously set for comparison with the information with respect to each volume. Further, for each volume, there is stored the information consisting of: a number of times that the medium having the volume is used; a cell-address at which the medium is reposited; identification of side A/side B of the medium; a number of times for the volume busyness representing that the side on which the volume exists is requested to be used when the opposed side is in use; a flag indicating the state of use of the volume; a library ID; a volume owner ID; and a group ID, as the volume information.

At the step S522, judgment is made upon whether the medium on which the designated volume exists can be used. If the medium can not be used, a number of times for the volume busyness is counted up (the step S531), and the busy state is informed and displayed to the host 101 which is a request source or a non-illustrated display of the library control unit 110 (the step S532).

If the medium is not in use, the position at which the medium is reposited is retrieved by using the cell-address from the designated volume information (the step S523), and a vacant disk unit 116 is retrieved. If there is no vacant disk unit 116, the unit waits for the disk unit to be released (the step S524).

If the disk unit can be secured (the step S525), the medium having the designated volume is taken out from the cell by the accessor robot 8 and moved to the vacant disk unit (the step S526). At this time, a number of times for busyness of the designated volume is compared with a threshold value for a number of times for the volume busyness set in the table (the step S527) and, if the number of times for the volume busyness is larger than the threshold value, the library system controller 114 performs the copying processing (the step S528). If it is smaller than the threshold value, the copying processing is unnecessary and the mounting processing is executed with respect to the volume (the step S529).

Figure 23:
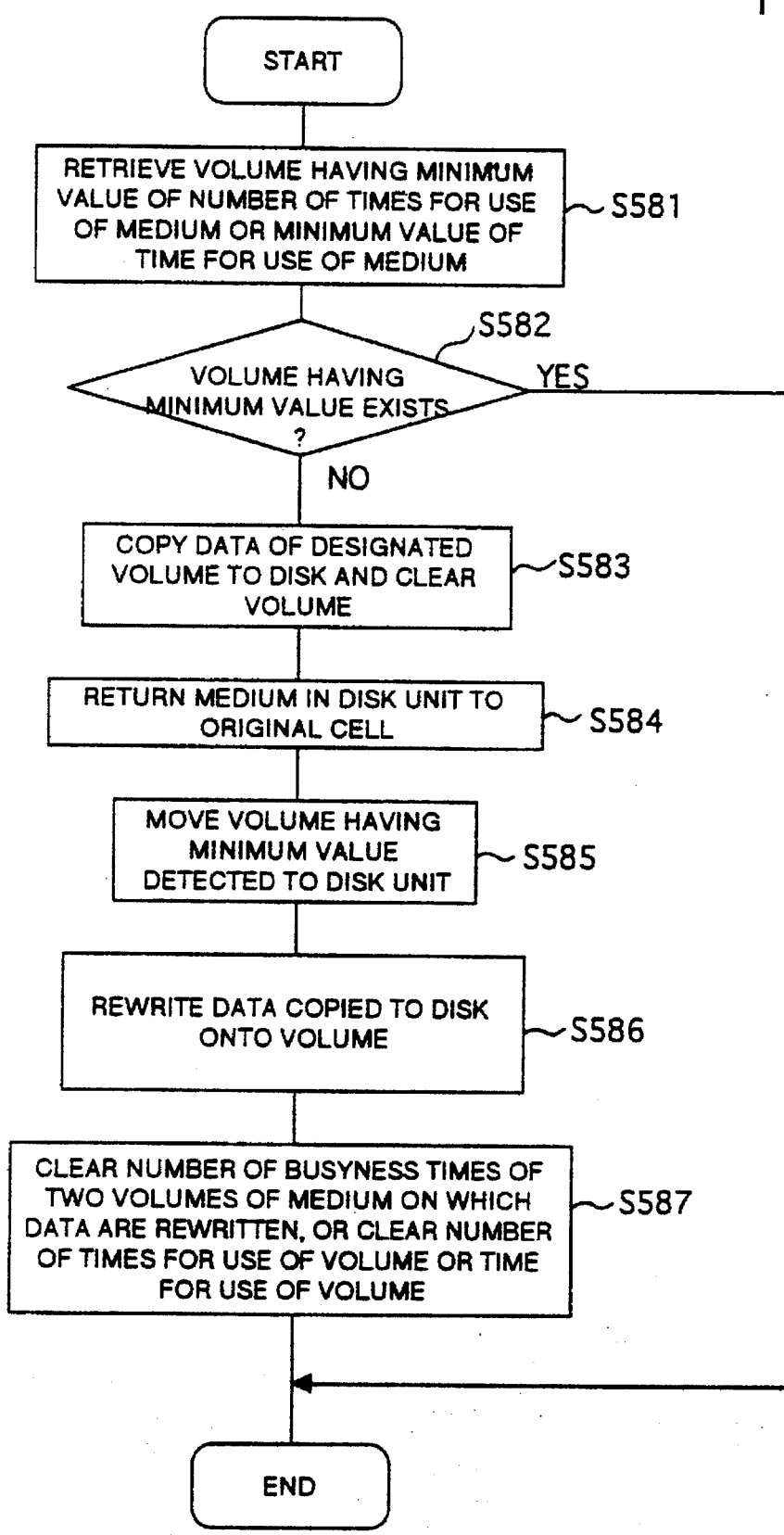
FIG. 23 is a flowchart showing a copy processing in the embodiments B-1 to B-5 according to the present invention.

As to the copying processing, the flowchart is given in FIG. 23. Although one disk unit is used to perform the copying processing in this example, two disk units may be secured and the mediums may be reposited in the both units to carry out the copying processing.

As shown in FIG. 23, the volume information management table is again retrieved (the step S581) to detect a medium having a number of times that the medium is used as a minimum value (the step S582). If no medium is detected, the copying processing is not effected, and the mounting processing is subsequently carried out.

If there is a volume having a number of time that the medium is used as a minimum value (the step S582), data of the designated volume are copied to the disk 110, and the volume is then cleared from the medium (the step S583). Subsequently, the medium in the disk unit is returned to the original cell (the step S584).

Then, the medium having the volume whose number of times that the medium is used is detected as the minimum value is moved to the disk unit 116 (the step S585), and the data copied to the disk 110 are rewritten on this volume (the step S586). At this time, the number of times for busyness of each of the both volumes in the medium is cleared (the step S587).

After completion of this copying processing, the mounting processing is carried out with respect to the volume of the medium in the disk unit as shown in FIG. 20 (the step S529). Further, the number of times that the medium is used is counted up (the step S530).

As mentioned above, upon receiving the mount command, a number of times that the designated volume is busy is retrieved. If it is judged that the designated volume can not be used even though a number of times that use of the designated volume is requested is large or that it can not be used immediately and a waiting time is thereby generated, the this volume is copied on a volume of another medium, and whereby the designated volume and the volume on the opposed side of the original medium can be used without causing contention.

Embodiment B-2

The embodiment B-2 is also intended to relax contentious use of the medium by moving the frequently-used volume having a high frequency of use to the volume having a low frequency of use as the embodiment B-1. In this embodiment, however, contention is controlled by using a number of times that the medium is used as well as a number of times for the volume busyness.

In this case, the number of times that the medium is used means a sum of numbers of times of use on both the side A and the side B.

Figure 21:
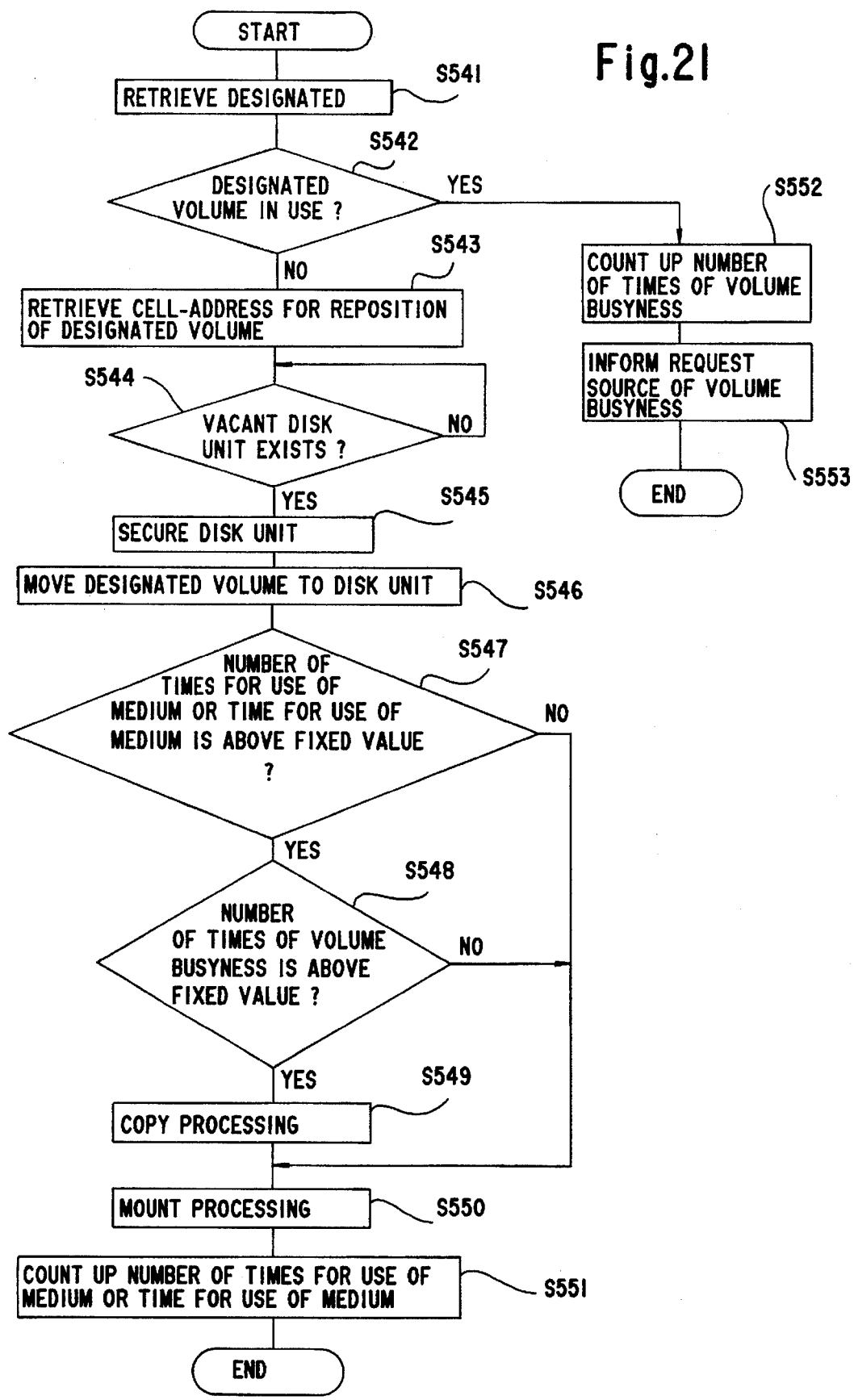
FIG. 21 is a flowchart showing a contention relaxation processing of a library control unit in embodiments B-2 and B-3 according to the present invention.

FIG. 21 is a flowchart showing the contention relaxing processing of the library control unit according to the embodiment B-2.

At the step S541, a designated volume is retrieved on the volume information management table in the disk 110.

At the step S547, judgment is made upon whether a medium having the designated volume can be used and, if the medium can not be used, a number of times of volume busyness is counted up (the step S552). The state of busyness is then informed or displayed to the host 101 which is a request source or a display of the library control system 110 (the step S553).

If the medium is not in use, a position at which the medium is reposited is retrieved by using an cell-address stored in the designated volume information (the step S543), and a vacant disk unit 116 is retrieved. If there is no vacant disk unit 116, the unit waits for the disk unit 116 to be released (the step S544).

When the disk unit can be secured (the step S545), the medium having the designated volume is taken out from the cell by the accessor robot 8 and moved to the secured disk unit (the step S546).

At this time, a number of times that the medium having the designated volume is used is compared with a threshold value of a number of times that the medium is used set in the table (the step S547) and, if the number of times that the medium is used is larger than the threshold value, a number of times for busyness of the volume is confirmed (the step S548).

On the other hand, it is smaller than the threshold value, the copying processing is unnecessary and the library system controller 114 executes the processing for mounting this volume (the step S550).

At the step S548, if a number of times for busyness of the volume is larger than the threshold value, the copying processing (the step S549) is performed.

The copying processing is effected similarly as shown in the flowchart of FIG. 23. Upon completion of the copying processing, the mounting processing is subsequently carried out with respect to the volume of the medium in the disk unit (the step S550). After the processing, a number of times for use of the medium is counted up (the step S551).

As described above, if a number of times that the medium is used is larger than a predetermined threshold value and a number of times for busyness of the volume is greater than a predetermined threshold value, this volume is copied onto a volume of another medium. Therefore, if the frequency of use of the medium is extremely high, the designated volume and a volume on the opposed side of the original medium can be used without causing contention. In addition, a number of times of copy can be largely reduced as compared with that of the embodiment B-1.

Embodiment B-3

As similar to the embodiments B-1 and B-2, the embodiment B-3 is intended to relax contentious use of the medium by moving the volume having the high frequency of use to another volume having the low frequency of use. In the embodiment, however, contention is controlled by using the time for which the medium is used, i.e., the time for which the medium is mounted instead of a number of times that the medium is used which is employed in the embodiment B-2.

The processing flow of the embodiment B-3 is substantially the same with that of the flowchart of FIG. 21 described in connection with the embodiment B-2 except the following points.

That is, as different from the foregoing embodiment, judgment is made upon whether the time for which the medium is used is above a predetermined value at the step S547 and the time for which the medium is used is counted up at the step S551 in the embodiment B-3.

In addition, the time for which the medium is used can be obtained by measuring the time during which the medium is actually mounted on the disk unit or the time for actually loading the volume at the step S550.

In this way, employment of the time for which the medium is used instead of the number of times for use of the medium enables control of contention which is much suitable for the actual state of use.

Embodiment B-4

The embodiment B-4 intended to relax contentious use of the medium in the following manner. That is, upon receiving an execution command for the medium contention relaxing processing from an operator, the library control unit 102 detects a frequently-used volume A and another volume B which exists on a side opposed to the side on which the volume A exists. If a number of times that the volume B is used is lower than that of the volume A but a number of times for busyness of the volume B is not less than a predetermined value, the volume B is moved to another volume having the lower frequency of use, thereby relaxing the contentious use of the medium.

Figure 22:
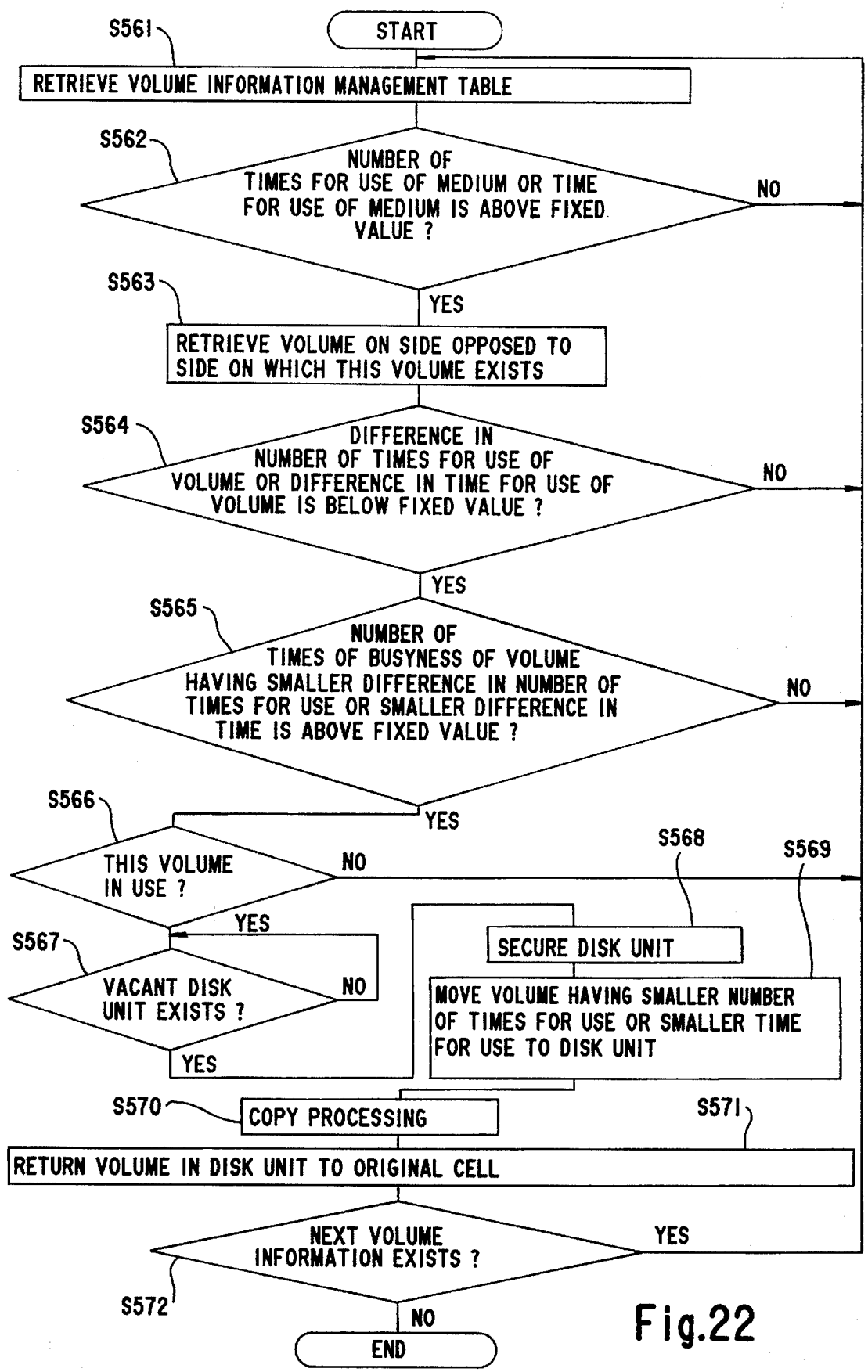
FIG. 22 is a flowchart showing a contention relaxation processing in a library control unit in embodiments B-4 and B-5 according to the present invention.

FIG. 22 is a flowchart showing the contention relaxing processing of the library control unit in the embodiment B-4.

When an operator inputs a medium contention relaxing command from the keyboard 108, the following processing starts. However, this command is issued when use of a given volume is frequently requested but a number of times that the volume is busy is extremely large, or periodically issued by an operator as the need arises.

Figure 19:
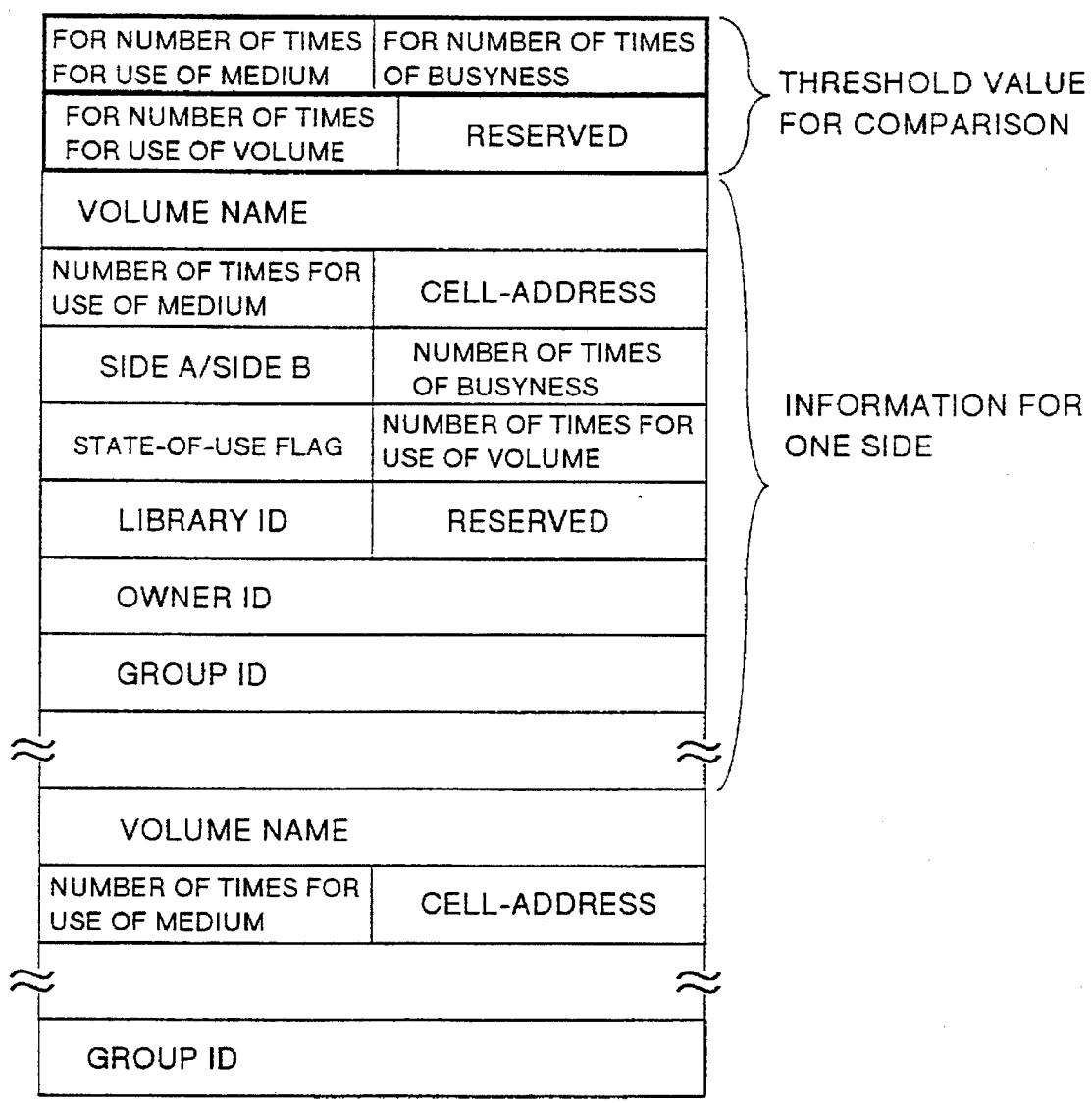
FIG. 19 is a view showing a structure of the volume information management table in the embodiment according to the present invention.

In the embodiment B-4, such a volume information management table as shown in FIG. 19 is used.

Referring to the drawing, there are previously set threshold values with respect to a number of times that a medium is used, a number of times for busyness of a volume and a number of times that the volume is used, in order to make a comparison with information of each volume. Further, for each volume, there is set the information consisting of a number of times that a medium having the volume is used, a cell-address at which the medium is reposited, identification of the side A/side B of the medium, a number of times for busyness of the volume representing a number of times that use of the volume is requested during use of one side, a flag indicating the state of use of the volume, a number of times that the volume is used, a library ID, a volume owner ID, a group ID and the like. As different from FIG. 18, a number of times that the volume is used and a threshold value thereof are additionally provided.

The volume information management tables in the disk 110 are first retrieved at the step S561, and a volume (referred to as a volume A hereinbelow) having a number of times that the medium is used is not less than a predetermined value is detected at the step S562.

When detected, information of a volume (referred to as a volume B hereinbelow) on a side opposed to the side on which the volume A exists is retrieved at the step S563. If a difference between numbers of times that the volume A and the volume B are used is not more than the threshold value for a number of times of use of the volume set in the volume information management table (the step S564), a number of times for busyness of the volume having a smaller number of times of use of the volume is compared with the threshold value for a number of times for busyness of the volume (the step S565). If the number of times for busyness of the volume in question is larger than the threshold value, it is checked if this volume is in use (the step S566).

If it is in use, the processing is returned to the step S561 in order to retrieve the next volume. If it is not in use, a vacant disk unit is searched at the step S567, and the vacant disk unit is secured (the step S568). Subsequently, this volume is moved (the step S569), and the copying processing is thereafter carried out (the step S570).

Incidentally, the copying processing is similarly performed as in the flowchart of FIG. 23. Upon completion of the copying processing, the volume in the disk unit is returned to the original cell (the step S571), and it is checked if any other volume information exists (the step S572). When the information exists, the volume information management table is again retrieved (the step S561), and the processing is repeated.

As mentioned above, in the embodiment B-4, if two frequently-used volumes exist on the both sides, one volumes is copied onto a volume of another medium, and hence the both volumes can be used without causing contention.

Therefore, since contention is not eliminated when a mount request is issued during actual operation but contention is controlled by an operator, e.g., an administrator of this library system as the need arises, the system administration of the library control unit can be assuredly and rapidly enabled.

Embodiment B-5

Instead of using a number of times that the medium is used, a number of times that the volume is used and threshold values thereof in the embodiment B-4, a time for which the medium is used, a time for which the volume is used and threshold values thereof can be used to perform contention control similar to that in the embodiment B-4.

That is, judgment is made upon whether the time for which the medium is used is above a predetermined threshold value at the step S562 and whether a difference in the times for which the volumes are used is above a predetermined threshold value at the step S564 in FIG. 22.

Further, at the step S569, a volume having a shorter time for which the volume is used is moved to the disk unit where the volume is copied.

The above-described points are different from the processing steps in the embodiment B-4, but other processing steps are the same with those in the embodiment As mentioned above, contention control which is much suitable for the actual state of use is enabled by employing the times for which the medium and the volume are used.

Incidentally, although each threshold value used in the embodiments B-1 to B-5 may be previously stored as a fixed value in the ROM 106 or the like, it is preferable to store each threshold value in the RAM 107 or the like so that it can be varied depending on the state of use of the library system.

Types of the threshold values used in the embodiments are a threshold value for a number of times that the medium is used, a threshold value for a number of times that the volume is used and a threshold value for a number of times for busyness shown in FIGS. 18 and 19, a threshold value for the time for which the medium is used and a threshold value for which the volume is used described in connection with the embodiments.

Further, these threshold values may be preferably set from the keyboard 108 by an operator.

As described above, relaxation of contentious use of the medium is realized in accordance with the state of use of the library system by enabling resetting of each threshold value by an operator during operation of the library system.

Embodiment B-6

Although a frequently-used volume by which contentious use of the medium is likely to be caused is copied on another medium whose frequency of use is low in the embodiments B-1 through B-5, it is preferable that an operator can select execution of the copying processing before this processing is performed or select use of a new medium having no data and use of an existing medium as a medium on which the volume is copied.

Figure 24:
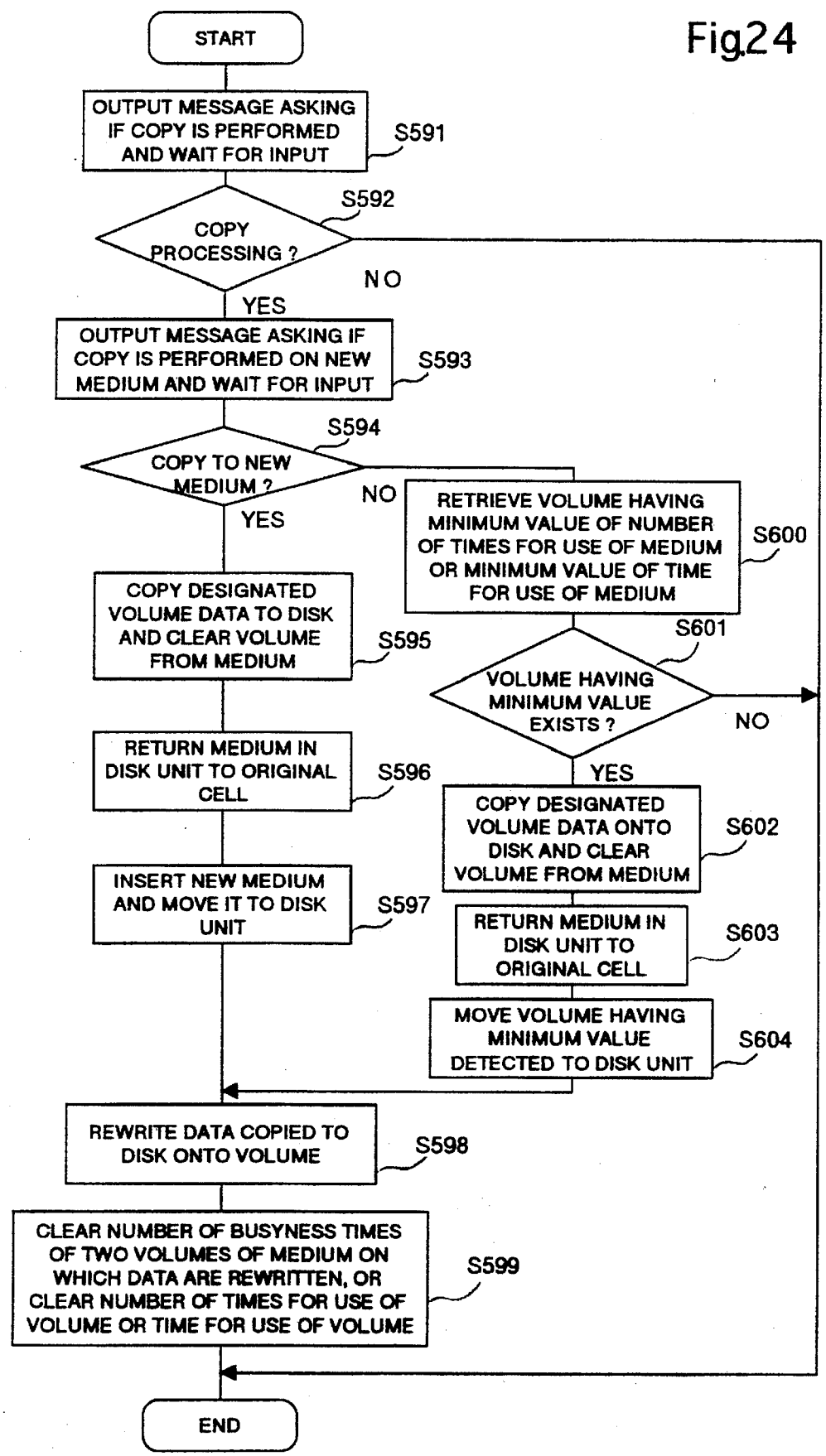
FIG. 24 is a flowchart showing a copy processing in an embodiment B-6 according to the present invention.

FIG. 24 is a flowchart showing the copying processing in the embodiment B-6. This substitutes for the copying processing in FIG. 23 and can be used as the copying processing in the embodiments B-1 through B-5.

In FIG. 24, the processing steps S591 through S597 are characteristic of the embodiment B-6, while the steps S598 through S604 correspond to the steps S581 through S587 in FIG. 23.

At the step S591, if a request for the copying processing is issued, a message inquiring if the copying is executed is output to a non-illustrated display of the library control unit and an input from an operator is waited.

At the step S592, when an operator inputs a direction to perform no copying processing, the processing is completed without executing copying.

When a direction to perform the copying processing is supplied, a message inquiring if the copying processing is performed on a new medium which has not yet been reposited in the library system is output and an input from an operator is waited at the step S593.

At the step S594, when a direction to perform the copying processing on the new medium is input, data of the volume in question are copies to the disk 110, and the information of this volume is cleared (the step S595).

At the step S596, the medium in the disk unit 116 is returned into the original cell.

At the step S597, when an operator puts a new medium into a predetermined insertion opening of the library system, the new medium is moved to a predetermined vacant disk unit 116, and the processing then advances to the step S598. The step S598 corresponds with the step S586 in FIG. 23.

If a direction to perform no copying processing on the new medium is input at the step S594, the volume information management table is retrieved to detect a medium whose number of times or time that the medium is used is a minimum value (the step S600), and the processing similar to the steps S582 to S587 shown in FIG. 23 is then performed.

In this manner, if a request for the copying processing is issued, a volume which is not frequently used but important can not be carelessly eliminated by inquiring about execution of the copying processing to an operator, thus enabling secure management of the library control unit.

According to the present invention, when a result of comparison made between the information of the frequency of use of a desired volume n in a recording medium A and a predetermined threshold value of the information of the frequency of use by the comparing means satisfies predetermined conditions, the controlling means controls contention in such a manner that the volume n is moved to a different medium whose frequency of use is lowest by the copying and moving means, and hence a plurality of frequently-used volumes do not exist in one recording medium, thereby relaxing contentious use of the same recording medium.

Therefore, it becomes easy to use a volume which is frequently requested to be used but actually can not be used because any other frequently-used volume exists in the same medium.

4. Accessor Controlling Method for Detecting a Relative Position

Here, it is an object of the present invention to provide an accessor controlling method capable of detecting a relative position of an accessor to each cell of the repository by using the accessor indispensable as an element of the library system, without adopting a non-contact type measuring method using a jig for measuring a positional deviation, a photoelectric sensor for measurement and others.

Figure 27:
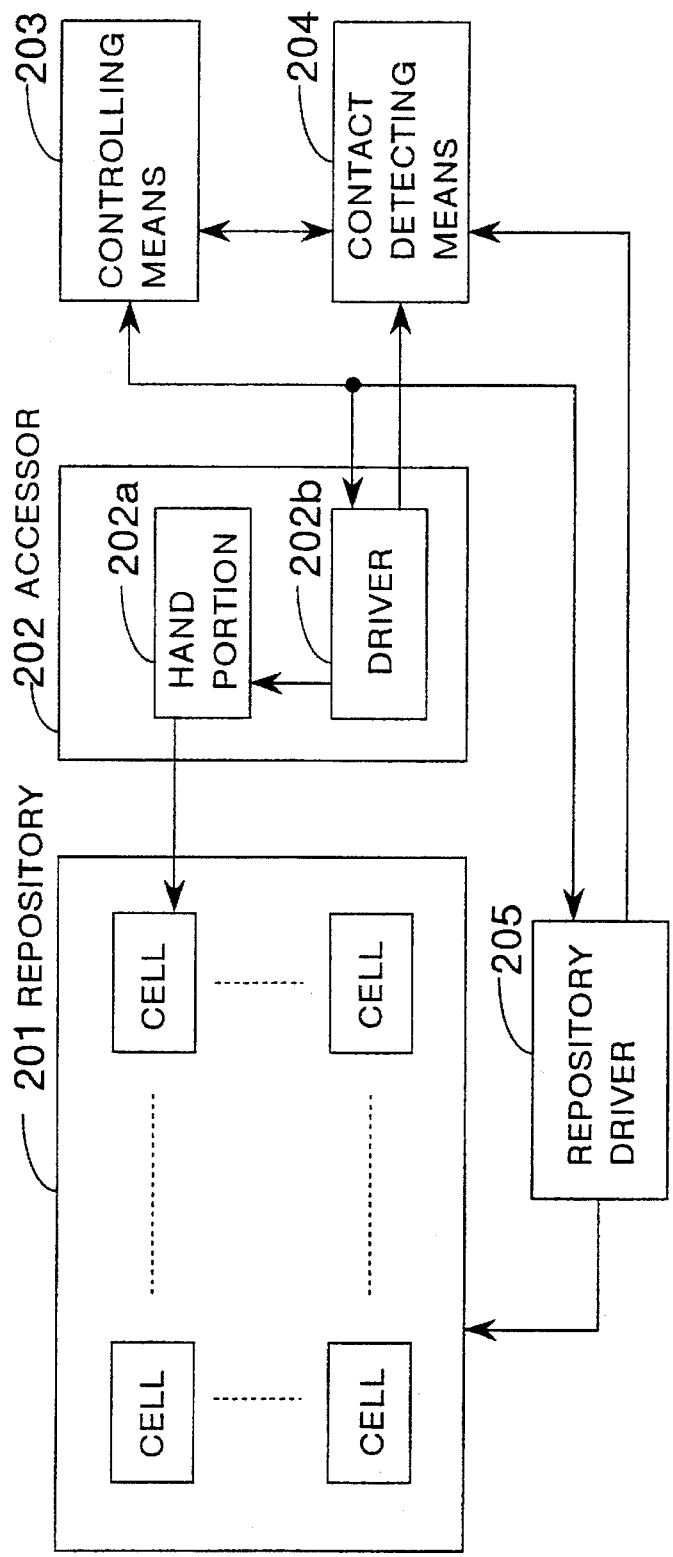
FIG. 27 is a block diagram showing a basic structure of a library system according to the present invention.

FIG. 27 is a block diagram showing a basic structure of the library system which can realize an accessor controlling method according to the present invention.

In the drawing, the present invention provides a method for controlling an accessor in a library system automatically replacing cartridges, the library system comprising: a repository 201 constituted by a plurality of cells for accommodating a plurality of cartridges, respectively; an accessor 202 consisting of a hand portion 202a for fetching or repositing a cartridge from or into each of the cells, and a driver 202b for driving the hand portion 202a; and controlling means 203 for supplying to the driver 202b information for controlling the hand portion 202a, the method for controlling the accessor characterized in that: the driver 202b inserts the hand portion 202a into each of the cells and moves the hand portion 202a in a direction such that the hand portion 202a is brought into contact with a wall surface of the cell; and the controlling means 203 detects a relative position of the accessor 202 to the cell by using information obtained from the driver 202b when the hand portion 202a comes into contact with the wall surface of the cell.

Further, it is preferable that the library system further comprises contact detecting means 204 for detecting that the hand portion 202a comes into contact with the wall surface of the cell upon receiving driving information from the driver 202b. Also, it is preferable that: the controlling means 203 supplies to the driver 202b the information concerning a predetermined cell position at which the hand portion 202a can be inserted to the cell and moves the hand portion 202a to the predetermined cell position; the controlling means 203 then inserts the hand portion 202a into the cell and moves the hand portion 202a in the cell vertically or horizontally; and the controlling means 203 obtains an actual central position of the cell by using the information supplied from the driver 202b when the contact detecting means 204 detects that the hand portion comes in contact with the wall surface of the cell, thereby detecting a relative position of the accessor 202 to the cell from the actual central position and the predetermined cell position.

Furthermore, the present invention provides a method for controlling an accessor of a library system automatically replacing cartridges, the library system comprising: a driven type repository 201 constituted by a plurality of cells for accommodating a plurality of cartridges, respectively; a repository driver 205 for rotating the repository 201 around a rotating shaft thereof; an accessor 202 consisting of a hand portion 202a for fetching or repositing a cartridge from or into each of the cells, and a driver 202b for driving the hand portion 202a; and controlling means 203 for supplying to the repository driver 205 and the accessor driver 202b information for controlling the repository 201 and the hand portion 202a, the method for controlling the accessor characterized in that: the controlling means 203 detects a relative position of the accessor 202 to the cell by using the information obtained from the repository driver 205 when the accessor driver 202b inserts the hand portion 202a into the cell and the hand portion 202a comes into contact with the wall surface of the cell by rotation of the repository 201 by the repository driver 205.

Here, it is preferable that the library system further comprises contact detecting means 204 for detecting that the hand portion 202a comes into contact with the wall surface of the cell upon receiving driving information from the accessor driver 202b and the repository driver 205. Also, it is preferable that: the controlling means 203 supplies to the driver 202b the information concerning a predetermined cell position at which the hand portion 202a can be inserted into the cell and moves the hand portion 202a to the predetermined cell position; the controlling means 203 then inserts the hand portion 202a into the cell; the repository driver 205 rotates the repository 201; and the controlling means 203 obtains an actual central position of the cell by using the information supplied from the repository driver 205 when the contact detecting means 204 detects that the hand portion comes in contact with the wall surface of the cell by rotation of the repository 201 by the repository driver 205, thereby detecting a relative position of the accessor 202 to the cell from the actual central position and the predetermined cell position.

In this case, the repository 201 is used for repositing a plurality of cartridges such as magnetic disks or magnetic tapes in the respective cells, and there are two types of the repository 201, i.e., a fixed type repository which does not change its position after installation and a rotary type repository which is referred to as driven cells.

The rotary type repository usually has a cylindrical shape and each cell is arranged on its surface. Rotation of the rotary type repository is controlled so that a cell having a desired cartridge to be fetched therein is placed at a predetermined position.

The fixed type repository 201 is installed in such a manner that the repository 201 and the accessor 202 are so arranged as to have a predetermined positional relation. An amount of movement of the accessor with which the accessor can be placed at a desired cell position is previously known, and information concerning an amount of movement of the accessor is stored in a RAM or the like which will be described later.

Further, in case of the driven cells, information concerning an amount of movement of the accessor and information concerning an amount of movement of the repository for rotating a desired cell to a predetermined position are similarly stored in the RAM or the like.

The hand portion 202a constituting the accessor 202 may preferably have a structure like an arm of a robot and a mechanism capable of grabbing a cartridge accommodated in a cell.

The driver 202b is used for moving the accessor 202 itself and the hand portion 202a, and may be preferably made up of a motor, a belt, an accessor moving rail and others.

Further, rotation of the motor is controlled by the controlling means 203, and information corresponding with a number of revolutions and speed of rotation of the motor is fed back from the motor to the controlling means 203. Based on the information, the controlling means 203 adjusts positions of the accessor 202 and the hand portion 202a and detects a relative position of the accessor 202 to the cell. The information which is fed back is tachopulse signals output in accordance with a number of revolutions of the motor.

The controlling means 203 controls the accessor 202 and the repository 201 and, usually, may be preferably constituted by a CPU, a ROM, a RAM, an I/O controller, a D/A converter and others.

The ROM includes a program for controlling the accessor which is executed by the CPU, while the RAM has information relating to positions of the accessor and the cells and information required for control stored therein. The CPU controls the accessor using the program and the information.

The contact detecting means 204 is used for judging if the hand portion 202a comes in contact with the cell upon receiving the information such as tachopulse signals obtained from the driver 202b, and this judgment is usually executed by the CPU with its control program processing.

Incidentally, contact made between the hand portion 202a and the cell can be judged by detecting that the information indicating actual movement of the hand portion 202a from the driver 202b, e.g., the tachopulse signals can not be received or varied although the hand portion 202a is so controlled as to move from the driver 202b.

In addition, the contact detecting means 204 judges whether the hand portion 202a comes in contact with the cell upon receiving similar information such as tachopulse signal from the repository driver 205, and it is also preferable that this judgment is executed by the CPU with its control program.

The repository driver 205 is used for rotating the repository 201 when the repository 201 is of rotary type.

The present invention will now be described in detail hereinbelow in connection with illustrated embodiments. Note that the present invention can not be restricted by these embodiments.

Figure 28:
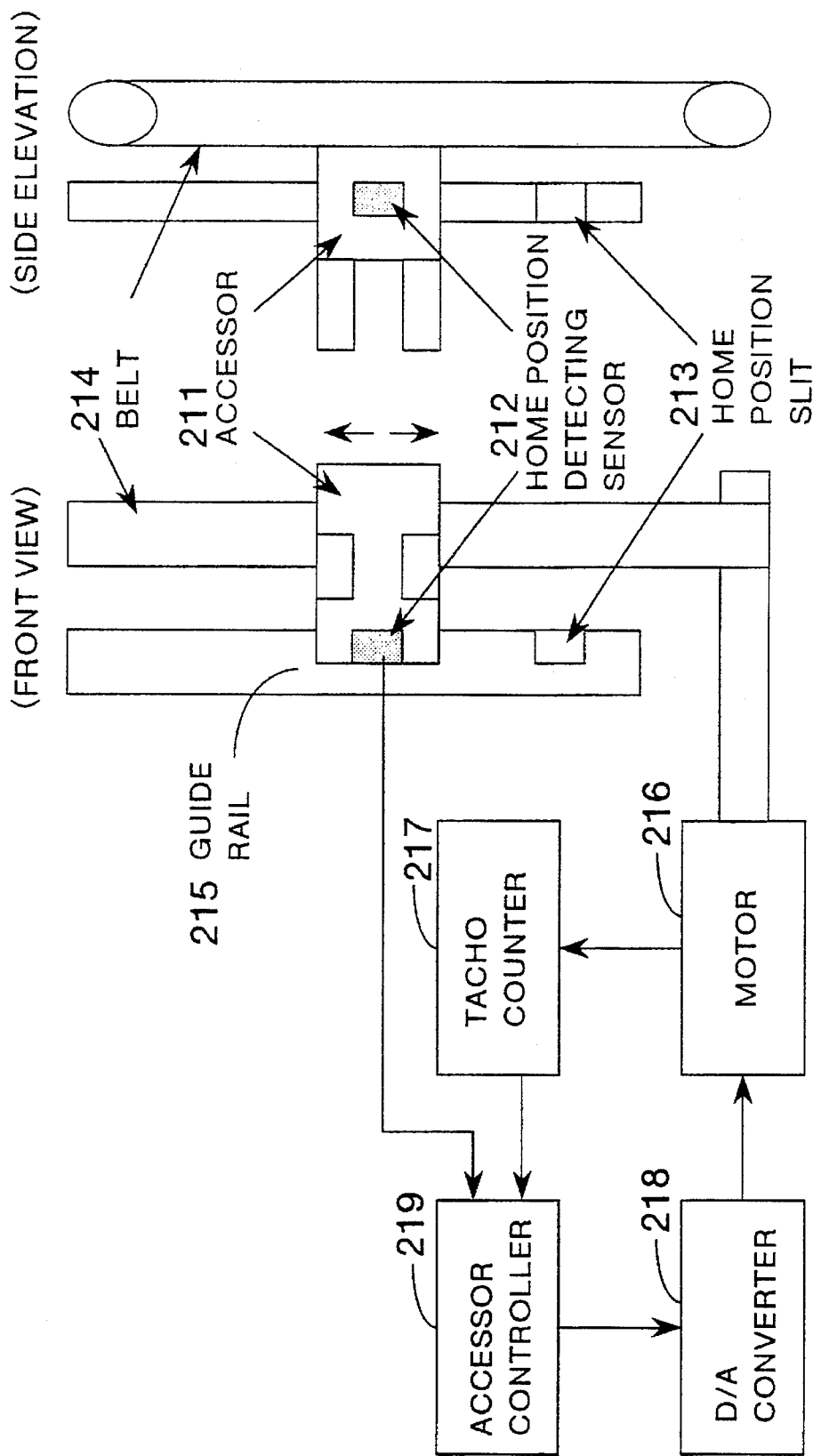
FIG. 28 is a block diagram showing a structure relating to an accessor control in the embodiment according to the present invention.

FIG. 28 is a block diagram showing a structure of a part relating to the accessor driving operation which is an embodiment according to the present invention. Measurement of a relative position with respect to the accessor which is characteristic of the present invention will be explained later.

A reference numeral 211 denotes an accessor provided with a hand portion which is inserted into a cell and carries a cartridge.

The accessor 211 is disposed to a guide rail 215 and driven by a belt 214 so as to move along the guide rail 215 without restraint.

Figure 25:
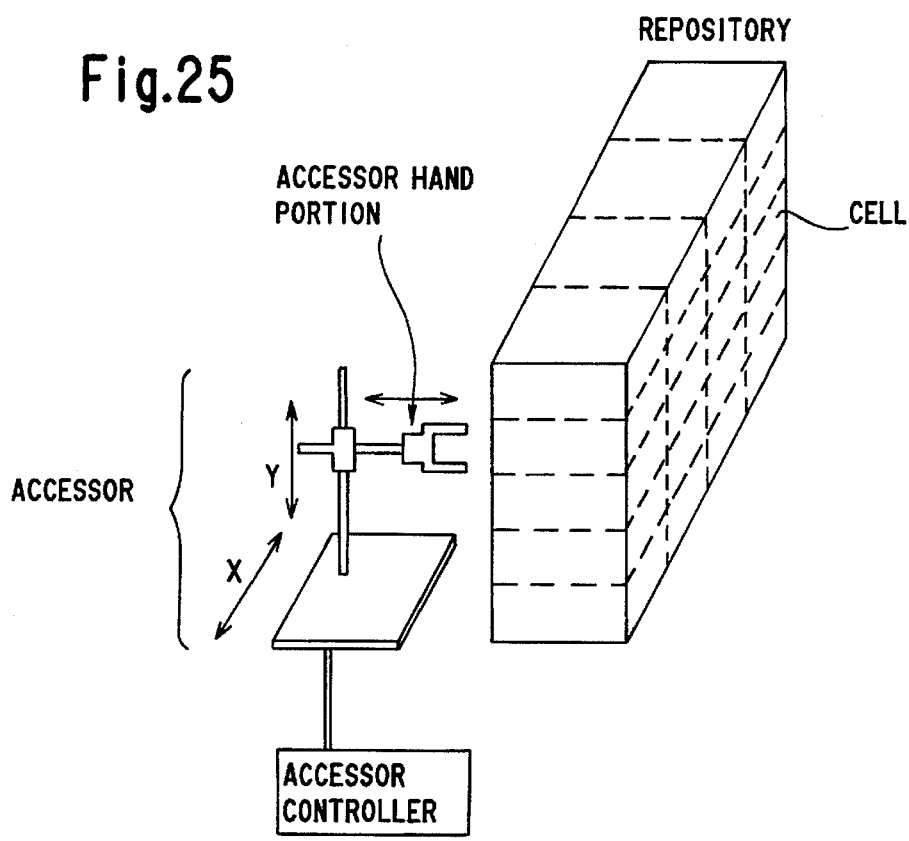
FIG. 25 is a block diagram schematically showing a structure of a fixed library system.

Although not shown in FIG. 28, it is generally preferable that the accessor 211 is provided with two belts so that it can move in two directions along the X axis and the Y axis as shown in FIG. 25.

Further, a home position slit 213 for determining a reference position of the accessor 211 is provided on the guide rail 215.

Referring to the case when the accessor 211 is placed on the home position slit 213, positions of the accessor 211 in directions of X and Y axes are determined.

The hand portion is provided with, e.g., two arms for grabbing the cartridge and may preferably have a structure such that the side surface of the hand portion is parallel with the wall surface of the cell.

A reference numeral 212 designates a home position detecting sensor for detecting that the accessor is positioned on the home position slit 213.

As the home position detecting sensor 212, a contact type switch such as a micro-switch or a non-contact type sensor such as an optical sensor or an infrared ray sensor may be used, for example.

A reference numeral 216 represents a motor for directly driving the belt 214 to move the accessor 211 in the direction of the X or Y axis.

A reference numeral 217 denotes a tachocounter used for generating signals for recognizing a current position of the accessor with respect to the home position slit 213 which is an original point.

The tachocounter 217 obtains from the motor 216 pulse signals which are referred to as tachopulses corresponding to a number of revolutions or a rotating speed of the motor, and outputs to later-described accessor controller 219 information relating to a direction or a speed of movement of the accessor by counting the tachopulses.

A reference numeral 218 designates a D/A converter which converts signals for controlling the motor supplied from the accessor controller 219 into electric current signals for driving the motor.

A direction and a speed of rotation of the motor 216 are determined by using the electric current signals.

A reference numeral 219 denotes an accessor controller for executing various functions such as movement of the accessor, control of the operation for inserting the hand portion, judgment upon contact of the hand portion, measurement of a relative position and others. In general, the accessor controller 219 is mainly constituted by a CPU as well as peripheral circuits such as a ROM, a RAM and an I/O controller.

Further, the above-mentioned functions can be usually realized by the programs stored in the ROM. Giving a concrete example, the accessor controller 219 outputs signals for controlling rotation of the motor 216 to the D/A converter.

Furthermore, upon receiving information relating to a direction of movement of the accessor or the like output from the tachocounter 217 or information from the home position detecting sensor 212, recognition of a current position of the accessor 211 or measurement of a relative position of the accessor 211 to the cell are performed with taking a quantity of control for the motor into account.

Although a hand portion and a driver for controlling the hand portion of the accessor 211 are not shown in the drawing, it is needless to say that the driver is provided with a motor, a D/A converter and others for driving the hand portion.

With such an arrangement, a relative position of the accessor 211 to each cell of the repository is measured.

Description will now be given as to the embodiment which is characteristic of the present invention and in which a relative position of the accessor to each cell of the repository is measured.

It is characteristic of the present invention to measure a positional deviation between the accessor and the cell by inserting the hand portion of the accessor into the cell and vertically or horizontally moving the hand portion in the cell.

Here, it is assumed that cartridges are not accommodated in all the cells of the repository when measuring the relative position.

Before measuring the relative position, there is performed initialization for determining such a state that the accessor 211 is placed on the home position slit 213 as an original state.

That is, the accessor controller 219 first drives the motor 216 to move the accessor 211 toward the home position slit 213. Upon receiving a signal indicating that the home position detecting sensor 212 has detected the home position slit 213, the accessor controller 219 then drives the motor 216 to stop the accessor 211. Subsequently, the accessor controller 21 initializes the information relating to the position of the accessor stored in the internal ROM.

Thereafter, measurement of the relative position of the accessor to each cell of the repository is started.

At the step for designing or installing the library system constituted by the accessor and the repository, the relation of the installation position of the guide rail 215 to which the accessor is disposed with respect to the position of the repository is previously determined, and hence an amount of movement of the accessor by which a cartridge can be taken out from a cell at a target position is previously known.

In such a manner, the positional relationship between the accessor and each cell, which is predetermined during the designing process, is previously stored in the RAM as an absolute position, and a positional deviation between the accessor and the cell, i.e., a relative position is measured after moving the accessor to the absolute position.

The embodiments will now be explained hereinbelow with reference to FIGS. 29, 30 and 31.

Figure 29A:
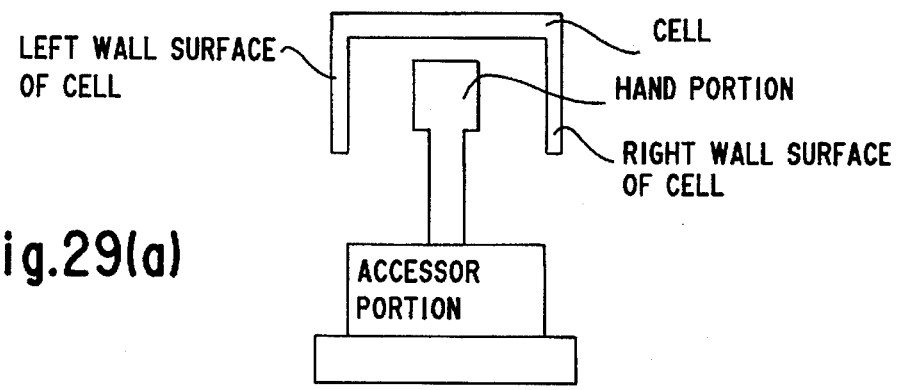
FIGS. 29 (a), (b) and (c) are explanatory views showing a method for measuring a relative position in a direction of the X axis in the embodiment.
Figure 29B:
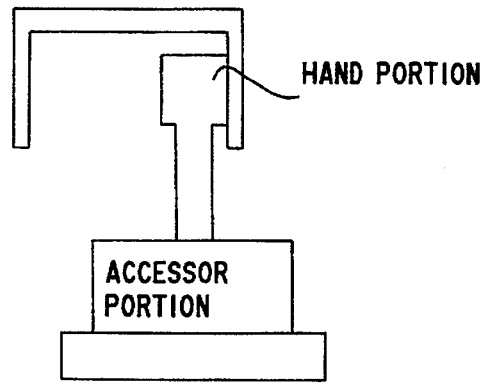
Figure 29C:
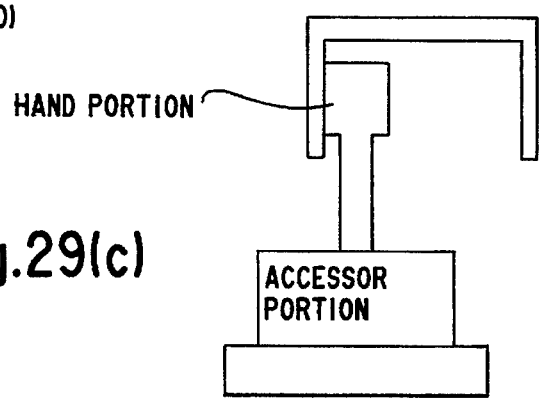
Figure 30A:
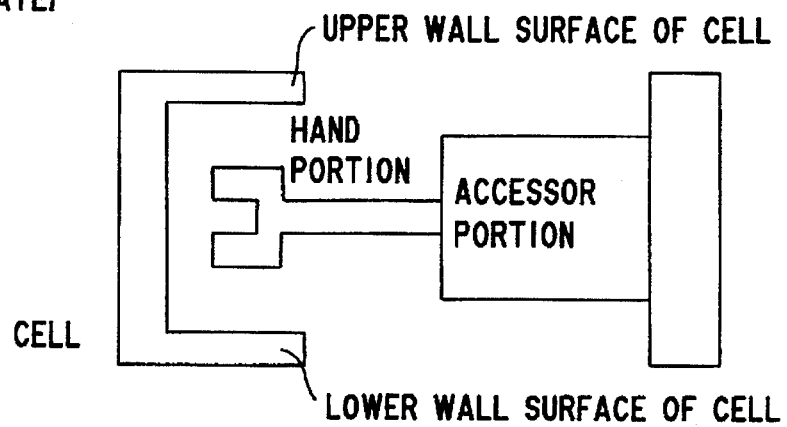
FIGS. 30 (a), (b) and (c) are explanatory views showing a method for measuring a relative position in a direction of the Y axis in the embodiment.
Figure 30B:
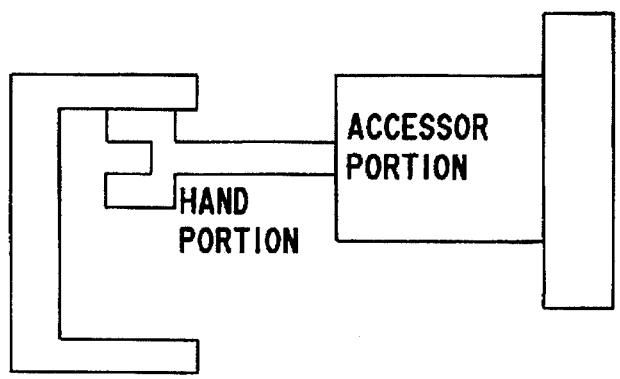
Figure 30C:
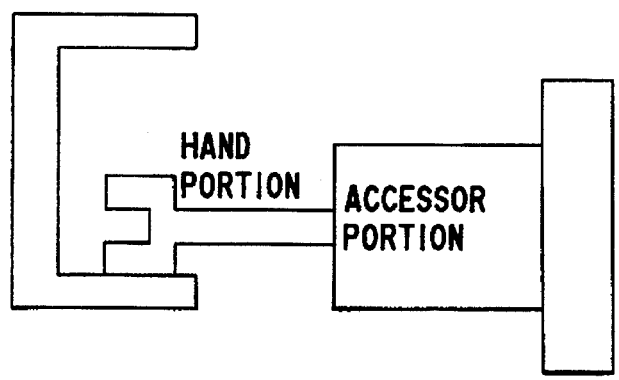

FIGS. 29 and 30 show the case where fixed cells are adopted, while FIG. 31 illustrates the case where driven cells are employed.

FIG. 29 is a view used for explaining the method for measuring the relative position of the accessor to the cell when the hand portion of the accessor is moved in the direction of the X axis.

Figure 32:
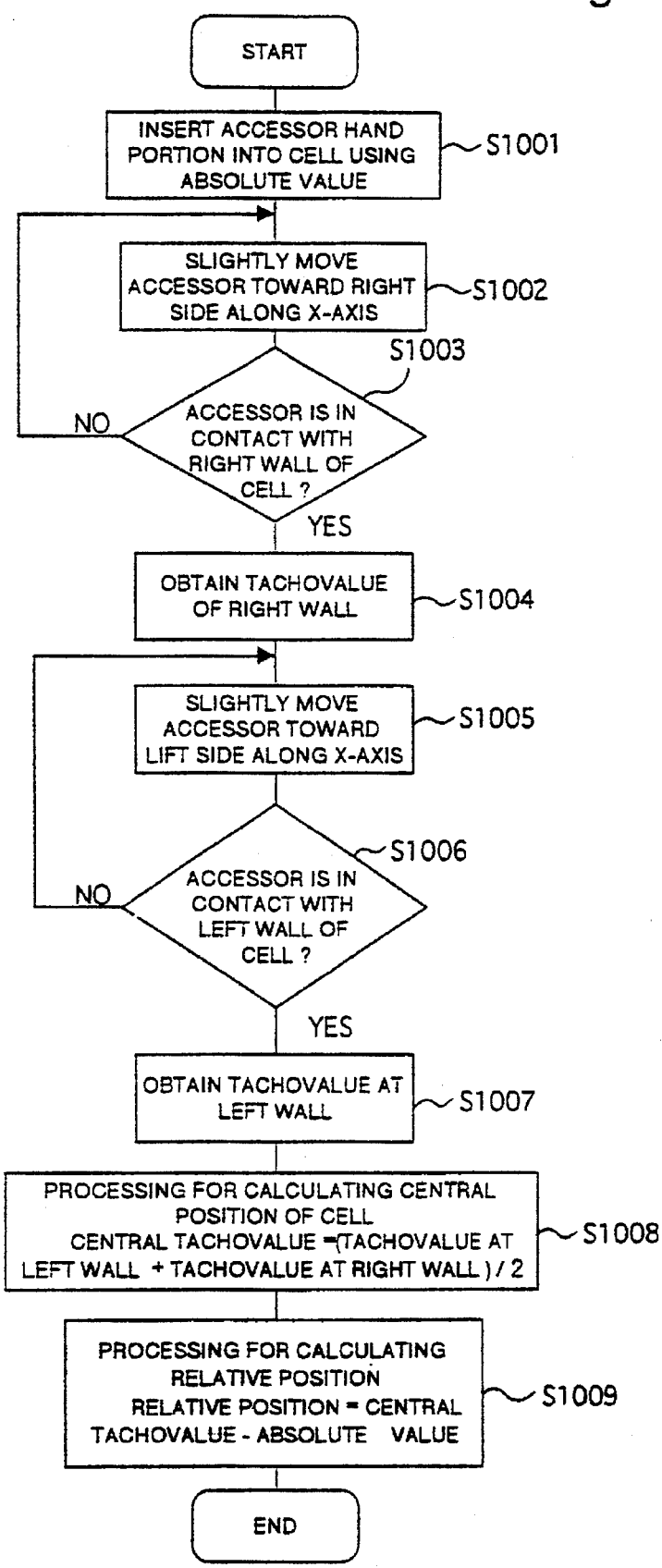
FIG. 32 is a flowchart showing the accessor control for the relative position measurement in the X axis direction.

Further, FIG. 32 is a flowchart showing the operation of the accessor controller 219 which executes the relative position measuring method.

At the step S1001, the accessor 211 is moved in front of the cell to which the relative position of the accessor is measured.

It is assumed that the RAM of the accessor controller 219 has information concerning the quantity of movement corresponding with the absolute position, e.g., a tachocount value corresponding with a number of revolutions of the motor required for moving the accessor to the absolute position, stored therein.

At this time, the accessor 211 is moved using the absolute position of the cell stored in the RAM, and the hand portion is inserted into the cell.

This state is determined as an initial state in FIG. 29(a).

At the step S1002, the accessor 211 is moved toward right-hand side along the X axis at a low speed.

At the step S1003, judgment is made upon whether the hand portion of the accessor has come into contact with a right wall surface of the cell (FIG. 29(b)).

The judgment of contact is made as follows, for example.

The accessor controller 219 outputs to the motor 216 control signals for moving the accessor 211 in a predetermined direction at a given speed. When the motor 216 rotates in response to this output, tachopulse signals corresponding with a number of revolutions and a rotating speed of the motor 216 are output from the motor 216, and this output is detected by the tachocounter 217.

The tachocounter 217 outputs information concerning a direction and a speed of movement in accordance with detection. When the accessor 211 has come in contact with the right wall surface (FIG. 29(b)), rotation of the motor is stopped although the motor is being driven.

For example, when rotation of the motor is stopped, the tachopulse signals are not supplied or varied. At this time, the tachocounter 217 supplies to the accessor controller 219 information indicating that reception of the tachopulse signal is disabled or information indicating that the tachopulse signal is not changed.

Even though the accessor controller 219 transmits the control signals for moving the accessor to the right-hand side, the accessor controller 219 judges that the accessor 211 has come into contact with the right wall surface of the cell upon receiving the information indicating that the tachopulse signal is not received or the information representing that the tachopulse signal is not changed.

As mentioned above, when contact made between the hand portion of the accessor 211 and the right wall surface of the cell is detected, the accessor controller 219 stores the supplied information in the RAM at the step S1004. That is, a tachovalue on the right wall is obtained.

In this case, a tachocount value of the tachopulse signals corresponding with a distance of movement from the absolute position can be used as the information stored in the RAM.

At the step S1005, the accessor 211 is moved toward left-hand side along the X axis at a low speed.

At the step S1006, judgment is made upon whether the hand portion of the accessor has come into contact with the left wall surface (FIG. 29 (c)).

This judgment is similarly performed as the foregoing judgment and, if contact made between the hand portion and the left wall is detected by the accessor controller 219, information obtained from the tachocounter 217 is stored in the RAM (i.e., a tachovalue on the left wall is obtained).

At the step S1008, a tachocount value (central tachovalue) relating to a central position of the cell is calculated on the basis of the thus-obtained two tachovalues.

That is, a central tachovalue=(the tachovalue on the left wall+the tachovalue of the right wall)/2 is calculated.

The central tachovalue corresponds with a distance of movement of the accessor from the home position slit 213.

Then, at the step S1009, the central tachovalue—(a tachocount value corresponding with the absolute position) is calculated.

The result is a relative tachocount value corresponding with the relative position of the accessor to the cell. The positional deviation in the direction of X axis can be corrected by slightly moving the accessor in accordance with the relative tachocount value, and the accessor can be placed at the actual central position of the cell.

Relative positions for correcting the positional deviation are obtained with respect to all the cells, and relative tachocount values for the relative positions are stored in the RAM of the accessor controller 219.

When cartridges are previously inserted into the cells and the library system is operated, the accessor can be so controlled as to move to the position with taking the relative position into account.

FIG. 30 shows a method for measuring the relative position of the accessor to the cell when moving the hand portion of the accessor in the vertical direction, i.e., the direction along the Y axis.

Figure 33:
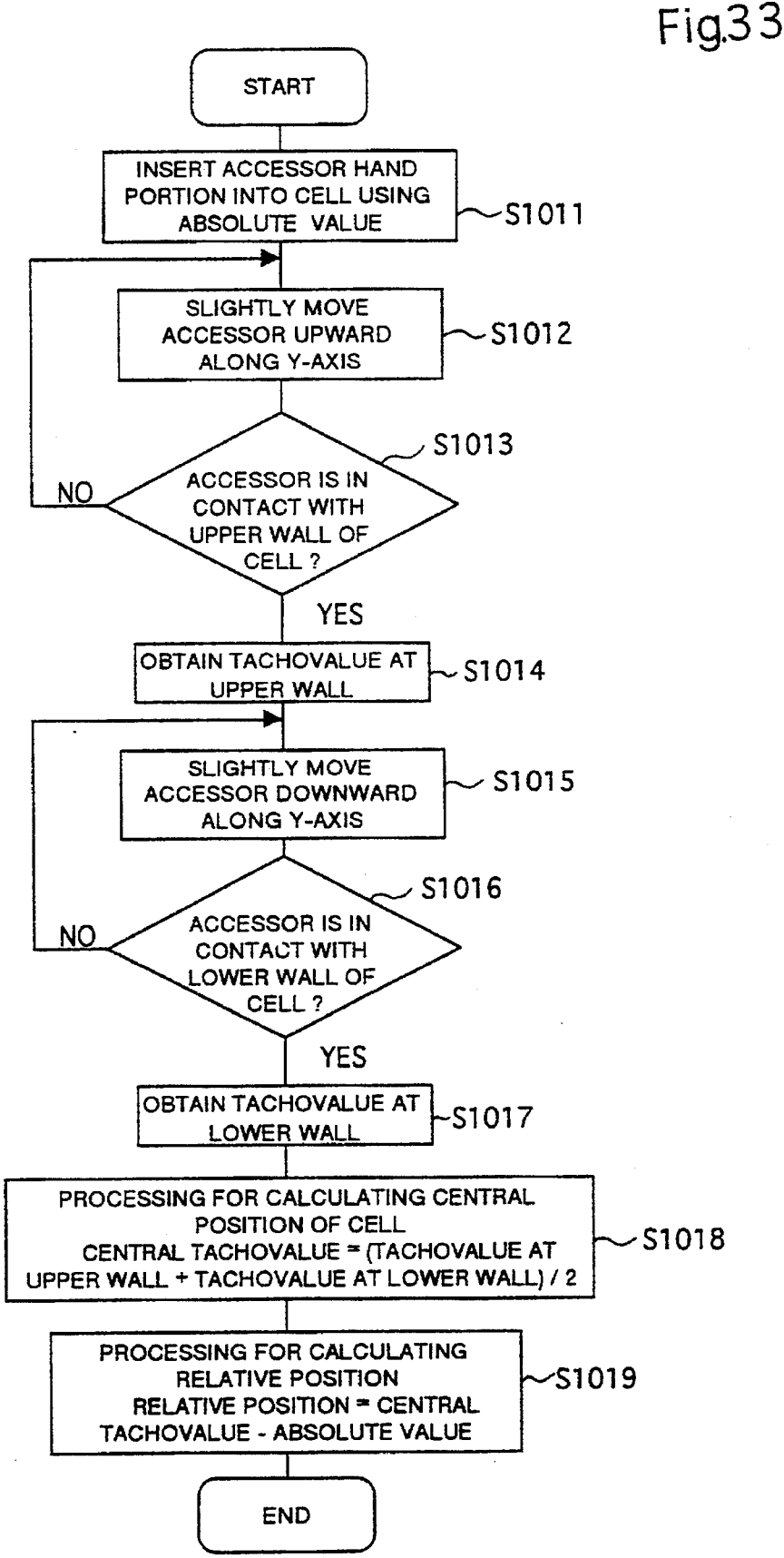
FIG. 33 is a flowchart showing the accessor control for the relative position measurement in the Y axis direction.

Further, FIG. 33 is a flowchart showing the operation of the accessor controller 219 for executing this method of measurement.

A difference between this measurement and that shown in FIG. 29 is that the hand portion is moved in the horizontal direction or the vertical direction, and the method for controlling the hand portion is the same in the both cases.

Further, differences of the flowchart of FIG. 33 from the flowchart of FIG. 32 are that the accessor is moved upwards in the direction of the Y axis at the step S1012 and that it is moved downwards in the direction of the Y axis at the step S1015. Therefore, a tachovalue obtained when the accessor has come into contact with the upper wall or the lower wall is a tachovalue on the upper wall or a tachovalue on the lower wall (the steps S1014 and S1017).

Thus, as shown at the step S1008, a central tachovalue in the direction of the Y axis can be calculated in accordance with (a tachovalue on the upper wall+a tachovalue on the lower wall)/2.

In this way, the positional deviation in the direction of the Y axis can be corrected.

Further, a combination of correction of the positional deviation in the direction of the X axis with correction of the positional deviation in the direction of the Y axis, which are shown in FIGS. 29 and 30, enables movement of the accessor to the central position just in front of the cell.

Figure 26:
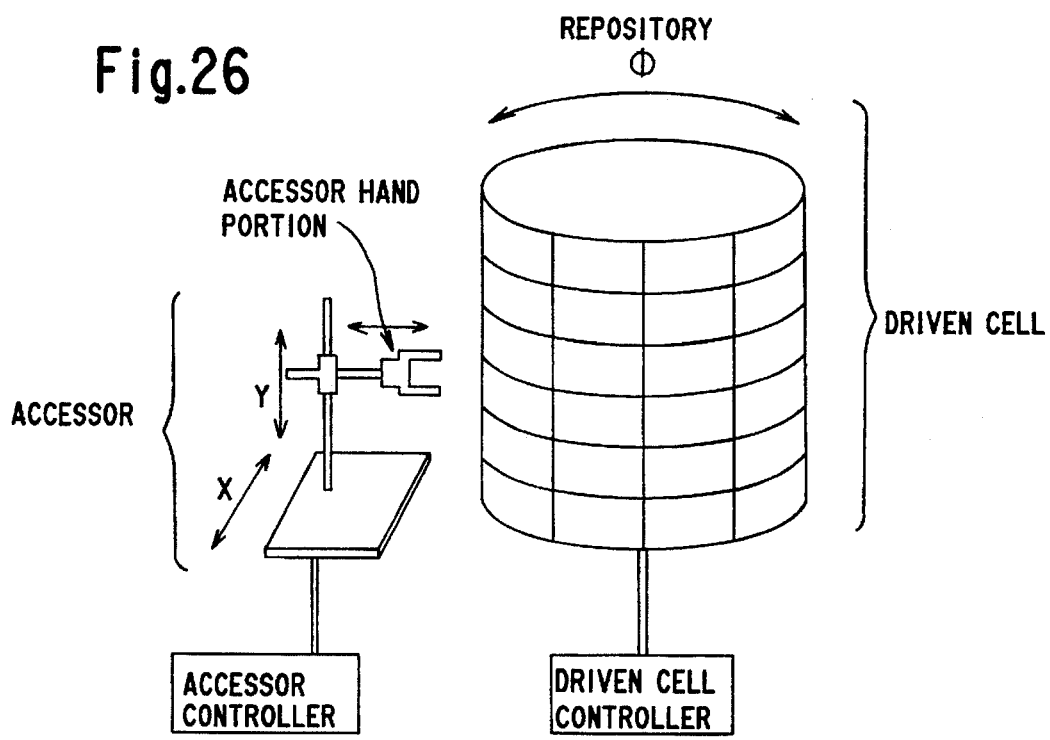
FIG. 26 is a block diagram schematically showing a structure of a rotary library system.

FIG. 31 shows an embodiment for measuring the relative position in the case where the driven cells shown in FIG. 26 are used.

In this embodiment, the hand portion of the accessor is inserted and fixed in the cell, and the driven cell is moved to measure the relative position, thereby correcting the positional deviation in the horizontal direction of the driven cells.

Figure 34:
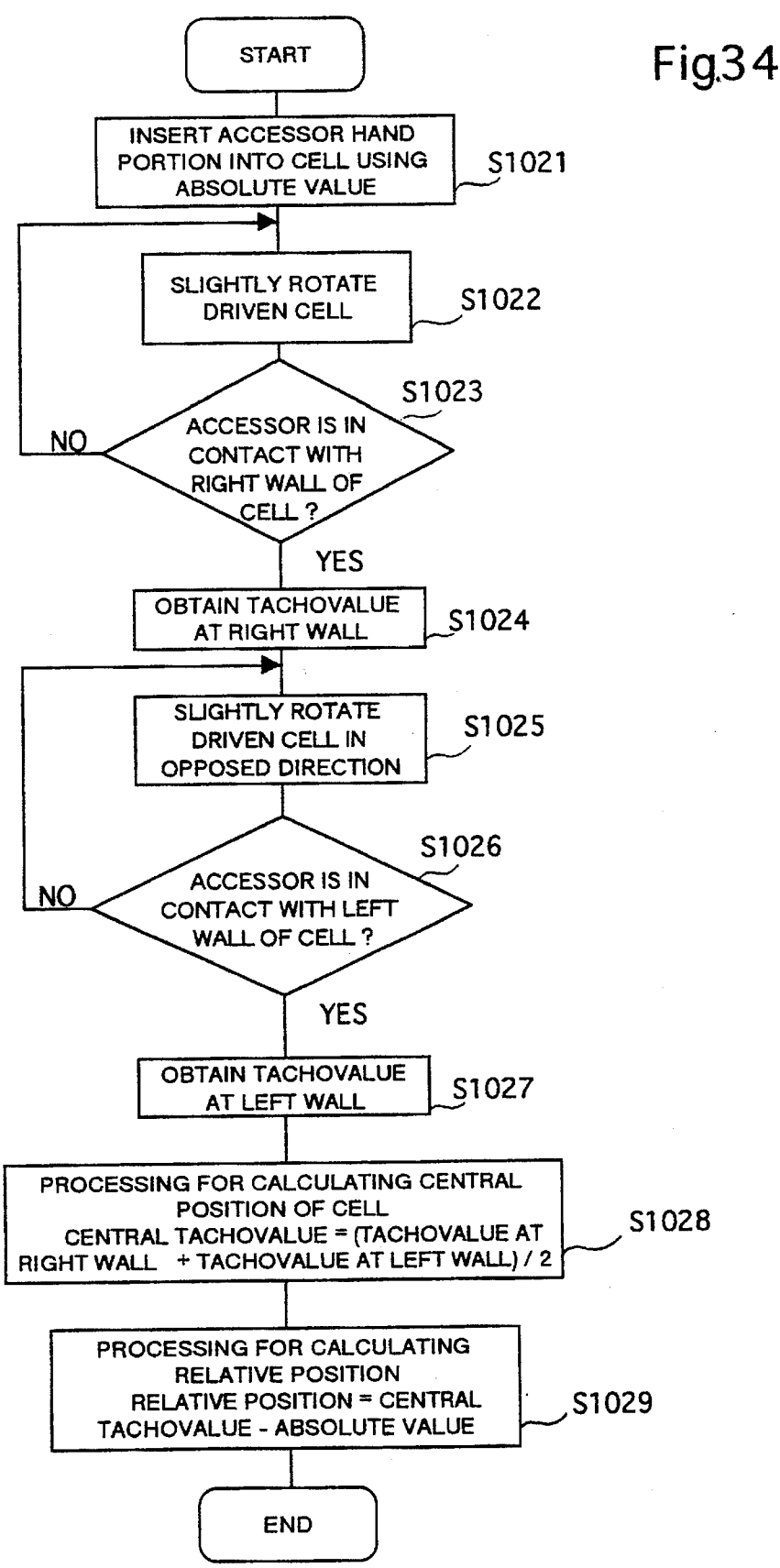
FIG. 34 is a flowchart showing the accessor control for the relative position measurement in case of the drive cells.

FIG. 34 is a flowchart showing the operation of the accessor controller 219 with the driven cells being employed.

In case of using the driven cells, a driven cell motor, a D/A converter and a tachocounter for measuring tachopulses fed from the motor are separately required in addition to the constituents shown in FIG. 28.

At the step S1021, the driven cells are rotated by driving the driven cell motor so that the hand portion of the accessor 211 can be inserted to the cell whose relative position is to be measured.

The accessor 211 is then moved to the front of the cell whose relative position is to be measured, and the hand portion is inserted into the cell.

At this time, movement of the accessor and the driven cells is carried out in accordance with the absolute position determined during the designing process or the installation process.

Thereafter, the hand portion of the accessor 211 is fixed in order to measure the relative position.

At the step S1022, the driven cells are rotated at a low speed in such a direction as that the hand portion is brought into contact with the right wall surface of the target driven cell.

At the step S1023, it is judged whether the hand portion of the accessor 211 has come in contact with the right wall surface of the driven cell.

As similar to the foregoing embodiments, this judgment upon the contact state is carried out by receiving information or the like indicating that rotation of the driven cell motor is stopped and the tachopulse signals can not be received although the accessor controller 219 is currently transmitting control signals for rotating the driven cell motor.

Subsequently, when it is detected that the hand portion of the accessor 211 has come into contact with the right wall surface of the driven cell, a tachovalue on the right wall is obtained at the step S1024.

At the step S1025, the driven cell is then rotated at a low speed in a direction opposed to the direction at the step S1022.

Judgment is made upon whether the hand portion of the accessor 211 has come in contact with the left wall surface of the driven cell at the step S1026.

When it is detected that the hand portion of the accessor has come into contact with the left wall surface of the driven cell, a tachovalue on the left wall is obtained at the step S1027.

As similar to the step S1008, a central tachovalue of the driven cell is obtained at the S1028, and a relative tachocount value corresponding with the relative position of the driven cell is calculated at the step S1029 as similar to the step S1009.

As mentioned above, the relative position of the driven cell to the accessor for correcting the positional deviation of the driven cell is obtained.

In case of actually operating the library system adopting the driven cells, the accessor is moved to the absolute position and the driven cell is so controlled as to move to a position taking the relative position into account, thereby placing the accessor to the actual central position of the driven cell.

In the case where the driven cells are adopted, if the relative position of the cell in the vertical position must be measured, the accessor is further moved slightly in the vertical direction to obtain the tachovalue shown when the accessor has come in contact with the upper wall or the lower wall of the cell, enabling correction of the positional deviation in the vertical direction.

As described above, since the relative position of the accessor to the cell or vice versa can be measured by using regular constituents of the library system without requiring any special measurement jig such as a reflex type photoelectric sensor, the operation such as adjustment for attaching the sensor or the like can be omitted, and the relative position can be inexpensively and easily detected using the accessor.

According to the present invention, the driver inserts the hand portion into a desired cell and moves the hand portion in such a direction as that the hand portion can be brought into contact with the wall surface of the cell, and the controlling means detects the relative position of the accessor to the cell by using the information obtained from the driver when the hand portion has come into contact with the wall surface, and hence the relative position of the accessor to the cell can be inexpensively and easily detected without requiring any special apparatus for detecting the relative position.

In addition, the controlling means supplies to the driver the information concerning a predetermined cell position at which the hand portion can be inserted into the cell, and moves the hand portion to the predetermined cell position. The controlling means further inserts the hand portion into the cell and vertically or horizontally moves the hand portion in the cell. The controlling means obtains an actual central position of the cell by using the information obtained from the driver when the contact detecting means detects that the hand portion has come into contact with the wall surface of the cell, and detects a relative position of the accessor to the cell from the actual central position and the predetermined cell position. Thus, a user does not have to carry out the troublesome adjustment of the accessor for detecting the relative position any longer, enabling easy detection of the relative position within a short period.

Moreover, in case of employing the driven cells, the accessor driver inserts the hand portion into a cell, and the repository driver rotates the repository. The controlling means then detects the relative position of the cell to the accessor by using the information obtained from the repository driver when the hand portion has come into contact with the wall surface of the cell. Likewise, in the case where the driven cell are adopted, the relative position of the cell to the accessor can be easily detected with an inexpensive system configuration.

Further, the controlling means supplies to the accessor driver the information relating to a predetermined cell position at which the hand portion can be inserted into the cell and moves the hand portion to the predetermined cell position. The controlling means further inserts the hand portion into the cell, and the repository driver rotates the repository. The controlling means obtains an actual central position of the cell by using the information supplied from the repository driver when the contact detecting means detects that the hand portion has come into contact with the wall surface of the cell. Then, the controlling means detects the relative position of the cell to the accessor from the actual central position and the predetermined cell position. In case of using the driven cells, the troublesome operation for adjusting the accessor can be similarly omitted, and the relative position can be easily detected within a short period.

5. Control Unit

Here, an object of the present invention is to provide a control unit capable of realizing necessary functions using capacities of a ROM and a RAM provided in an existing hardware by selectively restoring and developing only necessary program codes on the RAM from compressed program codes stored in the ROM in accordance with each optional unit connected to the control unit main frame or each function to be used.

Figure 42:
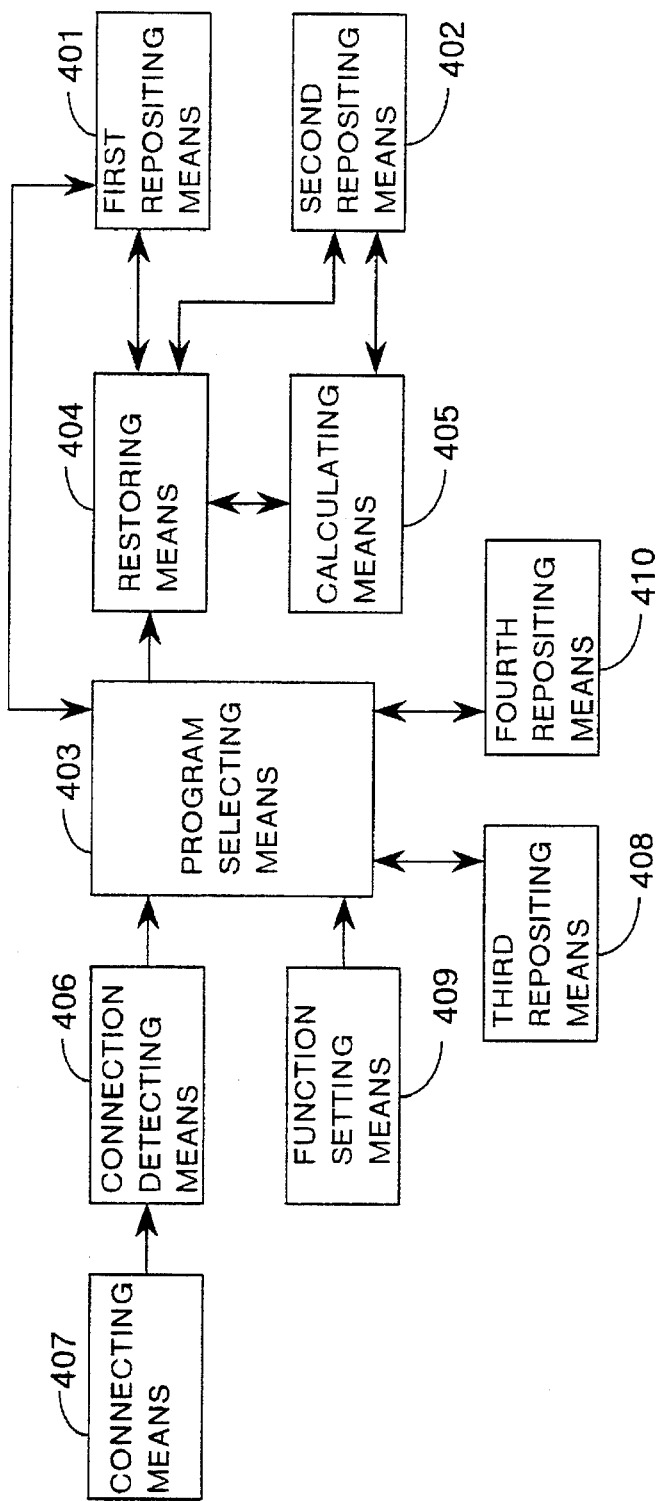
FIG. 42 is a block diagram showing a basic structure of control unit according to the present invention.

FIG. 42 is a block diagram showing a basic structure of the control unit according to the present invention.

As shown in the drawing, the present invention provides a control unit comprising: first storing means 401 for storing a plurality of various compressed program codes therein; program selecting means 403 for automatically selecting only necessary program codes from a plurality of the various program codes; restoring means 404 for restoring the program codes selected by the program selecting means 403; second storing means 402 for storing the program codes restored by the restoring means 404; and calculating means 405 for performing control processing in accordance with the program codes stored in the second storing means 402.

In addition, the control unit according to the present invention further comprises: connecting means 407 for connecting a plurality of external units; connection detecting means 406 for detecting that the external units are connected; and third storing means 408 for storing information of necessary program codes required for controlling each external unit therein in accordance with each external unit, and it is preferable that: the connection detecting means 406 detects which external unit is connected with the connecting means 407; the program selecting means 403 thereafter selects only program codes required for controlling the external unit connected with the connecting means 407 among program codes stored in the third storing means; the restoring means 404 restores the selected program codes; the restored program codes are stored in the second storing means 402; and the calculating means 405 controls the connected external unit on the basis of the program codes stored in the storing means 402.

In addition, the control unit according to the present invention further comprises function setting means 409 for setting necessary functions and fourth storing means 410 for storing information of program codes required for realizing each function in accordance with each function, and it is preferable that: the program selecting means 403 selects only program codes required for realizing the set function from program codes stored in the fourth storing means 410; the restoring means 404 restores the selected program codes; the selected program codes are stored in the second storing means 402; and the calculating means 405 executes the set function on the basis of the program codes stored in the second storing means 402.

Moreover, the control unit according to the present invention further comprises function setting means 409 for setting necessary functions and fourth storing means 410 for storing information of program codes required for realizing each function in accordance with each function, and the program selecting means 403 may preferably selects only program codes for realizing the function set by the function setting means 409 among program codes required for controlling the connected external unit from the fourth storing means 410.

Further, after the power supply is turned on, when the function setting means 409 sets a function required for the control, during execution of the function which has been already set by the calculating means 405, the program selecting means 403 may select program codes corresponding with the newly-set function; the restoring means 404 may restore the selected program codes; the second storing means 402 may store the restored program codes therein; and the calculating means 405 may execute the set function on the basis of the program codes stored in the second storing means 402.

In this case, a non-volatile memory may be preferably used as the first storing means 401 and, in particular, a ROM (Read Only Memory) may be suitable as the first storing means 401.

A volatile memory may be used as the second storing means 402 and, in particular, it may be preferable to use a RAM which is inexpensive and has a rapid response characteristic.

RAMs may be employed as the third and fourth storing means 408 and 410, and it may be particularly preferable to use non-volatile RAMs in case of holding data after the power supply is turned on.

Usually, as the program selecting means 403, the restoring means 404 and the calculating means 405, MPUs (Micro Processor Units) may be preferably used.

The connecting means 407 is a so-called connector, and there are various shapes of the connecting means depending on interface specifications of an external unit to be connected.

An input/output driver circuit corresponds to the connection detecting means 406, and it is used for judging whether the external unit is connected or what the connected unit is by input/output of signals transmitted between the connected external unit and the connection detecting means 406.

For example, when an external unit is connected to a given port of the connecting means 407, it may be possible to detect a signal generated when an electric circuit connected to the port is electrically conducted.

Further, the MPU may constantly supervises the port to which the external unit is connected, and the external unit to be connected may be designated by transferring data.

An input device such as a keyboard may be preferably used as the function setting means 409, and information or the like about ON/OFF of items to be set may be previously stored in the ROM or the RAM so that the function can be set by reading this information.

The invention will now be described in detail hereinbelow in connection with illustrated embodiments C-1 through C-3. Note that the present invention is not restricted by these embodiments.

Figure 43:
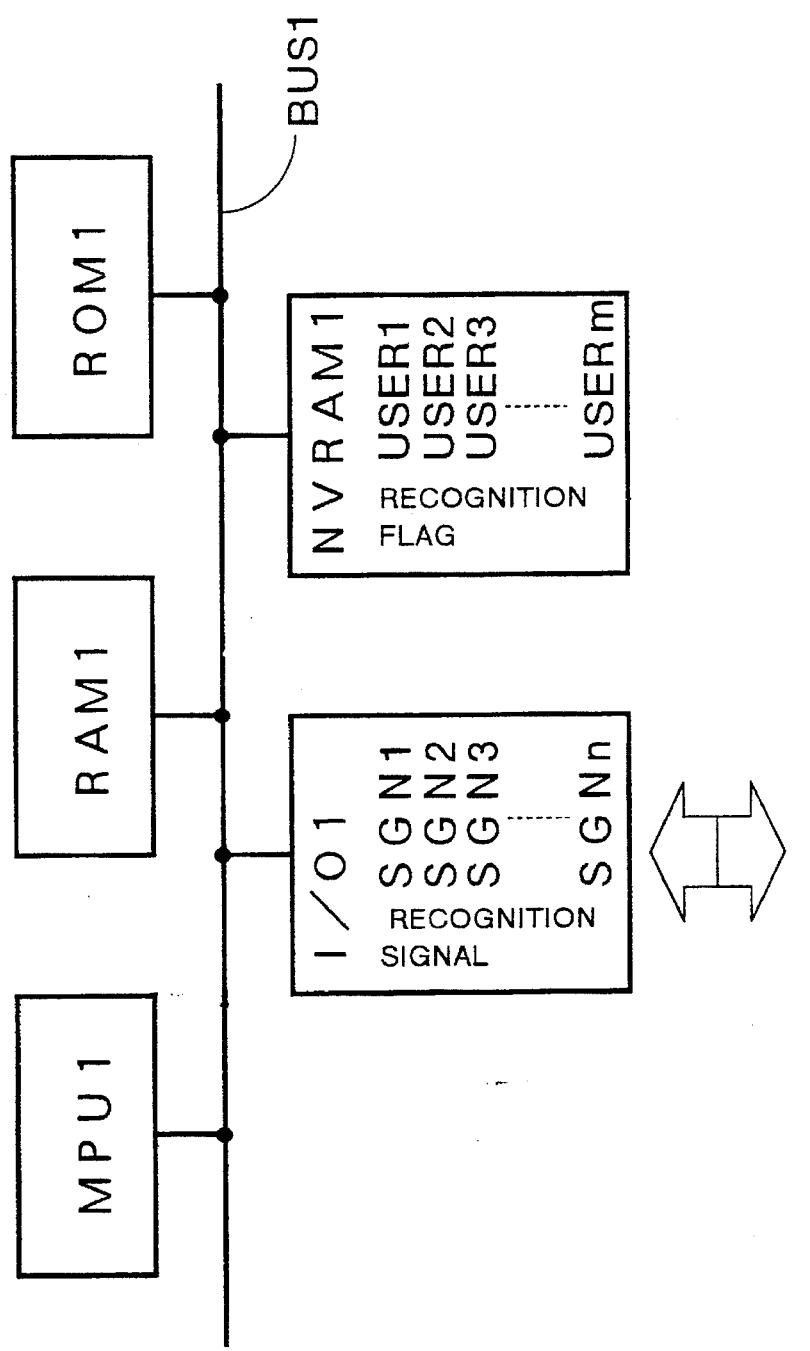
FIG. 43 is a block diagram showing a structure of a control unit according to the embodiment of the present invention.

FIG. 43 is a block diagram showing a structure of a hardware in a control unit according to the present invention.

Figure 49:
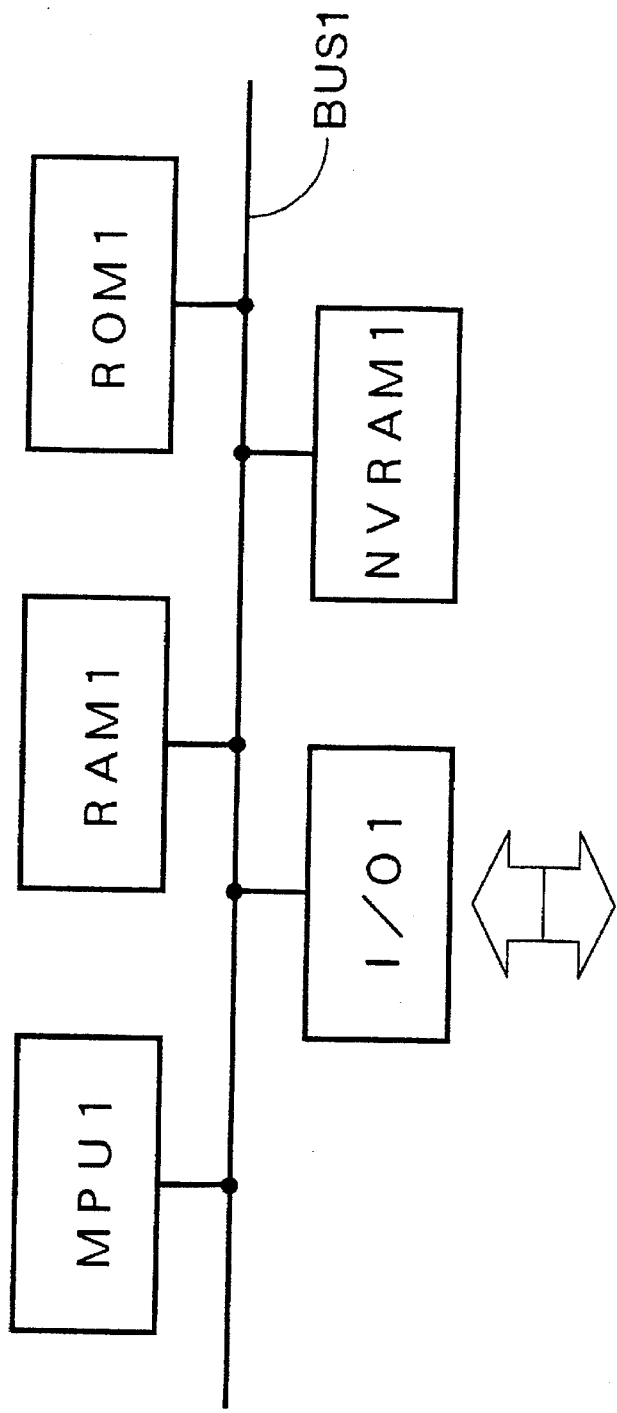
FIG. 49 is a block diagram showing a structure in the prior art.
Figure 51:
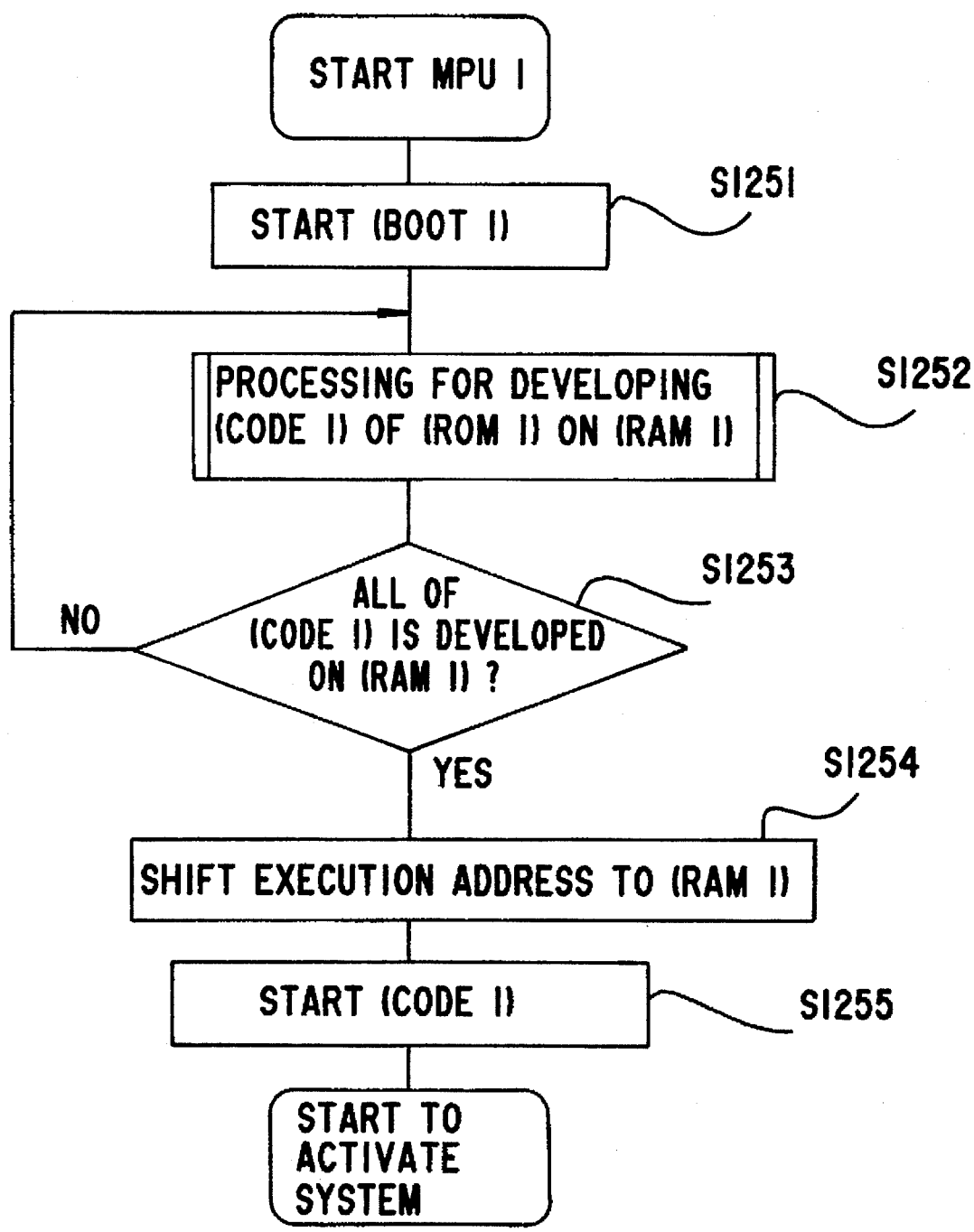
FIG. 51 is flowchart showing the processing for starting a program in the prior art.

This hardware structure is substantially the same with that in the prior art shown in FIG. 49, thus omitting the detailed explanation thereabout. However, differences of the hardware structure of this embodiment from that in the prior art are that a recognition signal SGNn (n=1, 2 . . . ) for recognizing the connected external unit is input through an input/output driver I/O 1 and that a flag USERm (m=1, 2 . . . ) for identifying a function or an individual user is stored in an NVRAM1. Such an arrangement enables selection of only necessary program codes from a plurality of various program codes stored in the ROM 1.

For example, when an external unit is connected, MPU1 detects that a given port of the I/O1 is activated. Then input of the recognition signal SGNn becomes apparent. Further, when the MPU1 reads data from a certain port of the I/O1, it is possible to recognize which external unit is connected from a value of the data read as the recognition signal SGNn.

As the flags USERm stored in the NVRAM1, there are stored a number of an individual user, and a number or a first address for starting execution of each function program code which corresponds with the number of the individual user and is stored in the ROM.

As described later, the MPU1 retrieves the information stored in the NVRAM1 and selects program codes which corresponds with the individual user that is set active are selected among the program codes stored in the ROM 1. The MPU1 then develops the selected program codes on the RAM 1.

Embodiment C-1

Here, description will be given as to the case where only program codes required for controlling the external unit connected to the control unit are selected and restored.

Figure 44:
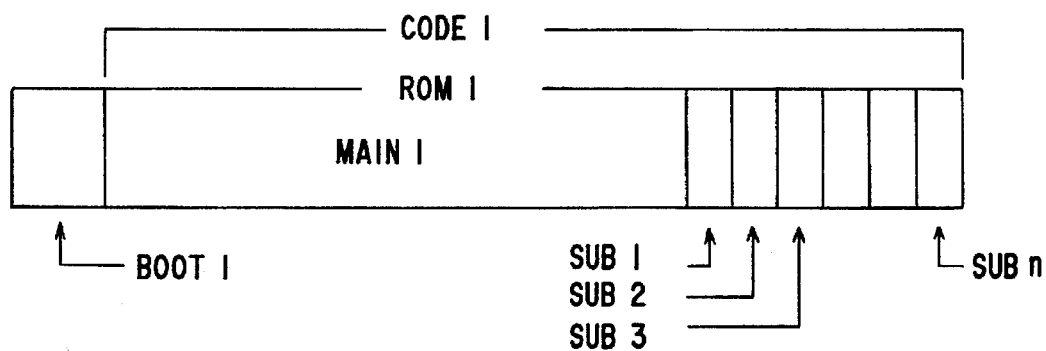
FIG. 44 is an explanatory view showing an example of stored state of program codes in an embodiment C-1.
Figure 50:
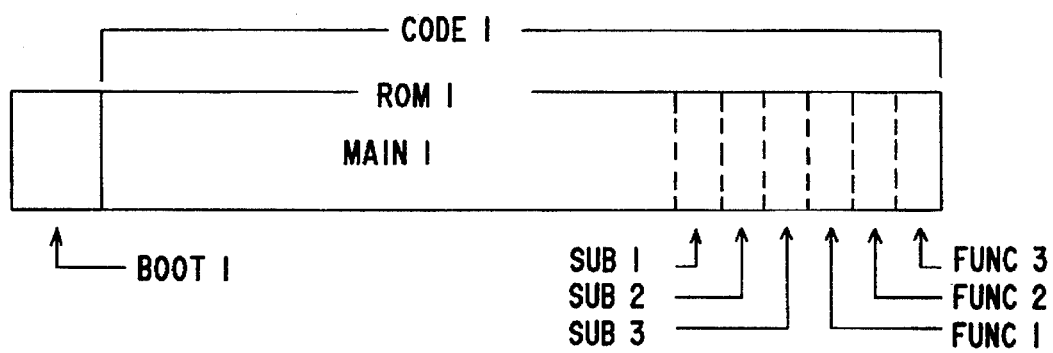
FIG. 50 is an explanatory view showing an example of stored state of program codes in the prior art.

FIG. 44 shows an example of program codes stored in the ROM in the embodiment C-1 according to the present invention.

In the embodiment C-1, consideration is a system for connecting a plurality of optional units (external units) to a control unit main frame shown in FIG. 43 through the I/O1.

Here, as examples of optional units, there are an autoloader for carrying a magnetic disk or a magnetic tape cassette, a unit for driving a library system or the like, a communication control unit or a remote terminal unit.

Referring to FIG. 44, program codes MAIN 1 for the control unit body and respective program codes SUBn (n=1, 2, . . . ) for controlling the optional unit which may be possibly connected are compressed and stored in an area CODE1 for storing the program codes.

The program codes can be compressed in accordance with various compression methods which have been recently adopted.

Figure 45:
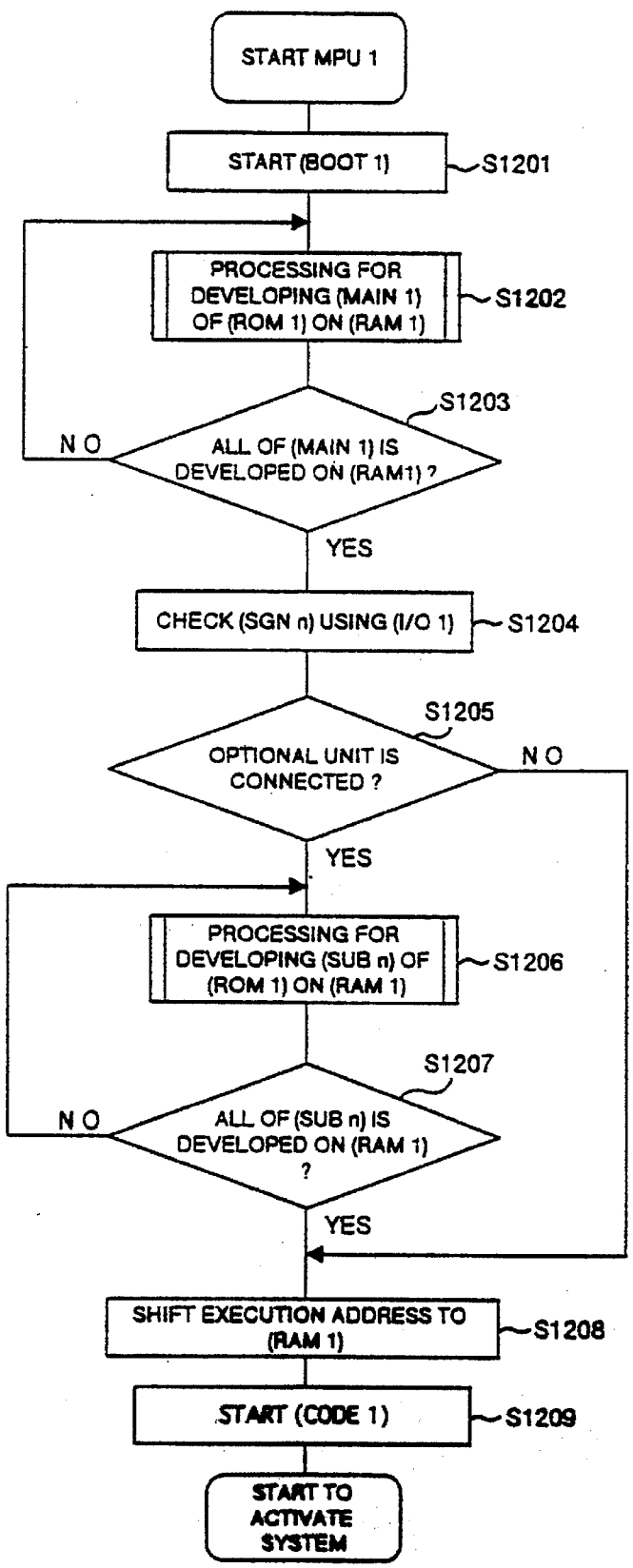
FIG. 45 is a flowchart showing the processing for starting a program in the embodiment C-1.

FIG. 45 is a flowchart showing the processing for developing the program codes stored in the ROM onto the RAM in the embodiment C-1.

When the power supply of the control unit is turned on, program codes BOOT1 which are stored in the ROM1 in terms of a hardware and used for starting the MPU1 are activated (the step S1201), and the MPU1 carries out the following processing in accordance with programs of the BOOT1.

Besides the program which is firstly started when the power supply is turned on, a program for identifying each program code stored in the area CODE1, a program for restoring the compressed program codes and other are stored as the BOOT1 programs without being compressed.

At the step S1202, the MPU1 restores the part MAIN1 in the compressed program code area CODE1 and develops it on the RAM1 in accordance with the BOOT1 programs.

As mentioned above, since the MAIN1 is the program codes for controlling the control unit main frame and always required irrespective of existence/absence of optional units, it is necessarily developed on the RAM1.

Next, at the step S1203, after the program codes MAIN1 are completely restored and developed, data of the connected port of the I/O1 are read, and it is checked if the recognition signal SGNn is input (the step S1204).

When no recognition signal SGNn is input (the step S1205), it is judged that no optional unit is connected and the processing advances to the step S1208. The MPU1 then shifts the execution address to the first address of the MAIN1 program developed on the RAM1 in accordance with the BOOT1 programs, thereafter executing the processing in correspondence with the program developed on the RAM1 (the step S1209).

On the other hand, if one or more of the recognition signals SGNn is input, it is judged that an optional unit is connected (the step S1205), the program code SUBn, which realizes the control for the optional unit corresponding with the input signal SGNn, is selected and decoded from the ROM1, and it is then developed on the RAM1 (the step S1206).

Confirmation is made on whether a plurality of signals SGNn are input (the step S1207), and if any other input signal SGNn exists, the compressed program code SUBn is again decoded and developed on the RAM1 at the step S1206.

Upon completion of development of the program codes corresponding with all the input signals SGNn, the processing proceeds to the step S1208, and the MPU1 moves the execution address to the first address of the MAIN1 program developed on the RAM1 to perform processing in accordance with the program developed on the RAM1 as mentioned above (the step S1209).

At this time, the thus-developed program code SUBn for controlling the optional unit is called from the MAIN1 program to be executed as a subroutine when the need arises.

As described above, all the program codes for controlling optional units which may be connected are compressed and stored in the ROM but only the program codes relating to the optional unit connected to the control unit body are restored and developed on the RAM, and only the program required for the operation is hence developed on the RAM, effectively using the capacity of the existing RAM.

Incidentally, when an MPU or a storage unit are provided to an optional unit, the program codes relating to the optional unit may be restored and transferred to the optional unit. In such a case, variation and/or addition of the program are easily enabled.

Even if a storage unit for storing the program codes is not provided to an optional unit, the program codes for realizing functions as a system including the optional unit can be managed in one area of the ROM or the RAM within the control unit, easily coping with variation and/or addition of functions of the optional unit.

Embodiment C-2

Here, description will be given as an example where program codes required for realizing a function corresponding with each predetermined individual user on the basis of flags USERm (m=1, 2 . . . ) for identifying the individual users stored in the NVRAM1 shown in FIG. 43.

Figure 46:
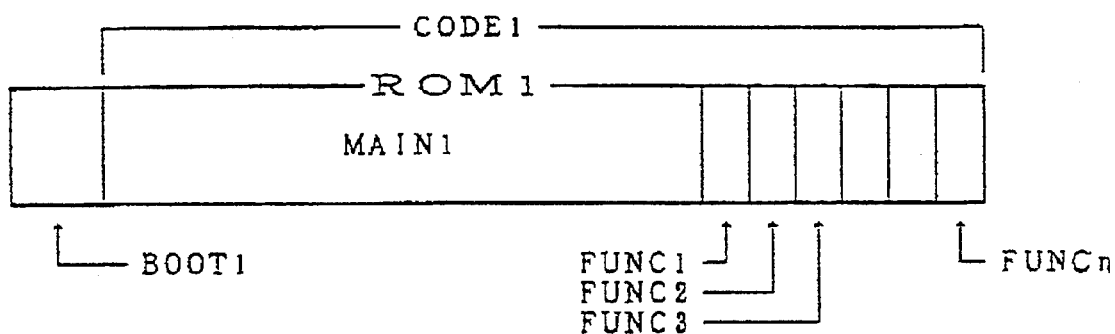
FIG. 46 is an explanatory view showing an example of stored state of program codes in an embodiment C-2.

FIG. 46 shows an example of program codes stored in the ROM in the embodiment C-2 according to the present invention.

As shown in FIG. 46, program codes MAIN1 for the control unit body and program codes FUNCn (n=1, 2. . . ) for each expanded function which can be performed in the control unit are compressed and stored in an area CODE1 for storing program codes.

Figure 47:
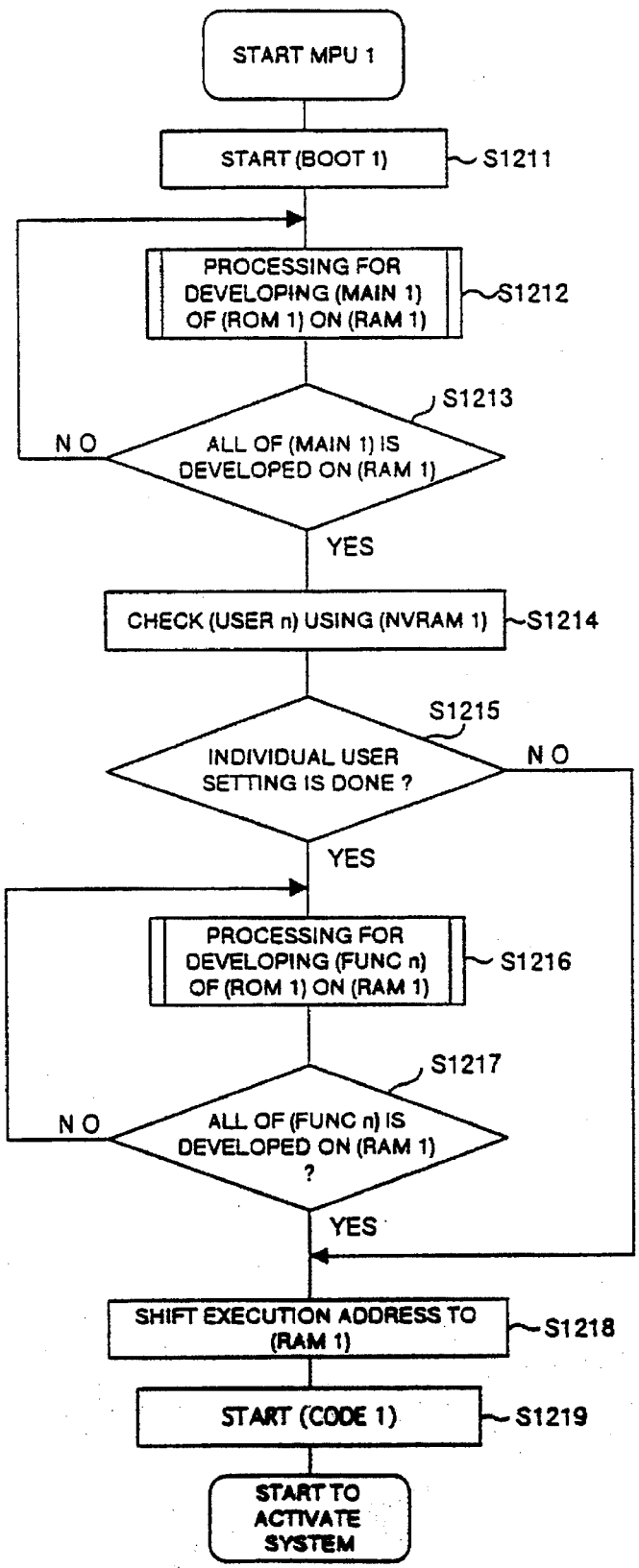
FIG. 47 is a flowchart showing the processing for starting a program in the embodiment C-2.

FIG. 47 is a flowchart showing the processing for developing program codes stored in the ROM onto the RAM in the embodiment C-2.

When the power supply of the control unit is turned on, program codes BOOT1 which are stored in the ROM in terms of the hardware and used for starting the MPU1 are started (the step S1211), and the N1PU1 carries out the following processing in accordance with the program of the BOOT1.

At the step S1212, program codes MAIN1 are restored and developed on the RAM1 at the same time with the step S1202.

At the step S1213, when development of the program codes MAIN1 is completed, it is checked if flags USERm which are stored in the NVRAM1 and used for identifying individual users are set active (the step S1214).

If all the flags USERm are not active, namely, if setting for each individual user is not given and thereby no expanded function is required (the step S1215), the processing advances to the step S1218, and the MPU1 moves the execution address to the first address of the MAIN1 program developed on the RAM1 in accordance with the BOOT1 program, thereafter executing the processing in correspondence with the program developed on the RAM1 (the step S1209).

Meanwhile if any of the flags USERm is set active (the step S1215), the program codes FUNCn (n=1, 2 . . . ) for realizing the expanded functions for the USERm which is set active are selected and decoded from the ROM1, and they are then developed on the RAM1 (the step S1216).

For example, if information indicating that the expanded functions for the USER1 which is set active are FUNC2, FUNC5 and FUNC7 is stored in the NVRAM1, program codes of FUNC2, FUNC5 and FUNC7 are restored and developed on the RAM1.

When development of all the program codes is completed at the step S1217, the processing proceeds to the step S1218, and the MPU1 moves the execution address to the first address of the N1AIN1 program developed on the RAM1 to perform the processing in accordance with the program developed on the RAM1 as mentioned above (the step S1219).

At this time, the developed program codes FUNCn for controlling an optional unit are called and executed from the MAIN1 program as a subroutine when the need arises.

As described above, all the program codes for realizing all expanded functions which can correspond with individual users are compressed and stored in the ROM, but only the program codes of the expanded functions corresponding with the individual user which is set active are restored and developed on the RAM, and only the program required for the operation is hence developed on the RAM, thereby effectively using the capacity of the existing RAM.

Further, since the program codes stored in the ROM are compressed and only the necessary program codes among the stored codes are developed, there is no need to select and store the necessary program codes in the ROM in order to deal with the individual user, thus facilitating management of manufacturing ROMs or management of a number of ROMs.

Embodiment C-3

It is desirable that the status of individual user setting flags stored in the NVRAM1 can be set or changed from an input device such as a keyboard by a user in the embodiment C-2.

For example, an input device such as a keyboard and a display unit such as a CRT are further provided to the structure shown in FIG. 43; current information about start of the program is displayed on the display unit; and the user inputs setting data from the input device depending on the situation while monitoring the information. In such a case, additional provision of other functions, elimination of unnecessary functions, or variation of expanded functions when the user of the functions is changed are enabled after the power supply is turned on or during the control operation.

Figure 48:
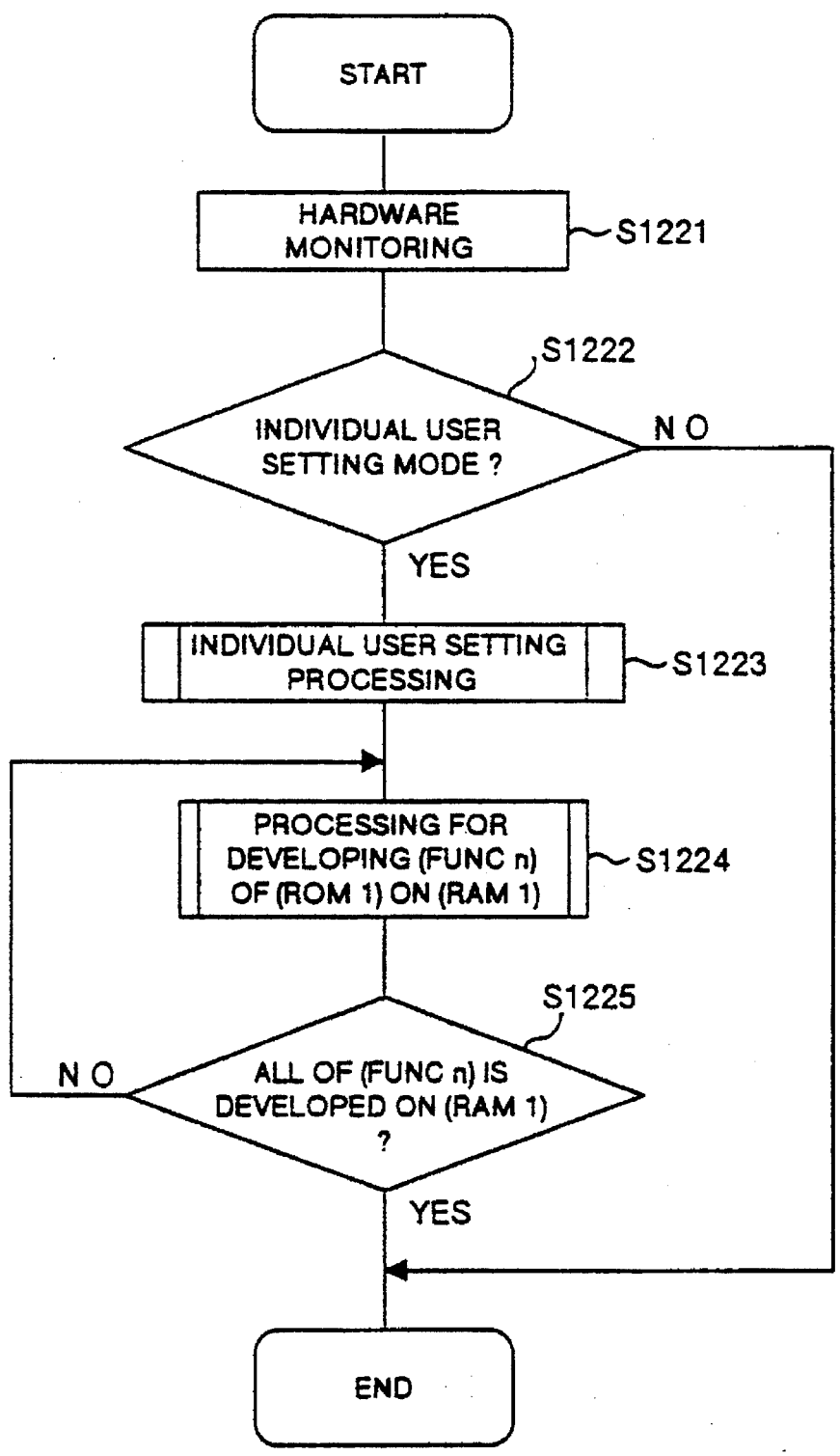
FIG. 48 is a flowchart showing the processing for restoring program codes in an embodiment C-3.

FIG. 48 is a flowchart showing the operation of the MPU1 when the above-described configuration is adopted.

Here, it is assumed that all the flags USERn which are set in the NVRAM1 and used for identifying individual users are not active when the power supply is turned on.

At this time, only program codes of the MAIN1 are developed on the RAM1 as mentioned above, and the control processing is executed in accordance with the program.

At the step S1221, the processing for monitoring the hardware is carried out and, as a part of monitoring process, it is checked if direction to shift to a mode for setting information about individual users is input from the input device.

At the step S1222, when it is confirmed that the direction to shift to the individual user setting mode has been issued, the processing advances to the step S1223, and the individual user setting process is started.

Here, a user inputs settings of flags USERn (n=1, 2 ...) for identifying active individual users, settings of expanded functions and others required by individual users which are set active.

Subsequently, at the step S1224, program codes (FUNCn) of expanded functions corresponding with the individual users which are set active are selected from the ROM1 and the processing for restoring and developing all the necessary program codes on the RAM1 (the steps S1224 and S1225) is carried out.

In this manner, the expanded functions corresponding with the individual user can be executed after the power supply is turned on even if a user of the expanded function is changed.

According to the present invention, since only program codes required for controlling external units which are to be connected are selected and restored, unnecessary programs are not restored, and functions required for controlling the external units and the control unit can be realized within a storage capacity provided in the existing hardware.

Furthermore, since only program codes required for realizing set functions are selected and restored, unnecessary programs are not restored, and the set functions can be realized within a storage capacity provided in the existing hardware. Thus, there is no need to select and store program codes for realizing the necessary functions in accordance with each individual user, facilitating management of manufacturing memories or management of a number of memories.

Moreover, according to the present invention, the program selecting means selects only program codes realizing functions set by the function setting means among program codes required for controlling connected external units, thereby enabling effective use of the second storing means.

In addition, after the power supply is turned on, when functions required for the control are set by the function setting means, during execution of the function which has been already set by the calculating means, program codes corresponding with the newly-set functions are developed on the second storing means. Therefore, even if a user of the functions is changed after the power supply is turned on, expansion of the functions corresponding with the individual user can be effected.

What is claimed is:

1. A cartridge carrying system comprising:

cartridge holding means, having two arms which are so placed as to be opposed to each other with a predetermined distance therebetween and turned around respective supporting points, for grabbing a cartridge stored at a first predetermined position at one end of each of the two arms by turning the two arms around the respective supporting points in directions opposed to each other;

arm turning means for turning the arms around the respective supporting points;

carrying means for carrying the cartridge grabbed by the two arms in such a manner that the cartridge is drawn into or from a space between the two arms;

carriage driving means for driving the carrying means;

carriage completion monitoring means for monitoring if the cartridge is carried to a second predetermined position; and controlling means for controlling the operations of the arm turning means and the carriage driving means in response to information supplied from the carriage completion monitoring means, wherein the controlling means controls so as to continue the operation for carrying the cartridge to the second predetermined position, when the carriage completion monitoring means detects that the cartridge is not carried to the second predetermined position within a given time.

2. A cartridge carrying system according to claim 1, wherein when the carriage completion monitoring means detects that the cartridge is not carried to the second predetermined position within the given time, the controlling means controls the carriage driving means so that the arm turning means turns the two arms in directions opposed to those in which the arms are turned for grabbing the cartridge and the carrying means carries a cartridge grabbed by an other end of each of the two arms.

3. A cartridge carrying system according to claim 1, wherein when the carriage completion monitoring means detects that the cartridge is not carried to the second predetermined position within the given time, the controlling means controls the carriage driving means so that the arm turning means turns the two arms in directions opposed to those in which the arms are turned for grabbing the cartridge and the carrying means carries a cartridge grabbed by an other end of each of the two arms to the second predetermined position, while the carriage driving means keeps driving the carrying means to continue the operation for carrying the cartridge to the second predetermined position.

4. A cartridge carrying system according to claim 1, wherein when the carriage completion monitoring means detects that the cartridge is not carried to the second predetermined position with the given time, the controlling means performs control for alternately repeating a first turning operation of the arm turning means by which the two arms are so turned as to grab the cartridge at one end of each of the two arms and a second turning operation of the arm turning means by which the two arms are turned in directions opposed to those of the first turning operation so as to grab a cartridge at an other end of each of the two arms, while the carriage driving means keeps driving the carrying means to continue the operation for carrying the cartridge to the second predetermined position.

5. A cartridge carrying system according to claim 2, wherein when the carriage completion monitoring means detects that the cartridge is not carried to the second predetermined position within the given time, the controlling means further performs control so that the arm turning means turns the two arms in directions opposed to those in which the two arms are turned for grabbing the cartridge and carrying means carries a cartridge grabbed by an other end of each of the two arms, while the carriage driving means keeps driving the carrying means to continue the operation for carrying the cartridge to the second predetermined position.

6. A cartridge carrying system according to claim 5, wherein when the carriage completion monitoring means detects that the cartridge is not carried to the second predetermined position with the given time, the controlling means further performs control for alternately repeating a first turning operation of the arm turning means by which the two arms are so turned as to grab the cartridge at one end of each of the two arms and a second turning operation of the arm turning means by which the two arms are turned in directions opposed to those of the first, turning operation so as to grab a cartridge at an other end of each of the two arms, while the carriage driving means keeps driving the carrying means to continue the operation for carrying the cartridge to the second predetermined position.

7. A cartridge carrying system according to claim 1, wherein the cartridge carrying system is adopted in a library system having a repository constituted by a plurality of cells storing a plurality of cartridges, respectively.

8. A cartridge carrying system according to claim 7, wherein the library system further comprises gap detecting means for detecting occurrence of a gap state in which cartridge can not be taken out.

9. A cartridge carrying system according to claim 8, wherein when the gap state is detected by the gap detecting means, micro-vibrations are imparted to the arms or the repository and the arms are so controlled as to returned to a predetermined position.

10. In a library system for automatically replacing cartridges, the library system comprising:

a driven type repository constituted by a plurality of cells for storing a plurality of cartridges, respectively;

an access of accommodating a hand portion for taking out or storing a cartridge from or into each of the cells; and gap detecting means for detecting occurrence of a gap state in which the cartridge can not be taken out, wherein when the gap state is detected by the gap detecting means, micro-vibrations are imparted to the accessor or the driven type repository, and the hand portion is so controlled as to be returned to a predetermined position within the accessor.

11. In a library system for automatically replacing cartridges, the library system comprising:

a driven type repository constituted by a plurality of cells for storing a plurality of cartridges, respectively;

driven cell controlling means for driving the repository;

an accessor consisting of a hand portion for taking out or storing a cartridge from or into each of the cells and an accessor body portion which accommodates the hand portion and carries the cartridge;

accessor controlling means for driving the accessor body portion and the hand portion;

gap detecting means for detecting occurrence of a gap state in which the cartridge can not be taken out on the basis of the operation state of the accessor or information supplied from the accessor controlling means; and micro-vibration controlling means for directing the accessor controlling means or the driven cell controlling means to impart micro-vibrations, wherein if the gap state is detected by the gap detecting means when taking out or storing the cartridge by the accessor, the micro-vibration controlling means supplies to the accessor controlling means or the driven cell controlling means information directing to impart micro-vibrations, the accessor controlling means or the driven cell controlling means imparts micro-vibrations corresponding with the directed information to the accessor or the driven type repository, and the accessor controlling means so controls as to return the hand portion to a predetermined position within the accessor body portion at which the hand portion is accommodated.

* * * * *